United States Patent [19]

Troudet

[11] Patent Number: 5,507,649
[45] Date of Patent: Apr. 16, 1996

[54] ADAPTIVE SYSTEM BASED ON INDICIA APPLIED TO THE FINGERS FOR TOUCH-TYPING/TRAINING

[76] Inventor: Farideh Troudet, 18612 Buccaneer Creek P.O. Box 360664, Strongsville, Ohio 44136

[21] Appl. No.: 101,843

[22] Filed: Feb. 15, 1994

Related U.S. Application Data

[60] Division of Ser. No. 912,874, Jul. 13, 1992, abandoned, which is a continuation-in-part of Ser. No. 770,610, Oct. 3, 1991, abandoned.

[51] Int. Cl.⁶ .................................................. G09B 13/04
[52] U.S. Cl. .................. 434/233; 63/15.2; 63/15; 434/112; 434/157; 434/162; 434/167
[58] Field of Search ...................... 434/112, 113, 434/233, 227, 219, 157, 156, 162, 167, 159, 236, 433; 63/1.1, 2, 15, 15.1, 15.2

[56] References Cited

U.S. PATENT DOCUMENTS

| | | | |
|---|---|---|---|
| 623,966 | 5/1899 | Barkley | 434/233 |
| 2,570,908 | 10/1951 | Behr | 434/233 |
| 3,501,849 | 3/1970 | Olsen . | |
| 4,519,781 | 5/1985 | Boyd . | |
| 4,909,739 | 3/1990 | Ladner et al. . | |

FOREIGN PATENT DOCUMENTS

| | | | |
|---|---|---|---|
| 1357068 | 2/1964 | France . | |
| 2672413 | 8/1992 | France | 434/227 |
| 931038 | 7/1963 | United Kingdom . | |
| 1255754 | 12/1971 | United Kingdom | 434/233 |

*Primary Examiner*—Robert P. Swiatek
*Assistant Examiner*—Jeffrey A. Smith
*Attorney, Agent, or Firm*—Frank H. Foster; Kremblas, Foster, Millard & Pollick

[57] ABSTRACT

Educational devices using process-oriented educational methods are disclosed to prepare pre-school children, school children, and teenagers for keyboarding. The devices include sets of gloves and indicia applied to the fingers of the gloves to provide pictorial and alphanumeric representations of the computer keyboard. The visual and tactile memorization of the glove images are complemented by auditory and associative memorization provided by a story-telling educational method. Synergistic use of the gloves in the context of supervised story-telling also trains the pre-school children to develop and practise both lateral and vertical thinking skills, thus preparing them for coping creatively with the inherent hardware/software limitations of computers. The memorization of the alphanumeric representation of the computer keyboard is reinforced through synergistic use of the gloves in a variety of activities including learning the alphabet, learning word-spelling, and learning languages. To best fit the psychology of teenagers, sets of picture-rings and medallion-rings are disclosed to specifically prepare that age-group for keyboarding.

29 Claims, 65 Drawing Sheets

ADAPTIVE SYSTEM BASED ON INDICIA APPLIED TO THE FINGERS FOR TOUCH-TYPING/TRAINING

This is a divisional application of prior application Ser. No. 07/912,874 (abandoned) filed on Jul. 13, 1992 entitled "Adaptive System Based On Indicia Applied To The Fingers For Touch-Typing Training", which is a continuation-in-part of application Ser. No. 07/770,610 (abandoned) filed on Oct. 3, 1991.

BACKGROUND OF THE INVENTION

1. Field of the Invention

Computers are playing an ever more important role in the economical, scientific, and educational development of our society. It is therefore not uncommon to see curricula granting them a significant role in the educational process of young children.

Children are most likely to fully utilize the resources that computers have to offer, as they become more comfortable in interacting with their physical interface, in particular the keyboard. Although computer interfacing has been greatly simplified through the standardization of the touch-typing keyboard, much is to be gained from educational systems that can help children to painlessly develop the needed keyboarding skills, as early as pre-school age.

After acquiring keyboarding skills, children will need both lateral and vertical thinking to express their ideas as freely as possible with the computer while accommodating for its hardware/software limitations.

Therefore, much is to be gained from wholistic educational systems that can motivate children, as early as pre-school age, to develop their lateral and vertical thinking skills, while preparing them for keyboarding.

2. Analytical Description of the Relevant Art

Since the invention of the first type-writer, various means and devices have been proposed to teach/train students to type, or to type more efficiently, as exemplified by the following United States and Foreign Patents.

U.S. Pat. No. 4,909,739 issued in 1990 to Ladner et al. entitled "Interactive Typing/Training System" discloses a set of color-coded finger guides to be worn at the top of the hand, and indicating the character of the home key that each finger is to be used for in touch-typing. The color-coding of the keys of the keyboard match the color-coding of the finger guides to indicate to the typist which keys each finger should be used for.

U.S. Pat. No. 2,570,908 issued in 1949 to Behr entitled "Indicator To Be Worn On The Hands While Learning To Typewrite" discloses a device constructed so as to be secured on the hand without impeding the use of the fingers in any way, and showing to the typist the correct keys of a type-writer to be struck by each finger, and the position of the keys relative to the actuating finger.

In the aforementioned patents by Ladner and Behr, the key-finger assignment of the keyboard is indicated to the student-typist by means of devices which represent the keys by the letters and numbers they bear, as specified by the standardized keyboard. Such key-finger assignment cannot however be used by pre-school children, since they do not yet know their alphabet nor their numbers. Moreover, the systems disclosed by Ladner and Behr are to be used by students in the actual act of touch-typing, or keyboarding. The latter training devices have therefore been specifically designed so as not to obstruct the student view of the keyboard, nor impede the free motion of the fingers. Such specificities are of no benefit to pre-school children, since it is highly desirable that they do not actually use the keyboard (because of the fragility of their joints), and are moreover responsible for the awkward characteristics of the aforementioned hand indicators, which would make them impractical to be worn by pre-school children.

U.S. Pat. No. 3,501,849 issued in 1970 to Olsen entitled "Method And Device For Teaching Typing And Language Skills" discloses a set of color-coded bands worn on each finger of the typist, and a set of color-coded discs to be affixed on the keys of a typewriter, whereby the color matching between bands and keys indicate to the typist which keys each finger should be used for.

French Pat. No. 925,459 issued in 1964 to Azan entitled "Dispositif pour le guidage cybernétique des doigts dans l'apprentissage de la dactylographie et permettre la correction de la mauvaise dactylographie" discloses a set of rings to be worn by the student typist. The letters assigned to each ring show to the typist the correct keys of a type-writer to be struck by each finger.

British Pat. No. 931,038 issued in 1963 to Haid entitled "Typewriter Key Markers to Teach Touch Typing" discloses rings which can be placed upon the fingers, and which have the color which marks the keys associated with any particular finger.

U.S. Pat. No. 623,966 issued in 1899 to Barkley entitled "Method Of And Apparatus For Type-Writer Instruction" discloses a set of rings to be worn by a typist with the aim of acquiring speed. The letters assigned to each ring show to the typist the correct keys of a type-writer to be struck by each finger.

In the aforementioned patents by Azan, Haid, and Barkley, the disclosed key-finger assignments are based on indexing the keys of the keyboard by the letters they bear (which index said keys), and therefore could not be used by pre-school children, since they do not know their alphabet.

Although the aforementioned ring sets can in principle be used by any student-typist who knows how to read, the bare representation of the keyboard in terms of plain letters can be in practise demotivating for young learners who usually look for excitement in any learning process. Without nurturing the student with opportunities for associative memorization, the learning process may indeed be reduced to just practising on the keyboard, and shy away many potential teenager students.

U.S. Pat. No. 4,465,477 issued in 1984 to AvGavaar entitled "Typewriter Instruction Device" discloses a device consisting of small ferromagnetic tips to be worn by the typist at the ends of his fingers, while the typewriter keys have electromagnets which attract the correct finger when a certain key has to be struck. These electromagnets could be attached at the fingertips by means of gloves, fingercots, or adhesives.

By requiring actual use of the keyboard and knowledge of the alphabet, the training system disclosed by AvGavaar is not adapted to prepare pre-school children for keyboarding for the same reasons mentioned above.

U.S. Pat. No. 4,902,231 issued in 1990 to Freer entitled "Learn To Type Via Mnemonic Devices, And Methods Of Constructing And Utilizing Same" discloses a large chart depicting the standardized computer keyboard, and mnemonic means including visual aids and phrases to help the student typist remember the locations of the keys. The chart is to be positioned within the view of the typing students.

Pre-school children do not know their alphabet, and therefore could not benefit from Freer's mnemonic devices that are based on phrases and pictures showing the phrases. Moreover, the letters indexing the keys of the keyboard are associated in irregular patterns within either words or phrases, which makes it difficult to identify these indexing letters from the pictures. Such mnemonic devices are addressed to the student-typist who knows how to read and make sentences, and present a degree of complexity by far exceeding the level of young children. Moreover, these mnemonic devices are applied to a large chart to be positioned within the view of the student-typist, preferably on the wall of a classroom, which would be of little practicality and convenience for a pre-school child in home environment.

There is therefore a need for process-oriented educational systems that are not only attractive to the child, but also easy-to-use and easy-to-be-accessed, in order to start the keyboarding training process as early as the pre-school-age group.

The present invention differs from the prior art in that it answers the aforementioned need, and provides simple picture-based (or object-based) devices using process-oriented methods in order to:

1) prepare the pre-school child (and any illiterate child or adult) for keyboarding before he has even learned the alphabet and the numbers;

2) while developing his lateral and vertical thinking;

3) and thereby realize a wholistic preparation of the pre-school child (and any illiterate child or adult) towards coping creatively with the inherent hardware/software limitations of the computer;

4) prepare teenagers for keyboarding through a learning process that is well-adapted to the behavioral characteristics of that age-group.

Further advantages, and differences from the prior art are contained in the further objects and characteristics of the invention, as disclosed in the following summary and detailed description of the invention.

SUMMARY OF THE INVENTION

The present invention relates to educational devices using process-based methods for training various age groups to memorize the key-finger assignment of the keyboard, and in particular for preparing pre-school children for keyboarding while developing their lateral and vertical thinking.

The devices disclosed comprise various sets of gloves and rings which are to be worn accordingly by pre-school children, school children, and teenagers. These gloves and rings provide various representations of the keyboard, and various mnemonic means to facilitate the memorization of the key-finger assignment. The mnemonic means include various types of indicia mounted on the fingers of the gloves and on the rings. The choice of indicia is adaptive to the needs and psychology of each individual child or teenager.

For the pre-school child who has not yet learned his alphabet, the indicia comprise pictures defining objects, which object names begin with the letter corresponding to the key of the keyboard to be struck by the proper finger. The indicia evolve with the learning process into an association of pictures and letters for teaching the alphabet to the pre-school child in the context of the key-finger assignment of the keyboard.

After the pre-school child has learned his alphabet with his/her mnemonic gloves, the set of indicia is reduced to the alphanumeric characters of the keyboard, i.e. the letters, numbers, and punctuation symbols. The child then further learns to memorize the location of the keys in the keyboard.

Towards further reinforcing the memorization of the key-finger assignment of the keyboard, the indicia are then extended to incorporate word-spelling and language vocabulary. With these new sets of indicia, the school child or teenager will be motivated to use his/her knowledge of the keyboard for learning how to spell and for learning a foreign language. In return, these new learning activities will also strengthen the memorization of the keyboard.

It is an object of the invention to meet adaptively the psychological and behavioral needs of each age group to motivate the child/teenager to learn the standardized keyboard.

It is therefore an object of the invention to prepare pre-school children for keyboarding by providing them mnemonic means to start learning the key-finger assignment of the keyboard; yet without training them to actually practise on the keyboard to begin with, because of the fragility of their joints.

It is also an object of the present invention to provide a comfortable and protective feeling to the pre-school child to be encouraged to learn as early as three-year old. There lies the motivation for choosing the picture gloves to meet the child's needs for control and comfort. The fact that these gloves do not give to the fingers the mobility and sense of touch that is needed by the typist actually using the keyboard is of no relevance to the scope of the present invention, since the pre-school child will not practise at the keyboard to begin with. This structural characteristic of the present invention sets it further apart from the prior art which primarily aimed at securing unkindered use of the fingers in using the keyboard, without giving prime consideration to the psychological and behavioral needs of the learner.

It is a further object of the invention to help the pre-school child memorize his pictures and their locations on his/her glove fingers. The fact that the learner typist would not be able to see the images at the tip of his fingers is of no relevance to the scope of the present invention, since the pre-school child will not practise at the keyboard to begin with. The latter structural characteristic of the present invention sets it further apart from the prior art which primarily aimed at providing the learner typist with an unobstructed view of the key-finger assignment, without giving prime consideration to the impracticalities resulting from such a requirement (e.g. upward finger like extensions leaving the top of the hands).

It is also an object of the invention to address the dual needs of teenagers for peer group communication and secrecy towards facilitating their learning of the keyboard. There lies the motivation for choosing the picture rings that have the dual characteristics of being both attractive and mysterious.

It is a further object of the invention to provide mnemonic aids in terms of column (vertical series of images on each finger), row (lateral series of images handwide), and matrix (array of pictures on each picture-glove) to facilitate the memorization of the representation of the keyboard.

Another object of the present invention is to allow for tactile memorization of the shapes and textures of the pictures, thus enabling the use of these mnemonic gloves by a visually-impaired learner.

Another object of the present invention is to reinforce the memorization of the glove pictures by means of auditory and mental associations in the context of story-telling. For example, the puzzling shapes of the punctuation symbols on the right little finger (corresponding to the P-key) could be introduced to the pre-school child in a fun way with the intriguing story of Piggy (for the letter P):

"Once upon a time, there was a little Pig
named "Piggy".
Piggy was all pink but had a black tail.
Because of its black tail, the other little pigs
would not play with him.
So, Piggy was all alone, and very sad.
On the tenth day of Christmas, "Piggy" decided
to have fun and be happy in spite of all.
So, he went to pick the "dot" over the letter "i"
in his name "Piggy", and he attached its
black curly tail to it.
"Piggy" laughed so much when he realized
he had created a "semi-colon".
(Can you see the semi-colon on your Magic Gloves?)
Then, "Piggy" went on attaching the dot to
its black curly tail.
"Piggy" laughed so much when he realized
he had created a "question-mark".
(Can you see the question-mark on your Magic Gloves?)
"Piggy" was more and more happy about
his black tail.
When he pulled on his curly black tail,
he was so happily surprised to create a "slash".
(Can you see the "slash" sign on your Magic Gloves?).
With his new creative skills, "Piggy" felt brave enough
to go and challenge the other little pigs.
So, Piggy went and picked the "dot" from the "i"
in the name of another little Pig,
and he put it exactly above his own "dot".
When the other little pigs realized that "Piggy"
had just created a "colon", they all laughed so much.
(Now can you find the colon on your Magic Gloves?).
Now in the village, every little pig is talking about
"Piggy" and his black curly tail.

It is a further object of the invention to train the child how to relate the pictures with one-another on each finger in the context of story-telling, thereby setting the foundations for the intellectual framework that he/she will need later in his/her adult life in relating concepts, systems, and disciplines altogether.

It is also an object of the invention to educate the pre-school child to simultaneously deal with the concepts of limitation and freedom by motivating him to invent and tell his own stories within the limitation of the glove pictures, with the goals of:

1) training the pre-school child to simultaneously practise his lateral and vertical thinking;
2) indirectly raising the child's awareness to the future necessity of learning about the hardware/software limitations of the computer (e.g. programming language) to be able to use it as creatively and productively as possible;
3) exposing the child at a very early age to the art of compromise, in teaching him the importance of accommodating for the limitations of the outside world without suppressing his own creative abilities.

It is an advantage of the present invention to generate dynamic interactions between parents (or care-takers) and children, thereby involving the parents, or grandparents, in the child education at the earliest stages of the educational process.

The above as well as further objects, essential details and advantages of the invention will become apparent from the following detailed description of the devices, and their utilization in conjunction with the story-telling educational method.

BRIEF DESCRIPTION OF THE DRAWINGS

FIG. 20 depicts left and right hand moldings as an audio-visual-tactile aid for the sensory and sensory-motor development of the associations between a finger and the indicia corresponding to the keyboard keys to be struck by said finger. 20a: elevated view of said moldings. 20b: side view of the left hand molding shown in FIG. 20a.

DETAILED DESCRIPTION OF THE INVENTION

Figure 23A:
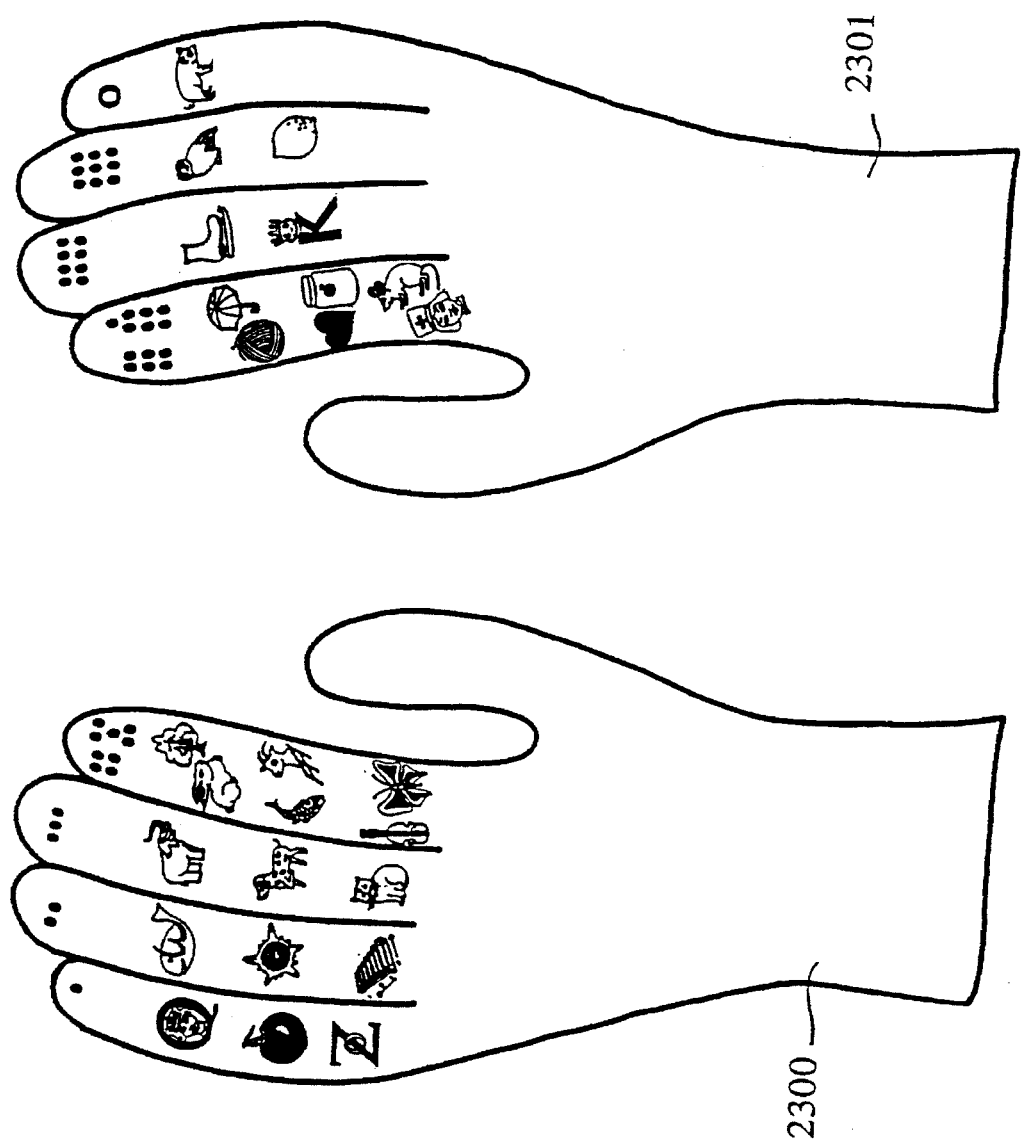
FIG. 23 depicts three-dimensional representations of left and right hands with indicia mounted on the fingers thereof, indicating: 23a: indicia of the rings on the associated fingers; 23b: characters of the keyboard keys to be struck by the corresponding fingers.
Figure 23B:
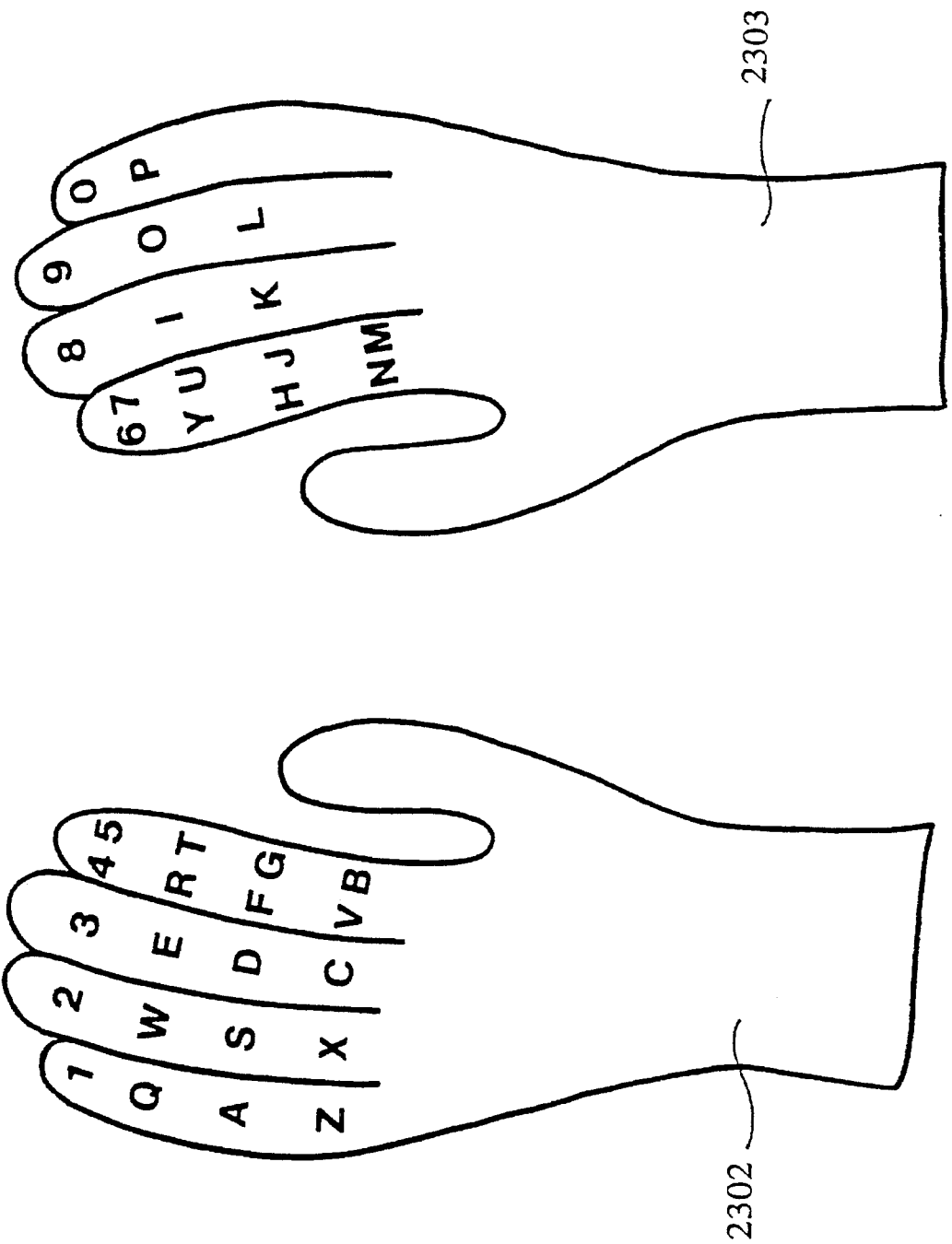

In accordance with the aforementioned needs, a system is proposed for teaching which keys of the keyboard are to be struck by which fingers. The system is founded on a finger-based representation of the keyboard as a wholistic entity for the consecutive stages of sensory-motor, pre-operational stage, concrete operations, and formal operations of Piaget's developmental psychology. From simple to complex, it is implemented in terms of glove representations (e.g. molding representations of gloves with fingers as shown in FIGS. 23a and 23b), gloves with fingers, and sets of rings. The disclosed educational devices using a process-based educational method account not only for the learner's needs and limitations at every stage of growth and development, but also for the needs of today's working parents in terms of lack of time, money, and energy in dealing with the education of their children.

Sensory-Motor Stage

Figure 19:
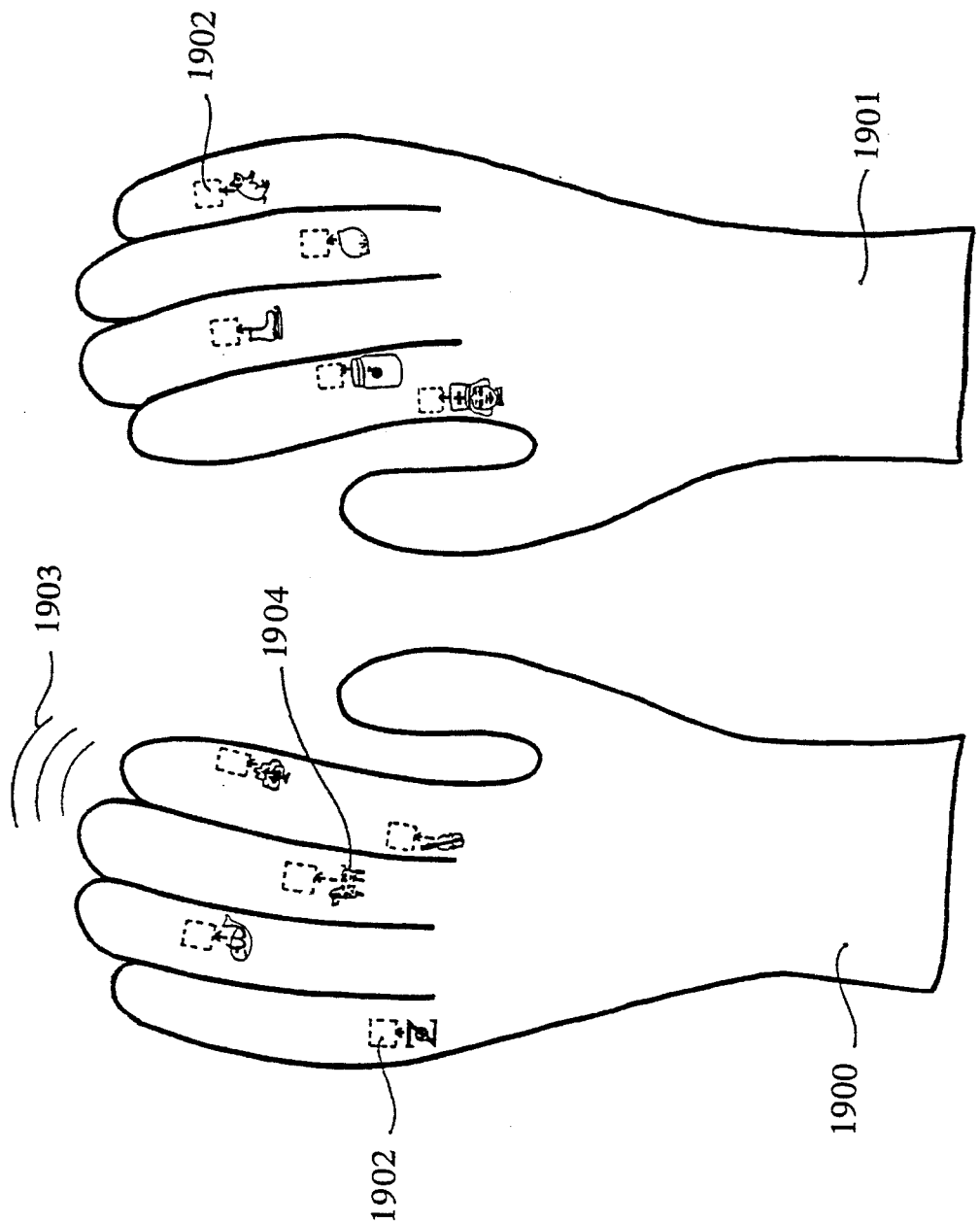
FIG. 19 depicts the elevated view of left and right hand moldings as an audio-visual-tactile aid for the sensory and sensory-motor development of the association between a finger and an indicium corresponding to a keyboard key to be struck by said finger.
Figure 20A:
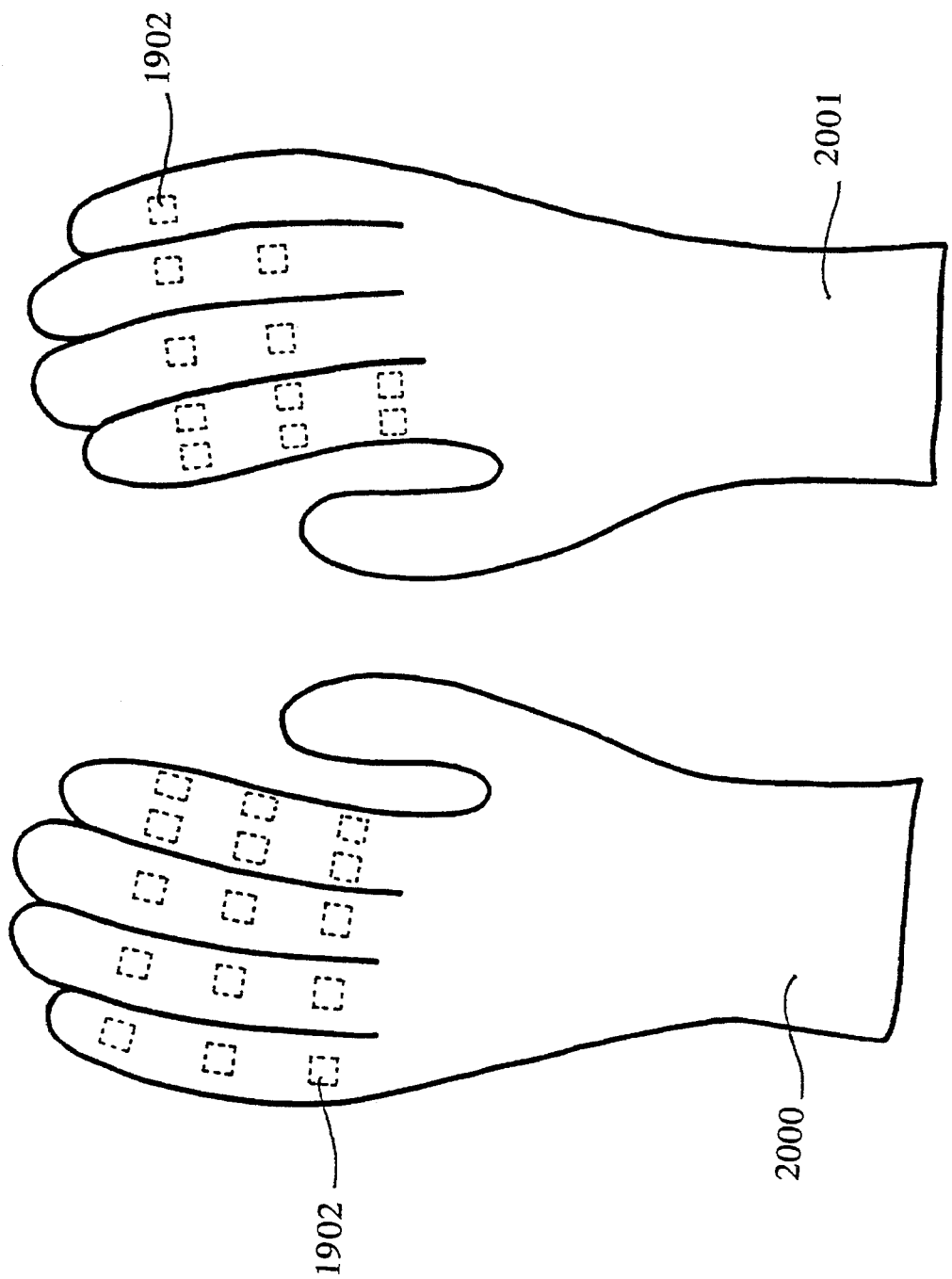
Figure 20B:
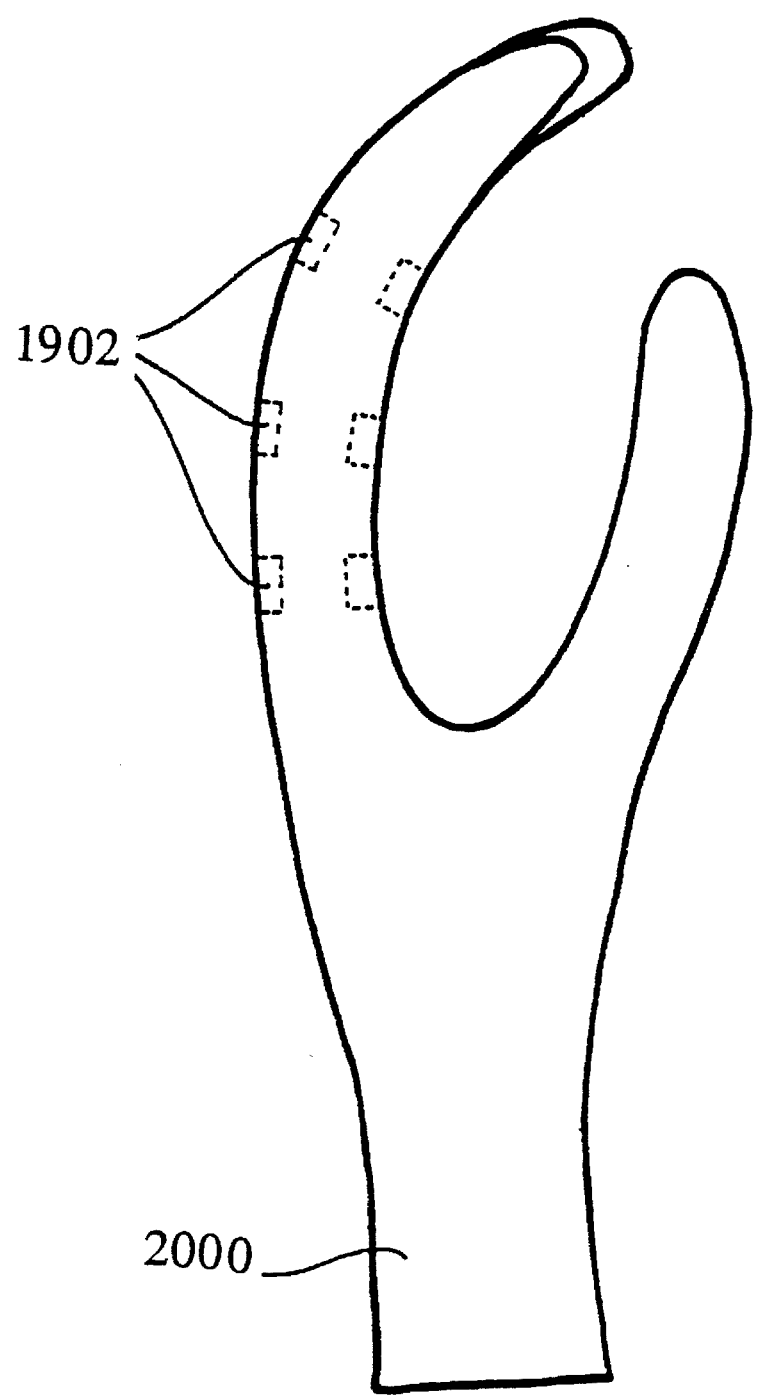

At this stage, the child has not yet learned to use symbols and language to label objects and events in his environment. He is dependent on the raw evidence of his senses and bodily actions. The child gradually gets to know his environment in terms of sensory impressions and motor activities. For this age group, the educational value of a "toy" depends not only on its ability to interest the child (by giving him the opportunity to develop his sensory-motor skills), but also on its ability to contribute to the overall learning process (by giving the child the opportunity to be "exposed" to symbolic representations or patterns that will play an important role later in his life). From that perspective, the child's growth and development can benefit from the playful use of little molded hands whose fingers are colored following a pattern that matches the color-coding of the keys of the keyboard. FIG. 19 depicts such left and right molded hands 1900 and 1901; FIG. 20 depicts another such a pair of left and right molded hands 2000 and 2001. By pressing and pulling the fingers of these little molded hands, the child will strengthen his motor skills. The diversified colors of the molded fingers will stimulate the development of the child's visual information processing. As he grows, his perception of differences and similarities of his fingers will be enhanced. At the same time, the child will also be exposed to the global color pattern of the key-finger assignment of the keyboard. Sounds could also be generated by sound generating devices 1902 mounted to the molded fingers, and actuatable by tactile pressure, to stimulate the child's auditory perception and motor activity, while "exposing" him further to the associative pattern of the key-finger assignment of the keyboard. As illustrated in FIG. 19 which depicts the elevated view of three-dimensional left and right hand moldings 1900 and 1901, squeezing the left major finger which is associated with the letter "D" of the keyboard would emulate the sound 1903 of a barking "Dog" 1904.

These molded hands are an audio-visual, tactile means serving the purpose of showing the correspondence between the indicia of a particular ring and specific keys of the keyboard to be struck by the finger which wears that particular ring. Another example of audio-visual-tactile means includes a first representation of a left hand indicating the indicia of the rings of the fingers of the left hand, and a second representation of the left hand indicating the corresponding letters and symbols of the specific keys to be struck by the fingers of the left hand. A similar pair of representations of the right hand could also be made. Both representations are shown in FIGS. 23a and 23b.

Pre-School Age Group

First Phase: Picture Gloves

Although the pre-school child has not yet learned his alphabet, he is very receptive to associations between images and spoken words. This receptivity is the basis for providing the pre-school child with a pair of gloves carrying a series of images on their four left/right fingers. The spatial distribution of the images on the four fingers of each glove is determined as follows. The position of an image on a glove matches the position of the key of the keyboard which bears the initial letter of the (spoken) word representing the said image. This procedure is explained in detail by comparing the standardized keyboard 100 of FIG. 1 with the drawings of the left-hand glove 200 and right-hand glove 201 in FIG. 2a and FIG. 2b, worn on the left hand 202 and the right hand 203 of a user respectively.

Figure 1:
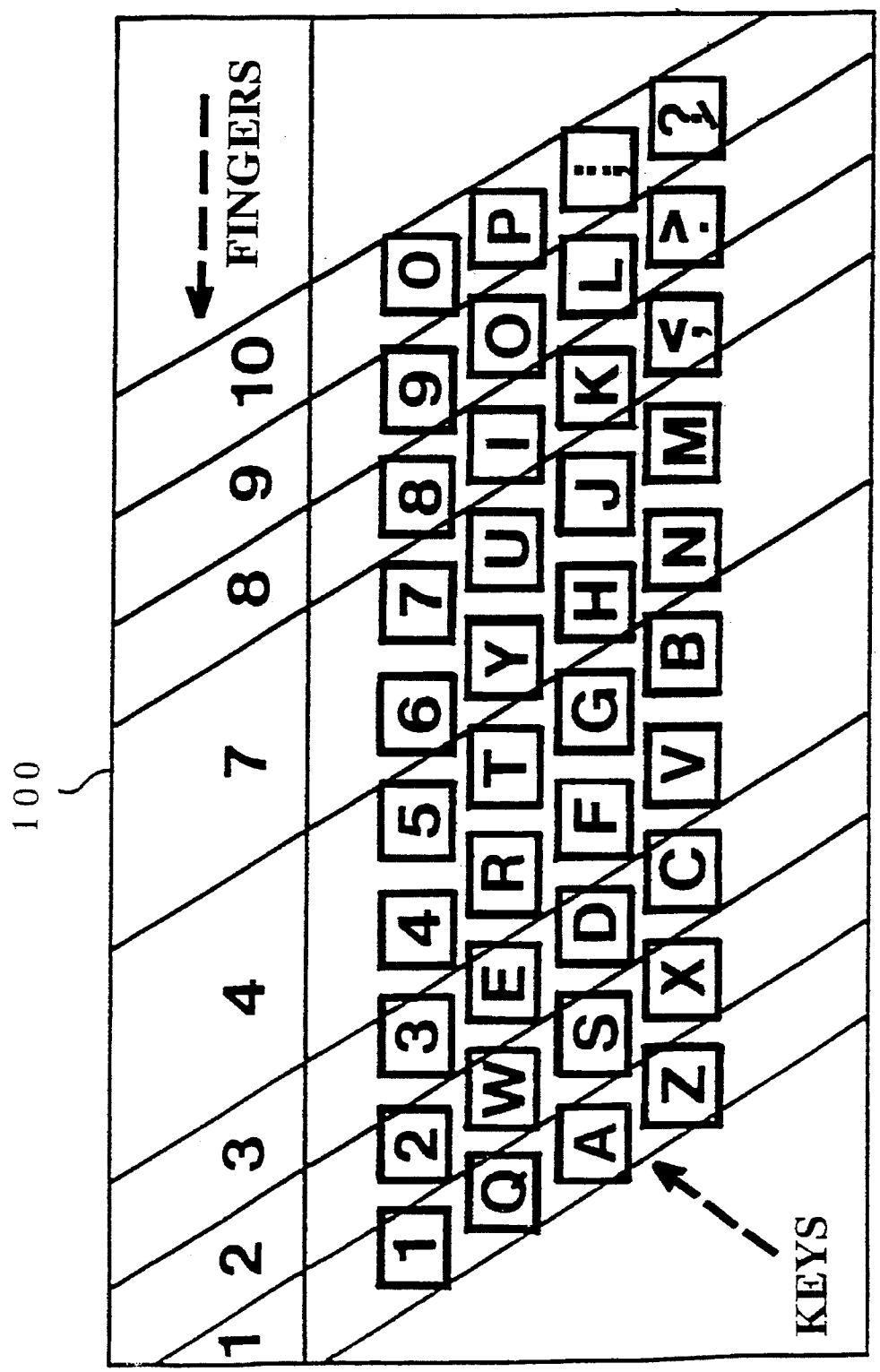
FIG. 1 is a matrix representation of the standardized keyboard (letters, numbers, and punctuation symbols) which indicates the key-finger assignment.
Figure 2A:
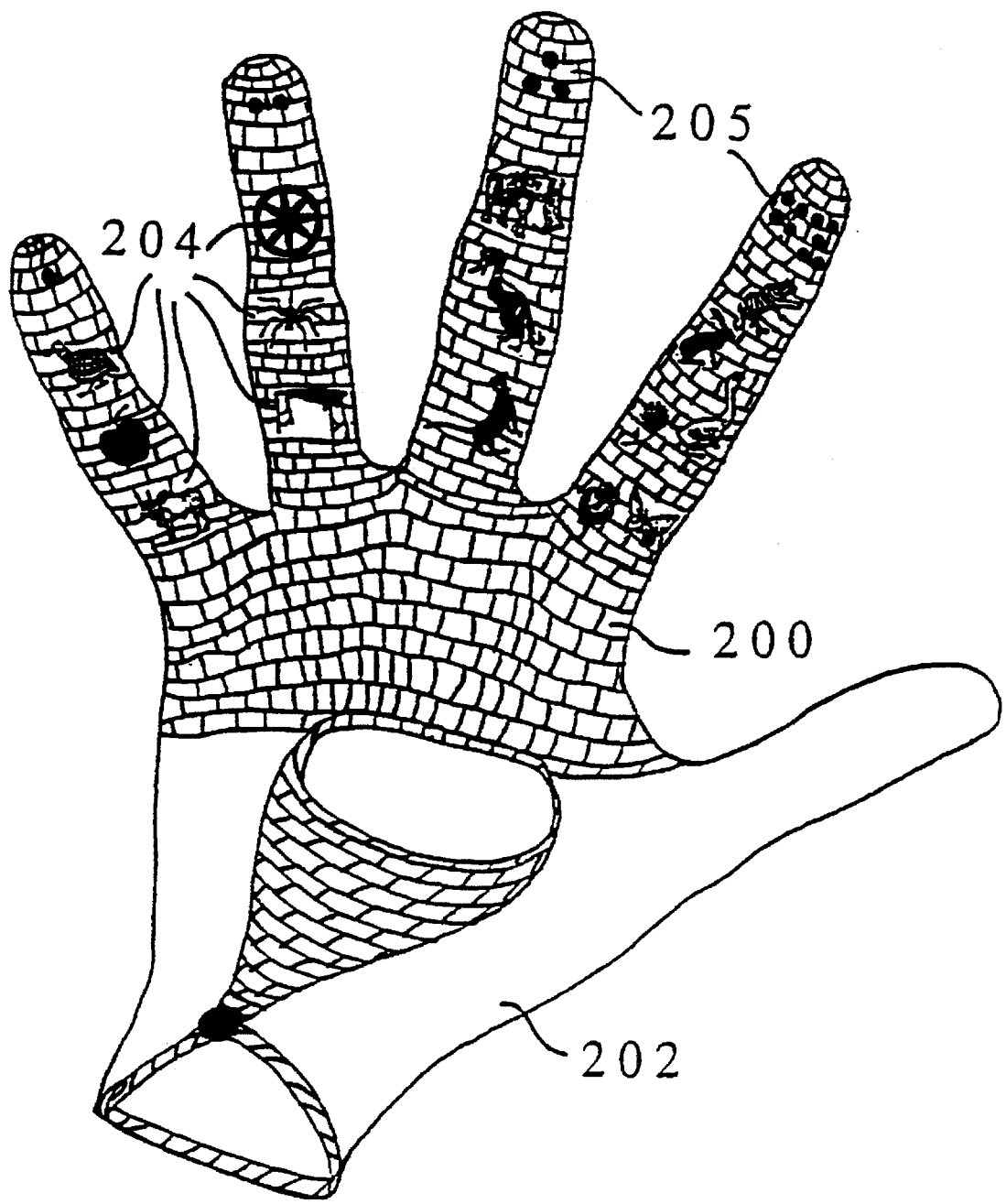
FIG. 2 depicts elevated views of the back-portion of picture gloves with color-coded fingers: 2a: left-hand glove with picture-indicia worn on the left hand of a user; 2b: right-hand glove with picture-indicia worn on the right hand of a user.

In FIG. 2a, the little finger carries from bottom-to-top the pictures 204 of a "Zebu", an "Apple", and a "Quail"; thus matching the series of letters "ZAQ" of the first column in FIG. 1. The second finger carries the pictures 204 of a "Xylophone", a "Spider", and a "Wheel"; thus matching the series of letters "XSW" of the second column of FIG. 1. The third finger carries the pictures of a "Cat", a "Duck", and an "Elephant"; thus matching the series of letters "CDE" of the third column of FIG. 1. The fourth finger carries two series of pictures slightly shifted from each other. The series of pictures that are shifted to the left is a "Vase", a "Flower", and a "Rabbit"; thus matching the series of letters "VFR" of the fourth column in FIG. 1. The other series of pictures (shifted to the right) is a "Butterfly", a "Goose", and a "Tiger"; thus matching the series of letters "BGT" of the fifth column in FIG. 1. Therefore, the left-hand picture-glove also identifies the correspondence between left-hand fingers and the columns of the keyboard: little finger strikes column 1, second finger strikes column 2, third finger strikes column 3, fourth finger strikes columns 4 and 5. This finger/column association can be reinforced during training by color-coding the keys of the keyboard 100 to match the four different colors of the four fingers of the left-hand glove 200, which would have to be standardized. For example in FIG. 2a, the choice of colors is pink for the little finger, red for the second finger, green for the third finger, and yellow and orange for the fourth finger.

The tip of each finger of the left-hand picture glove 200 in FIG. 2a shows a cluster of black dots 205. The number of dots 205 in each cluster is chosen to coincide with the number printed on the matching key of the keyboard. The single dot on the little finger matches number "1" on the upper key in column 1 of FIG. 1. The two dots on the second finger tip match number "2" on the upper key in column 2 of FIG. 1. The three dots on the third finger tip match number "3" on the upper key in column 3 of FIG. 1. The fourth finger tip of the left glove shows two clusters of dots that are slightly shifted. The cluster shifted to the left has four dots to match number "4" on the upper key of column 4 in FIG. 1, whereas the cluster shifted to the right has five dots to match number "5" on the upper key of column 5 in FIG. 1. This structure is beneficial to the education of the pre-school child age group. First, it will help the child to learn how to count on the fingers of his hands while becoming familiar with the concept of symbol or abstract representation. Second, he will learn how to do that by associating each number with the finger that will be used later to strike the matching key on the keyboard.

Figure 2B:
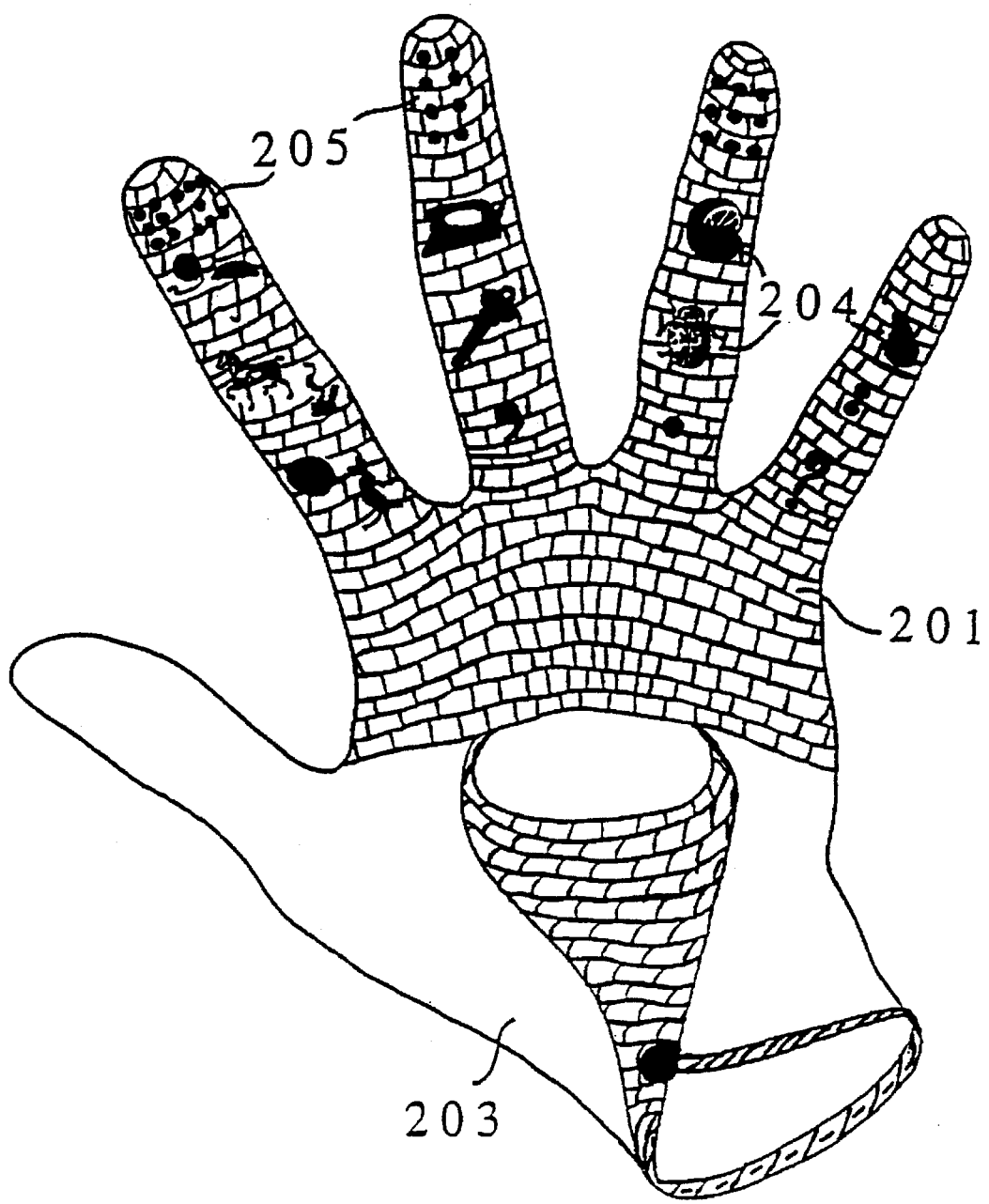

The functional role of the right-hand picture-glove 201 depicted in FIG. 2b is the same as above. The little finger shows a "Pear" 204, matching the "P" key of the 10th column of FIG. 1; the second finger shows a "Ladybug" 204 and an "Orange" 204, matching the "LO" keys of the 9th column; the third finger shows a "Key" and an "Iron", matching the "KI" keys of the 8th column; the fourth finger shows a "Mouse", a "Jack-in-the-box", and an "Umbrella" (shifted right), and a "Nut", a "Horse", and "Yarn" (shifted left), matching the "MJU" keys of the 7th column and the "NHY" keys of column 6 in FIG. 1. The association between fingers and keyboard columns is reinforced by color-coding the little finger in pink, the second finger in red, the third finger in green, and the fourth finger in yellow and orange.

Like with the left-hand glove 200, the finger tips of the right-hand glove 201 show clusters of black dots 205 to symbolize the number printed on the matching keys of the keyboard 100. The little finger tip shows the number "0" itself to match the upper key of column 10 in FIG. 1. The nine dots on the second finger tip match number "9" on the upper key of column 9 in FIG. 1. The eight dots on the third finger tip match number "8" on the upper key of column 8 in FIG. 1. The fourth finger tip shows two clusters of black dots slightly shifted from each other. The right-shifted cluster has seven dots, and matches number "7" on the upper key of column 7 in FIG. 1, whereas the six dots of the left-shifted cluster match number "6" on the upper key of column 6 in FIG. 1.

By construction, the choice of images 204 of the picture gloves 200 & 201 is clearly not unique, and by no means restricted to the choice given in FIG. 2a and FIG. 2b. In FIG. 2a for example, one could choose the picture 204 of a "Queen" instead of a "Quail". The only requirement is that the initial letter of the word representing the picture matches the key which occupies the same position, as illustrated above. Nevertheless, because of the associative nature of the memorizing process, enhanced memorization performance will result from choosing pictures which share some common features, and which are most appropriate to the age of each small child. For example, at an age when the child discovers the fairy tale of Snow-White, a pertinent choice for the pictures 204 on the little finger of the left-hand could be a mean-looking "Queen", an "Apple", and the "Zees" of Snow-White lying on her bed, plunged in a deep sleep after eating the cursed apple given to her by the mean queen. Such a pictorial representation of Snow-White's fairy tale would take definite advantage of the child's driving-time[3]), and enhance visual memorization by the child.

[3] Brodey, M. W.: "Information Exchange In The Time-Domain", 122nd Annual Meeting of the Psychiatric Association, Atlantic City, N.J., May 9th–13th, 1966.

Such picture correlations towards enhanced visual memorization can be need-adaptively implemented throughout the child's growth. During early childhood for example, the child could wear picture gloves illustrating family relationship. As the child grows older, he could wear picture gloves with more emphasis on cultural or social content for example. Picture gloves could thus be manufactured according to a certain theme, following the procedure described above and using screen-printing or "decal" technologies that are known to be safe for the very young children. A cost-effective alternative to having multiple pairs of gloves is proposed as a single pair of gloves with removable pictures. For older children, the latter structure would be done by printing on the glove VELCRO bases instead of pictures. VELCRO is a registered trademark for hook and loop fasteners which are manufactured by Velcro Inc. of Manchester, N.H. Such fasteners are well known in the art and comprise a plurality of small hooks affixed to one surface and a plurality of complementary loops affixed to another surface. The pictures would be separate entities with a VELCRO back that could be easily attached on, or removed from, the complementary VELCRO base of the gloves. Letters matching the keys of the keyboard should be printed on the proper VELCRO bases of the gloves. This would indicate unambiguously where to put the pictures on the gloves in accordance with the touch-typing/training procedure described above. As another alternative, the pictures could also be mounted on flexible labels that would be inserted within transparent covers permanently mounted on each one of the four fingers of each hand. Such a transparent cover could be made of plastic, or knitted laces, depending on the structure of the gloves. Of course, proper setting of such need-adaptive picture gloves would require close supervision of the child by an adult.

For safety, economy, comfort, and beauty purposes, the picture gloves can be made of cotton, or any kind of see-through material. They can also be crocheted out of cotton, When crocheted, the picture gloves are stretchable, so that a pair of gloves can be worn by children with hands of different size, or by the same child during his pre-school growth. Besides this economical advantage, crocheted cotton provides comfort by not retaining sweat on the fingers, but instead letting the skin breath openly. In winter time however, picture gloves that cover entirely the hands may be needed when the child is playing outside.

In summary, these pedagogical picture gloves are:

1) convenient and functional;
2) safe and comfortable;
3) fun and unique;
4) colorful and attractive;
5) fundamental to learning;
6) cost-effective.

Second Phase: Alphanumeric/Picture Gloves

Figure 3A:
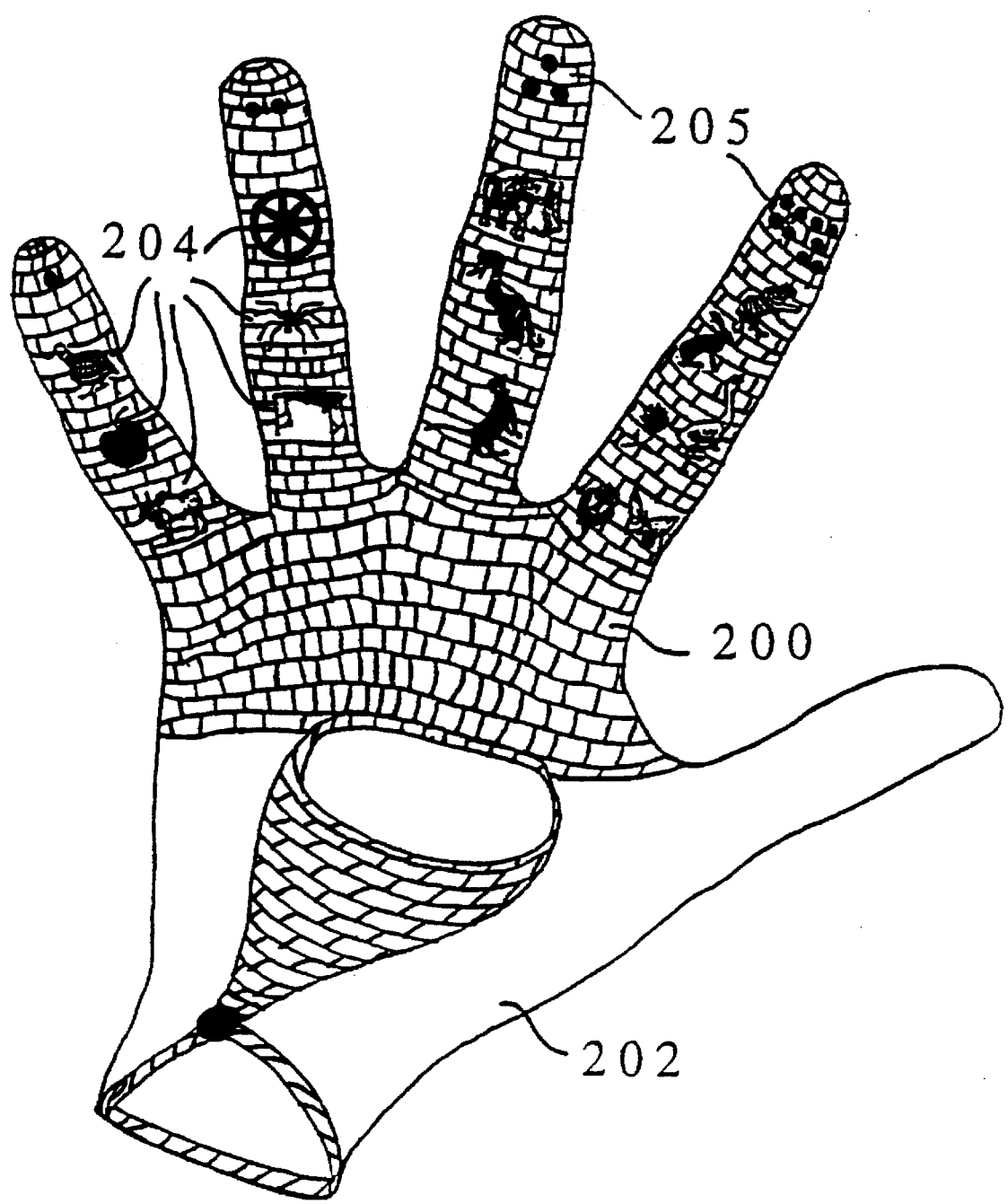
FIG. 3 depicts elevated views of gloves with color-coded picture-indicia on the back portions (illustrated with a first style of gloves) and alphanumeric-indicia on the palm portions (illustrated with a second style of gloves): 3a: back portion of a first left-hand glove with picture-indicia; 3b: palm portion of a second right-hand glove with alphanumeric indicia; 3c: back portion of a first right-hand glove with picture indicia; 3d: palm portion of a second left-hand glove with alphanumeric indicia.
Figure 3B:
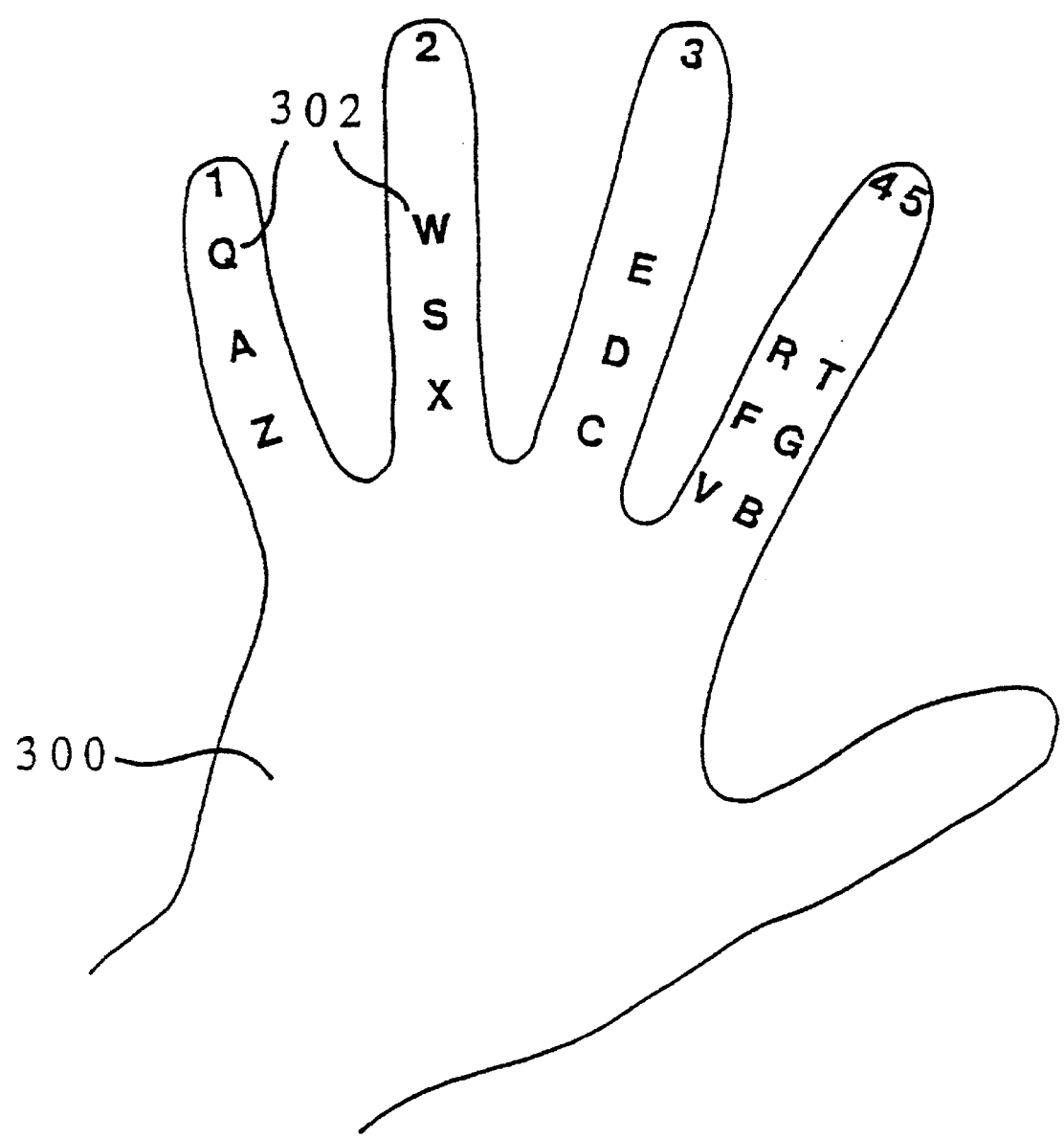
Figure 3C:
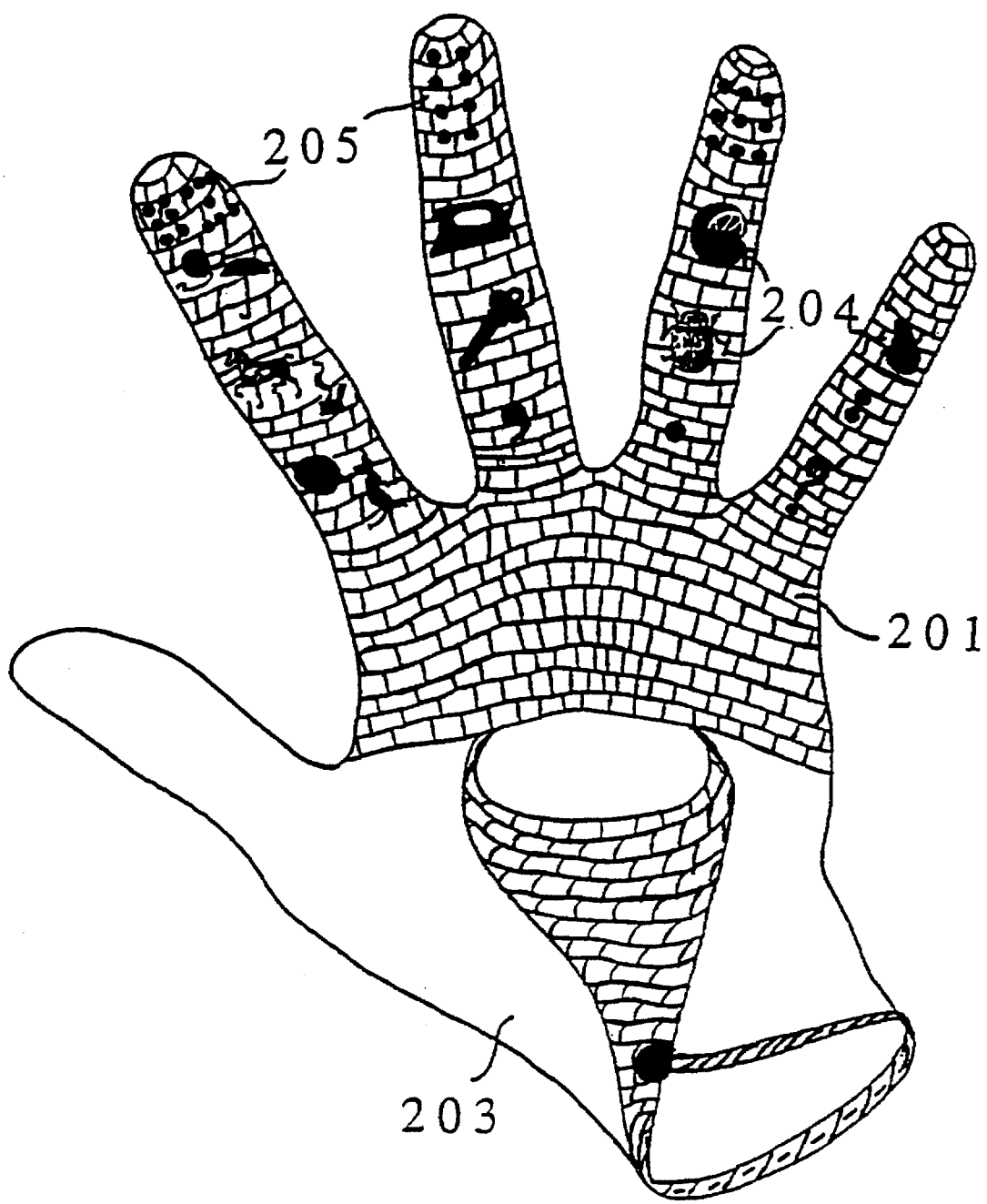
Figure 3D:
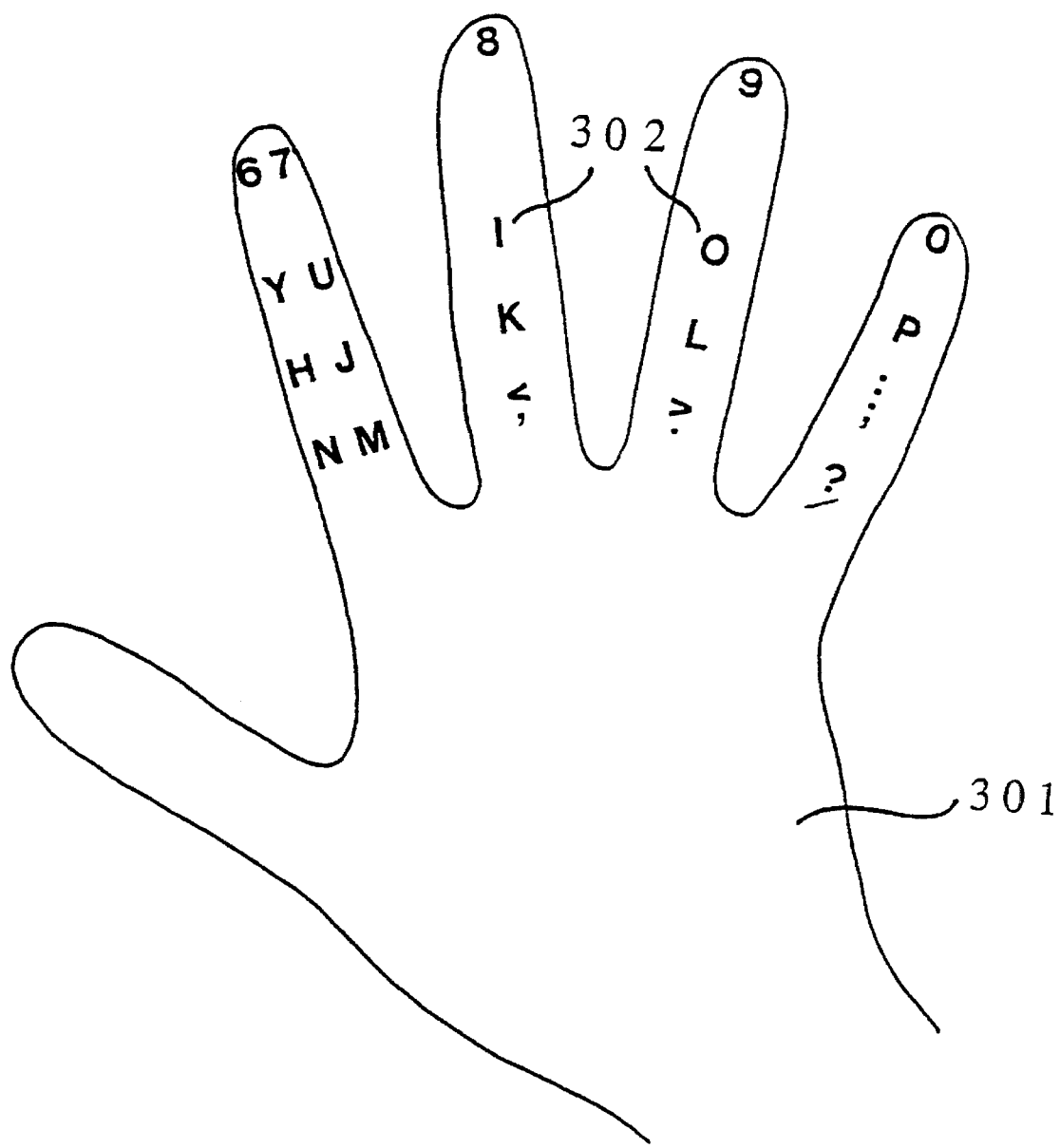
Figure 4A:
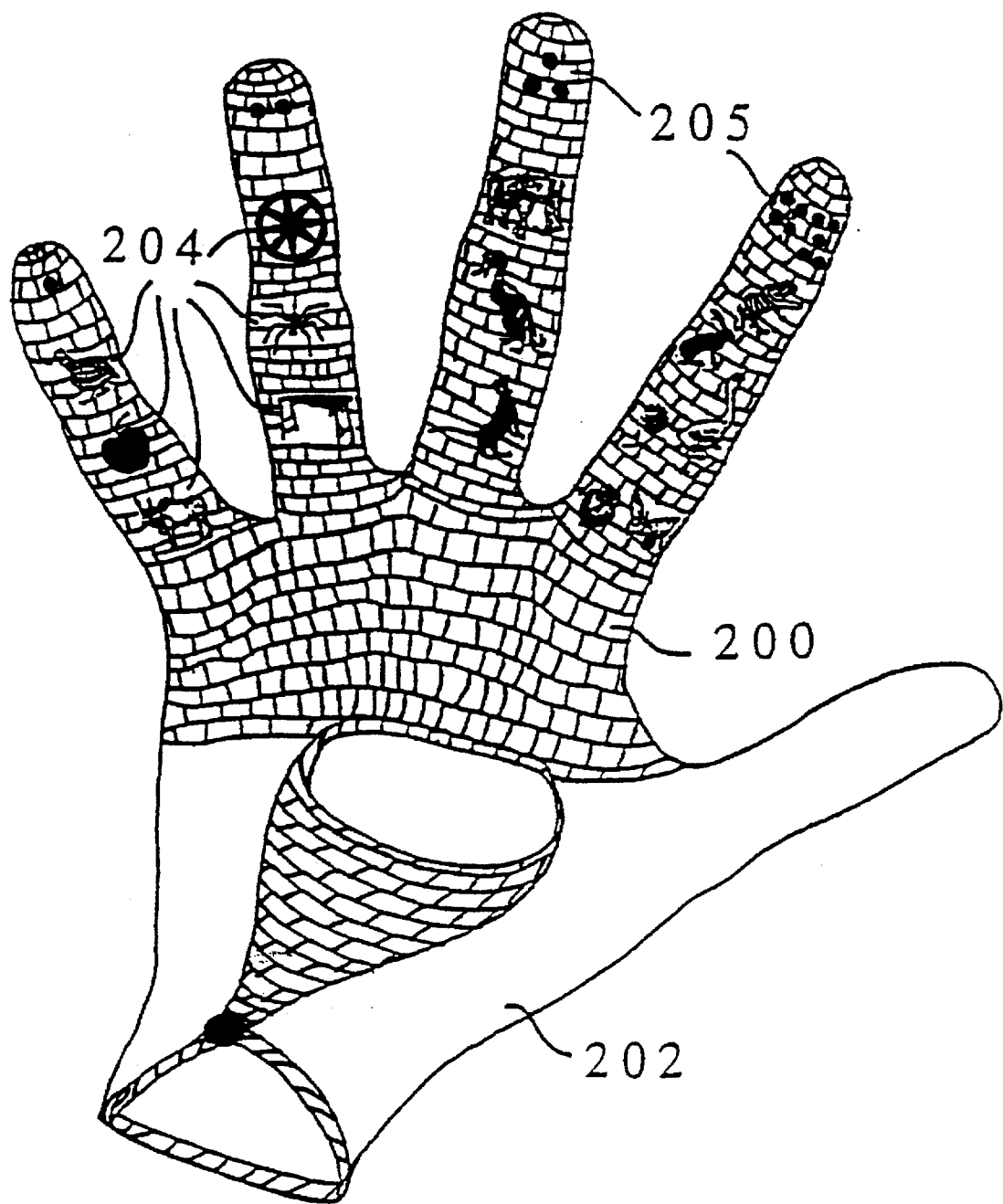
FIG. 4 depicts elevated views of gloves with object-indicia on the back portions (illustrated with a first style of gloves) and raised Braille-indicia on the palm portions (illustrated with a second style of gloves) for use by a visually impaired person: 4a: back portion of a first left-hand glove with object-indicia; 4b: palm portion of a second right-hand glove having Braille indicia, with a possible opening in the thumb portion for tactile recognition; 4c: back portion of a first right-hand glove with object-indicia; 4d: palm portion of a second left-hand glove having Braille indicia, with a possible opening in the thumb portion for tactile recognition (together with a side view of the Braille representation of the letter "p").
Figure 4B:
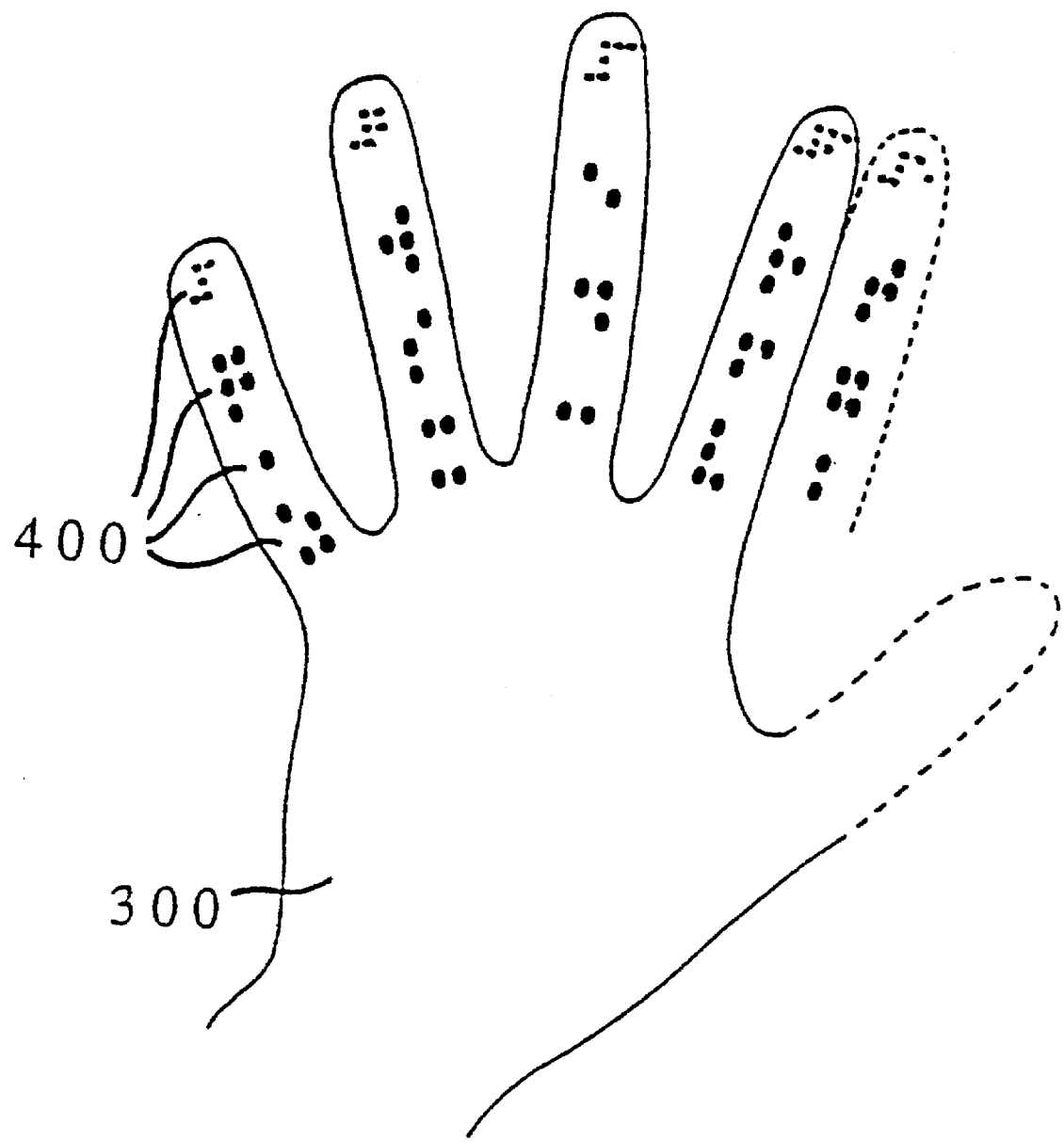
Figure 4C:
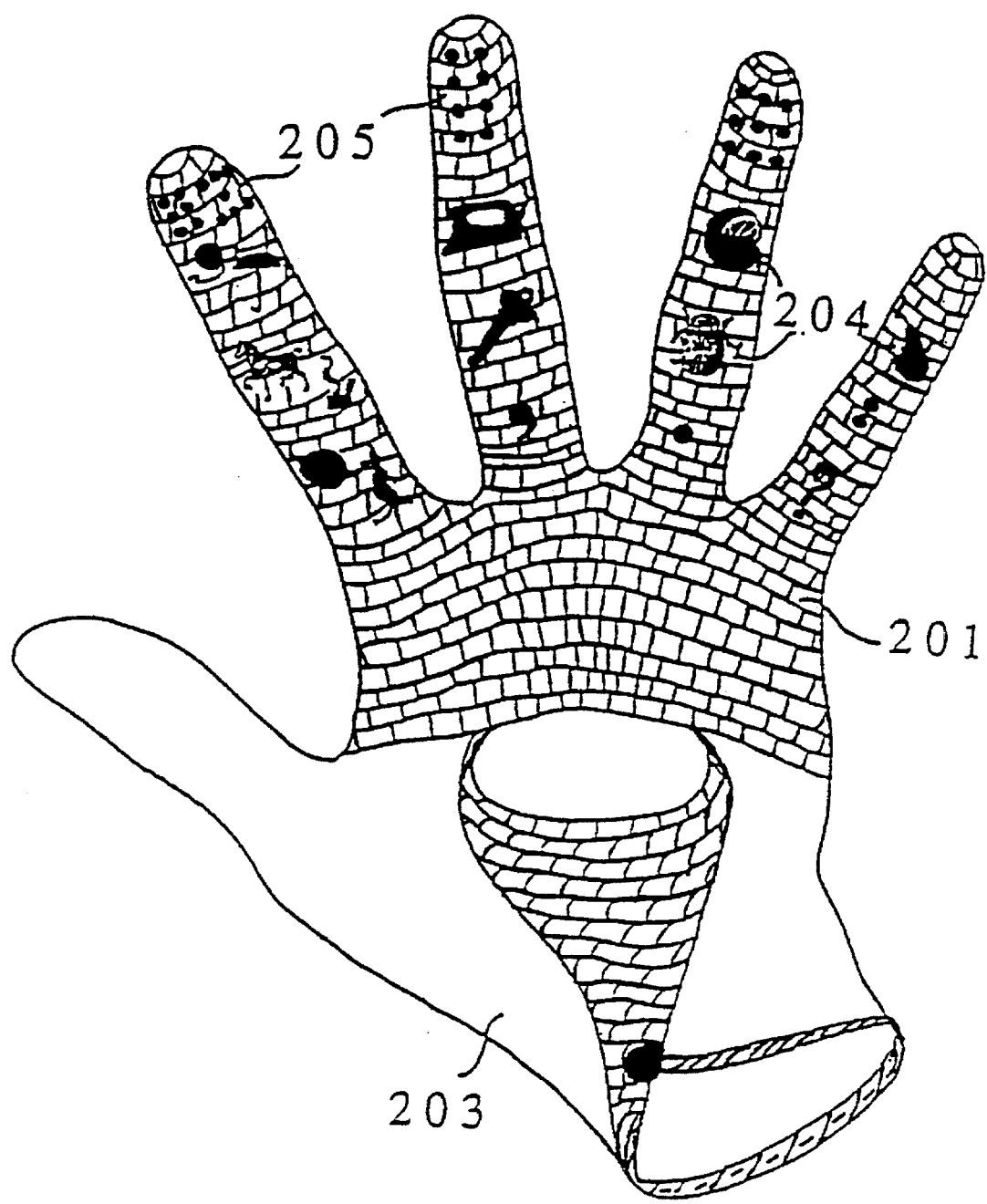
Figure 4D:
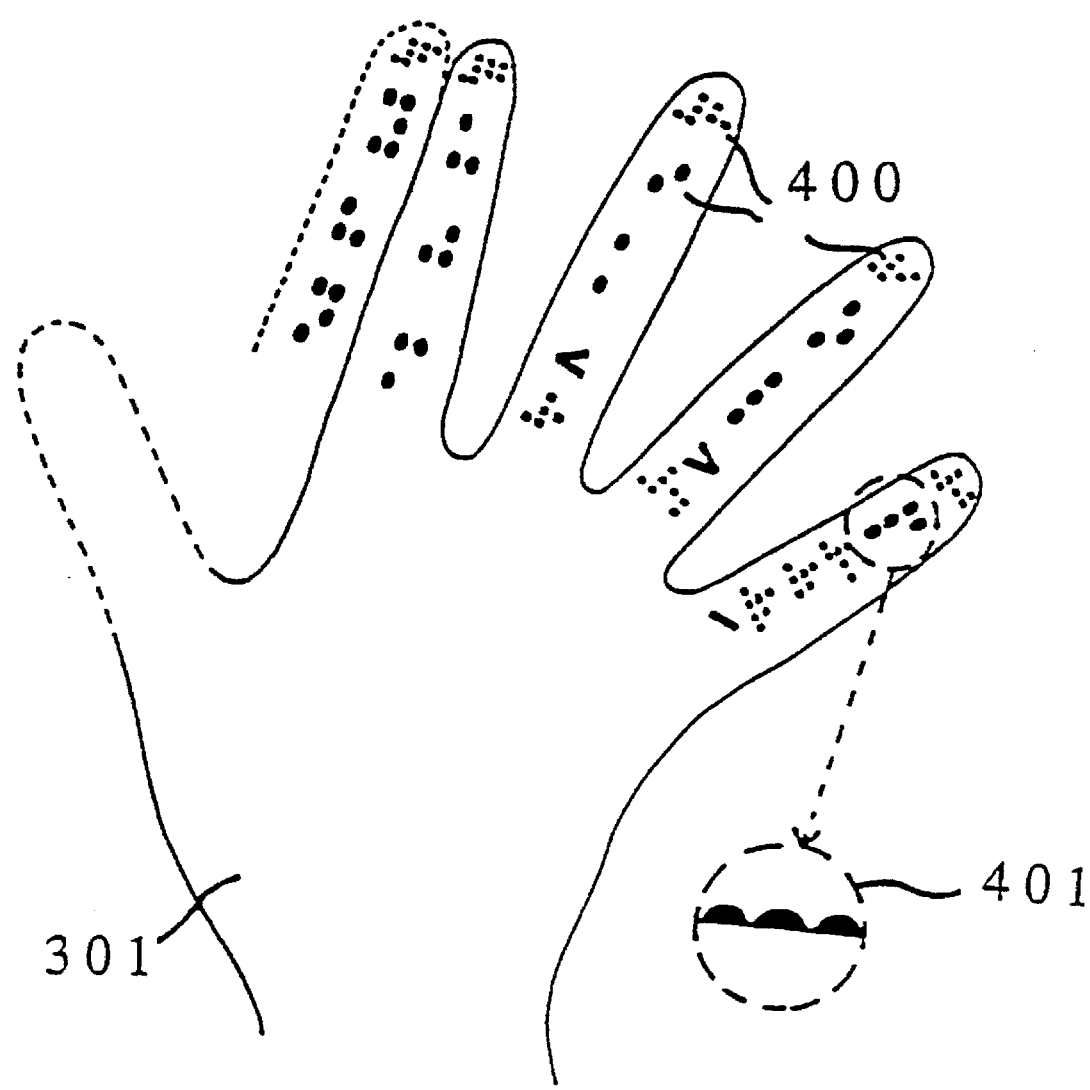
Figure 5A:
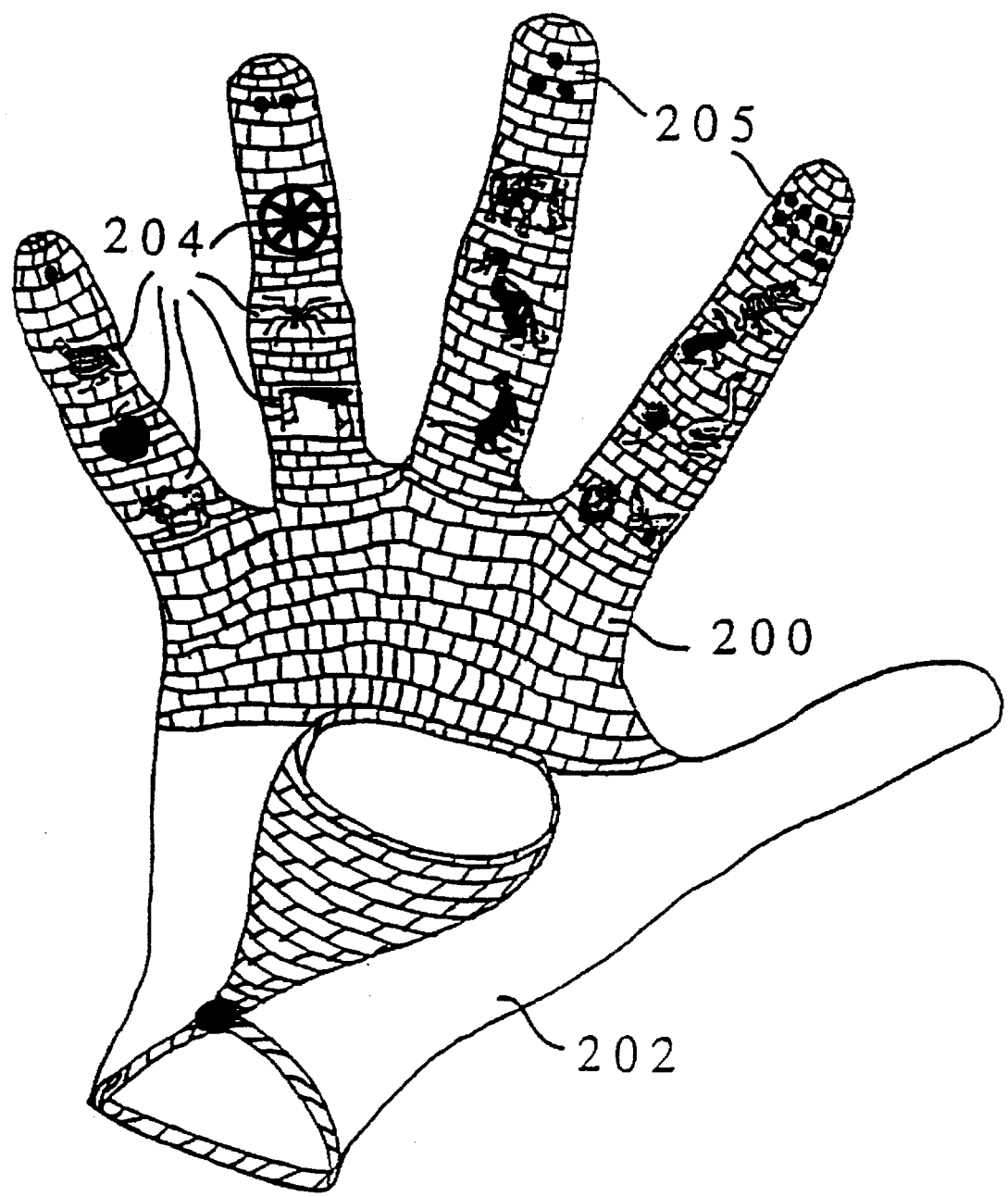
FIG. 5 depicts elevated views of gloves with color-coded picture-indicia on the back portions (illustrated with a first style of gloves) and sign-language-indicia on the palm portions (illustrated with a second style of gloves) for use by a hearing-impaired person: 5a: back portion of a first left-hand glove with picture-indicia; 5b: palm portion of a second right-hand glove with sign-language indicia; 5c: back portion of a first right-hand glove with picture-indicia; 5d: palm portion of a second left-hand glove with sign-language indicia.
Figure 5B:
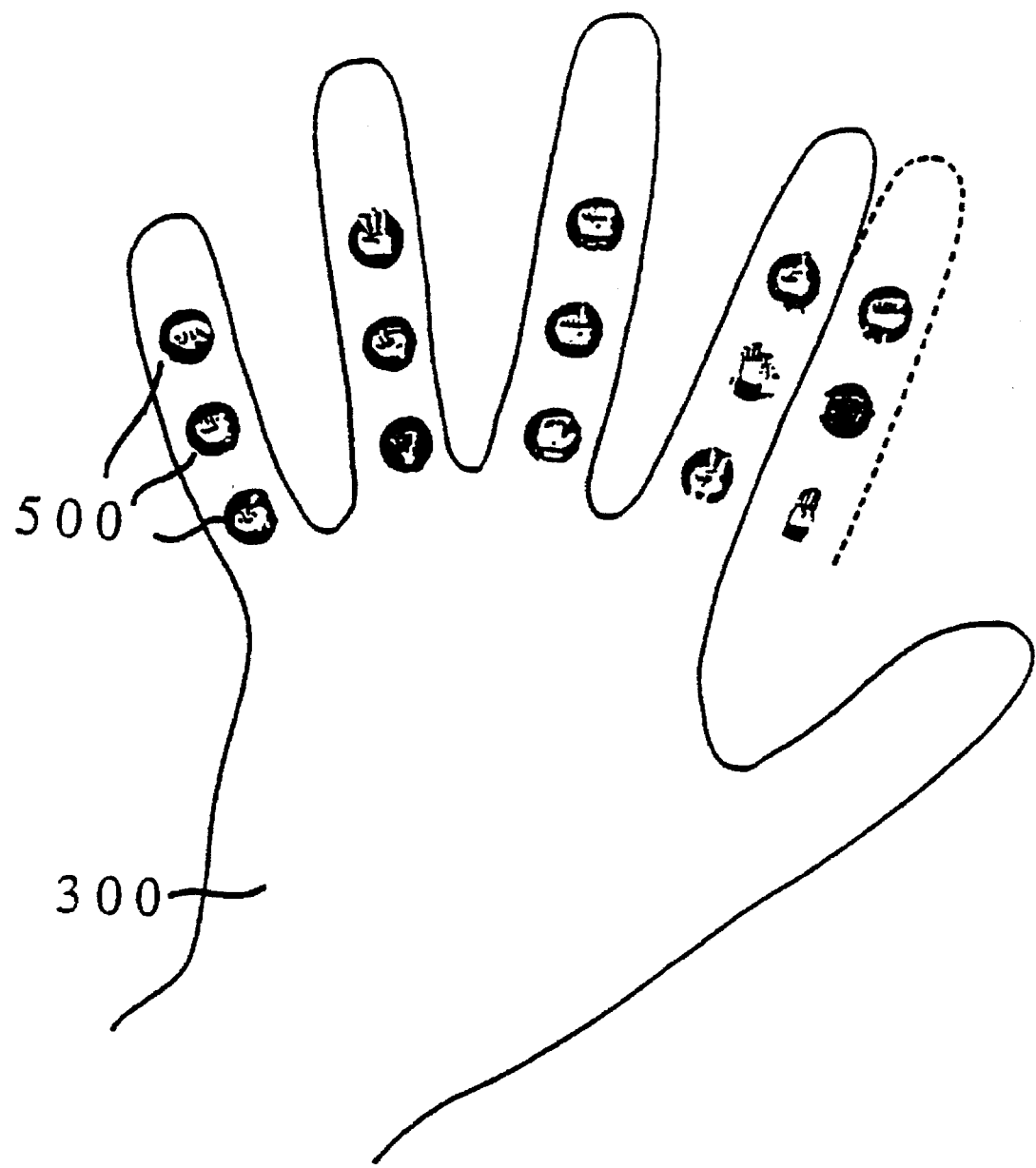
Figure 5C:
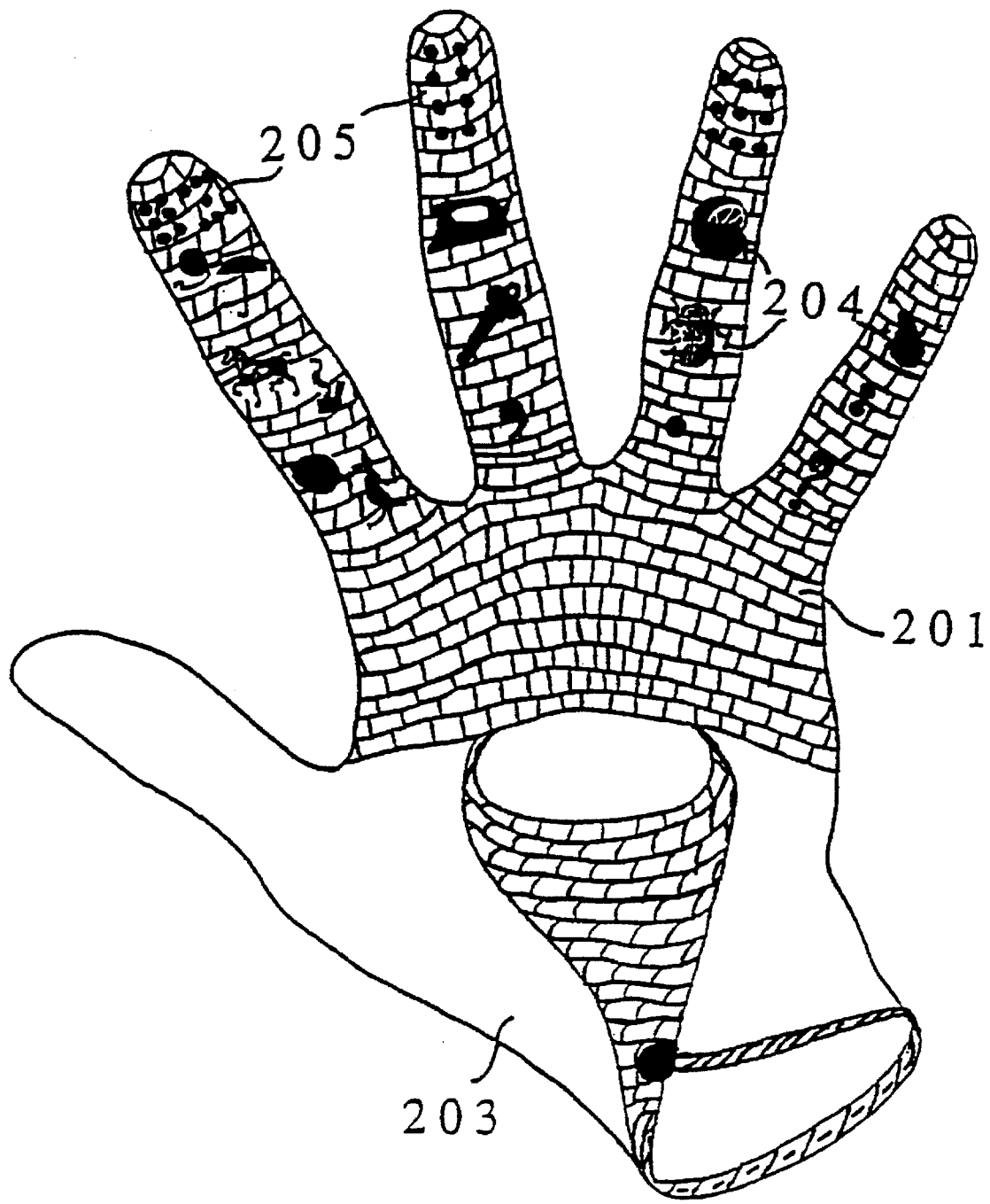
Figure 5D:
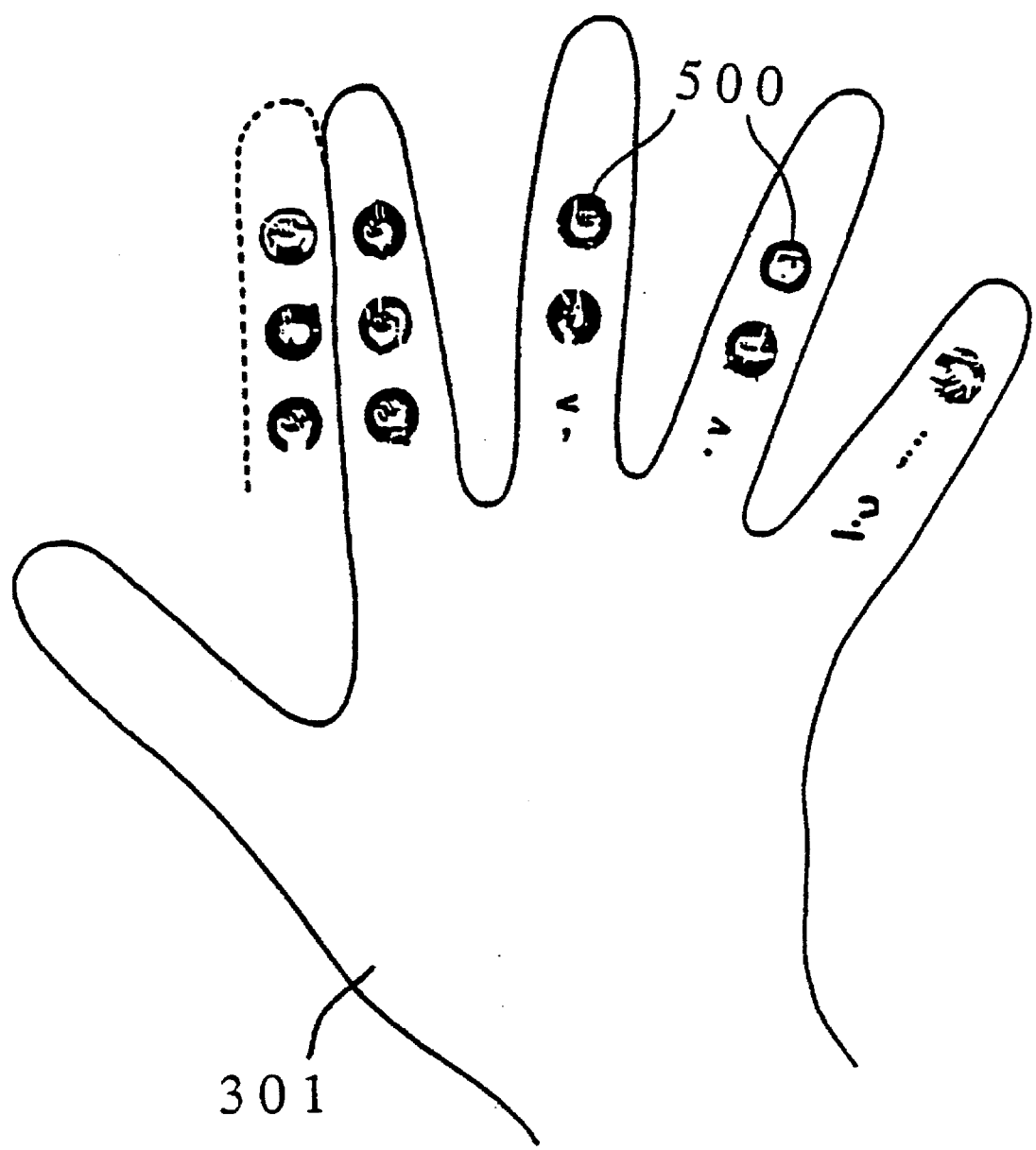

The pre-school age child who would be highly exposed to his glove images would visually memorize the spatial mapping of the spoken words which represent these images. Learning with this glove will be continuous and dynamic. Before reaching the school age, the child will start learning the alphabet by wearing the alphanumeric/picture gloves depicted in FIG. 3, and which show how to associate the initial letter of the name of a picture with the picture itself. As shown in FIG. 3, the alphanumeric/picture gloves provide the same pictorial representation of the keyboard as the picture gloves on the back sides 200 & 201 of the gloves, yet with an additional alphanumeric representation of the keyboard on the palm sides 300 & 301 of the gloves. As shown in FIG. 3a & 3b, the letters, numbers, and punctuation symbols of the keys to be struck by the fingers of the left hand are indicated on the palm-side 300 of the corresponding fingers of the right-hand glove. For example, the letters 302 "Q", "A", and "Z" corresponding to the keys to be struck by the left little finger are precisely indicated on the palm side 300 of the little finger of the right-hand glove. Likewise in FIGS. 3c & 3d, the letters, numbers, and punctuation symbols of the keys to be struck by the fingers of the right-hand are indicated on the palm-side 301 of the corresponding fingers of the left hand glove.

To learn the alphabet and the numbers, the pre-school child wearing the gloves would simply have to turn one of his hands to see the correspondence between each letter and the picture which occupies the same position on the opposite hand, and which picture name begins with the same said letter.

Visually-impaired learners would benefit from the same learning process by wearing Braille-Alphanumeric/Picture Gloves which provide a Braille representation of the alphanumeric keys of the keyboard 100 on the palm sides of the gloves, as shown in FIG. 4. The palm portions of the thumbs of both Braille-Alphanumeric/Picture Gloves are left open; and the alphanumeric characters are made of raised dots 400 to enable their tactile recognition by the person wearing the gloves, as shown in FIG. 4d by the side-view 401 of the Braille representation of the letter "P" located on the palm-side 301 of the left little finger. These raised dots 400 could be cost-effectively implemented by using "puffy" screen-printing techniques. The pictures 204 on the back-side of the Braille-Alphanumeric/Picture Gloves could also be implemented as raised surfaces using the latter techniques, or as three-dimensional objects mounted on the glove fingers in order to facilitate their tactile recognition by the visually-impaired learner wearing the gloves.

Hearing-impaired learners would also benefit from the same learning process by wearing the Sign-Language-Alphanumeric/Picture Gloves which provide a Sign-Language representation 500 of the alphanumeric keys of the keyboard on the palm sides of the gloves, as shown in FIG. 5.

School Age Group

Alphanumeric Gloves

When the child leaves the pre-school age and enters the school age, he will normally know very well his alphabet and the numbers, if not more. As the child acquires or further develops his writing/reading skills, he can be given the (additional) opportunity to memorize the key-finger assignment of the keyboard by wearing the Alphanumeric Gloves shown in FIG. 6. The alphanumeric gloves provide a precise representation of the keyboard on the back-side of the glove fingers, by indicating the letters, numbers, and punctuation symbols of the keys to be struck by the corresponding fingers.

To learn the alphabet in the context of the key-finger assignment of the keyboard, the pre-school child wearing the alphanumeric/picture gloves had to turn the palm of one of his hands towards him. After learning his alphabet, the child wearing the alphanumeric/picture gloves would have had to turn the palms of his both hands, then bring his right palm on his left-hand side, and his left palm on his right-hand side, to obtain the whole representation of the keyboard as it would appear when practising at the keyboard. There lies the motivation for the process-driven evolution of the alphanumeric/picture gloves of FIG. 3 into the alphanumeric gloves of FIG. 6: providing the child knowing his alphabet with a means for visualizing and memorizing the keyboard as it would appear to him if he were actually practising at the keyboard.

If a school child had previously learned his alphabet with the alphanumeric/picture gloves, wearing the alphanumeric gloves would reinforce his visual memorization of the keyboard. If a school child had never used the alphanumeric/picture gloves, he would still be given the opportunity to learn the key-finger assignment of the keyboard by wearing the alphanumeric gloves and/or the alphanumeric/picture gloves, whatever the choice. In both cases, the child will memorize the key-finger assignment of the keyboard before even using a keyboard. As a result, learning to use the keyboard will be much easier, since the child will already know which finger strikes which key. He will therefore only need to focus his attention on developing the motor skills required for efficient touch-typing.

Visually-impaired and hearing-impaired children would also benefit from the same learning opportunities with the Braille and Sign-Language implementation of the alphanumeric gloves, respectively.

Figure 6A:
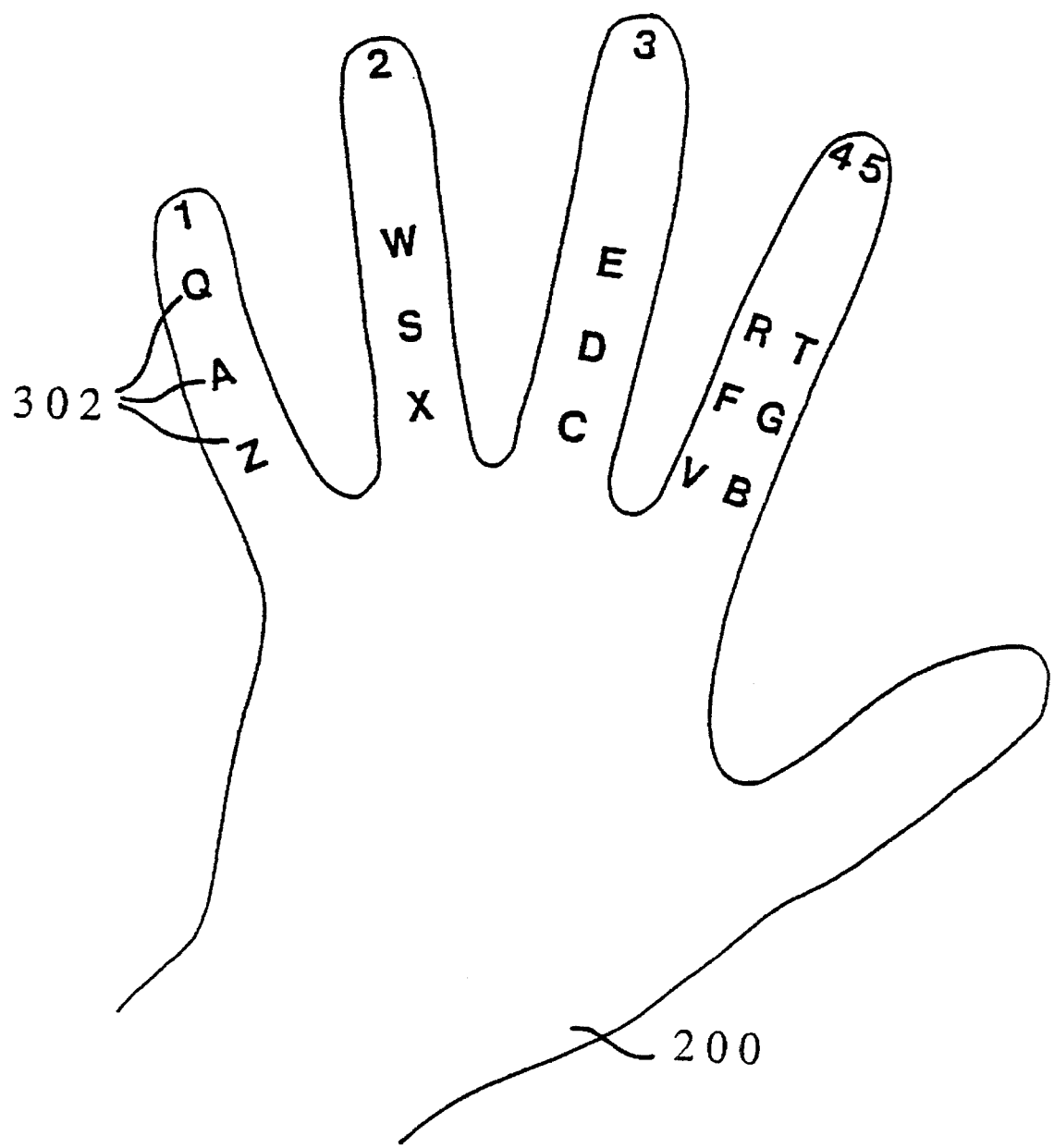
FIG. 6 depicts elevated views of alphanumeric gloves (i.e. letters, numbers, and punctuation symbols of the keyboard mounted on the back portions) with color-coded fingers: 6a: back portion of left hand glove; 6b: back portion of right hand glove.
Figure 6B:
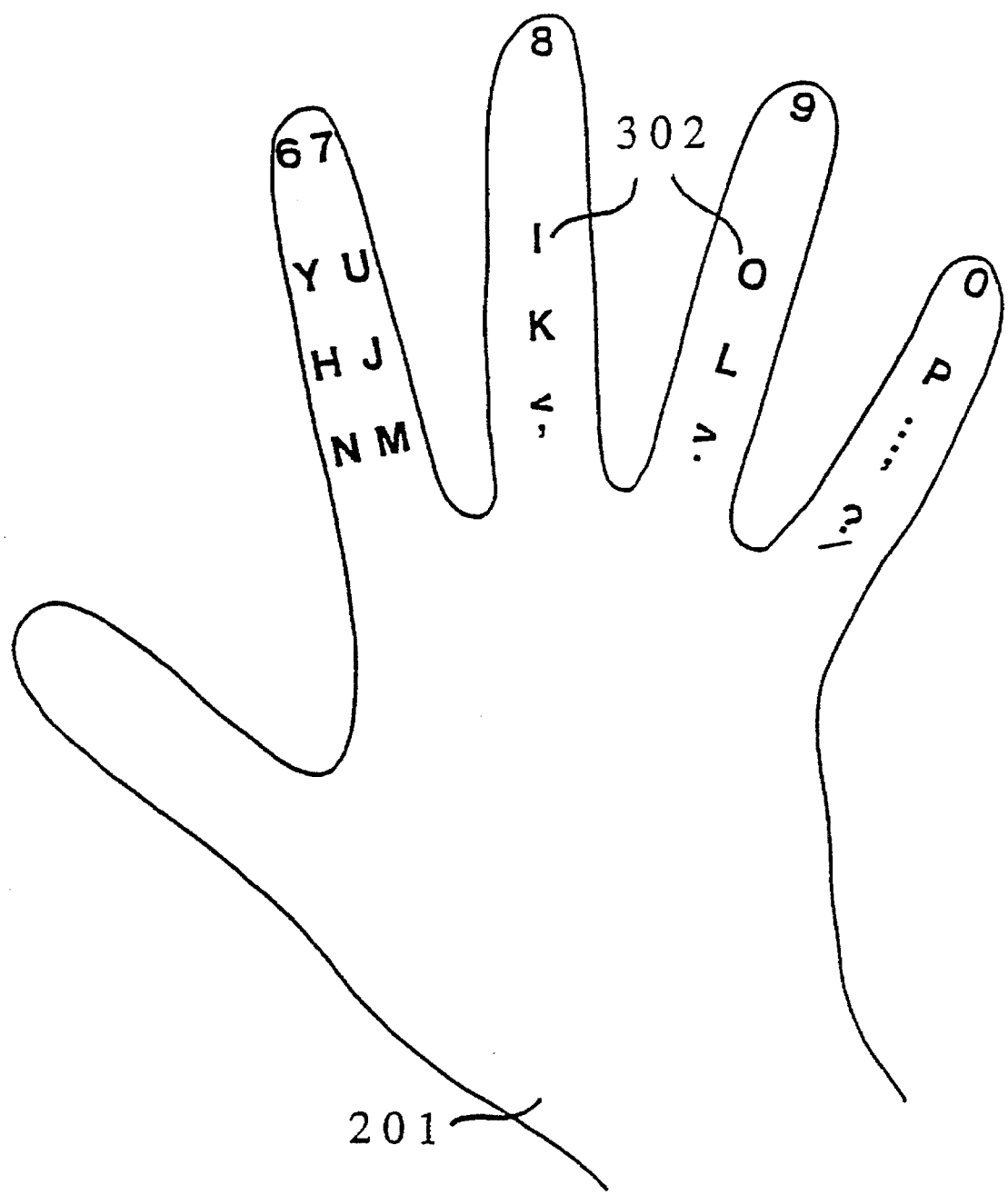
Figure 7:
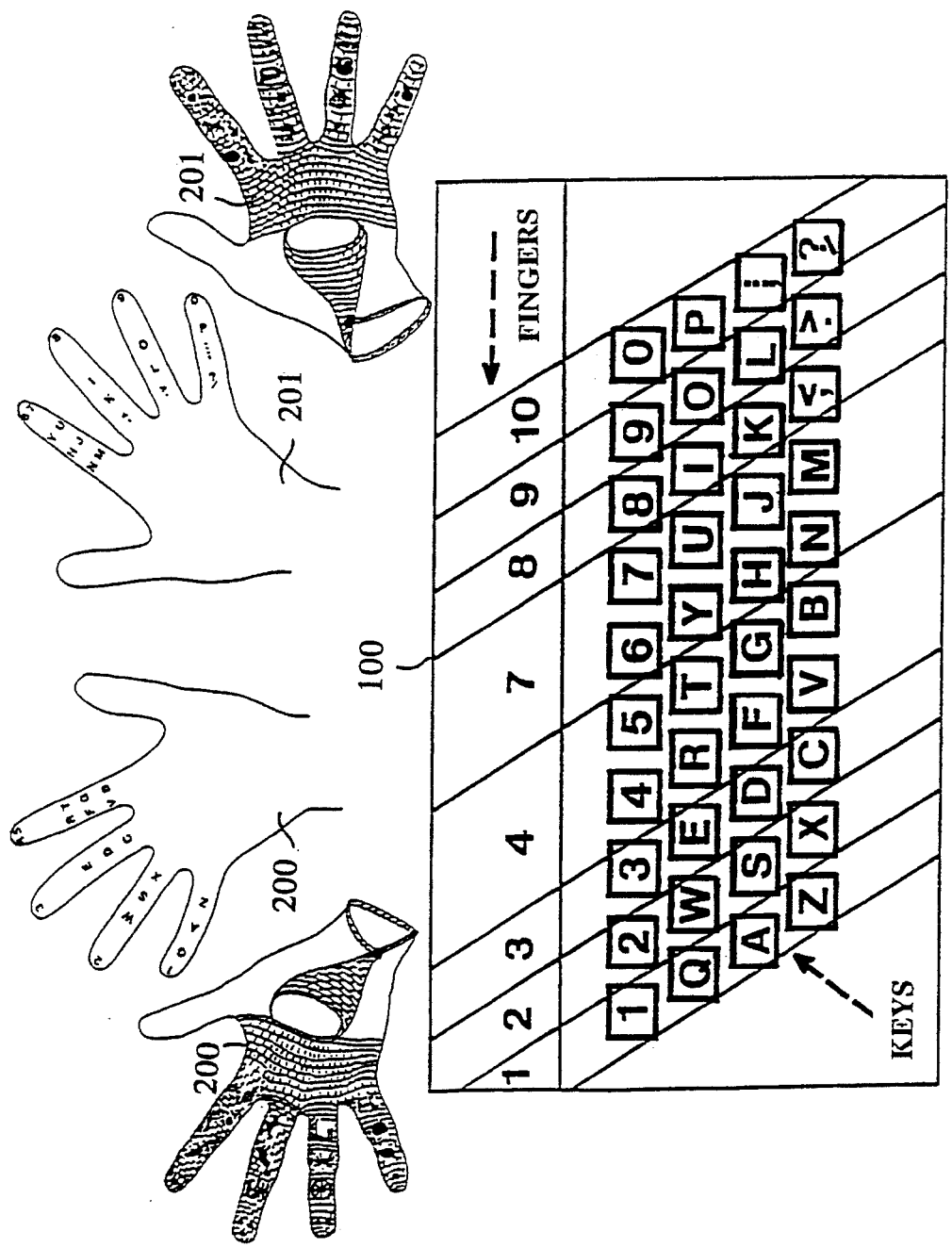
FIG. 7 depicts elevated views of the picture gloves illustrated in FIG. 2, and the alphanumeric gloves shown in FIG. 6, in relation to the representation of the standardized keyboard given in FIG. 1.
Figure 8A:
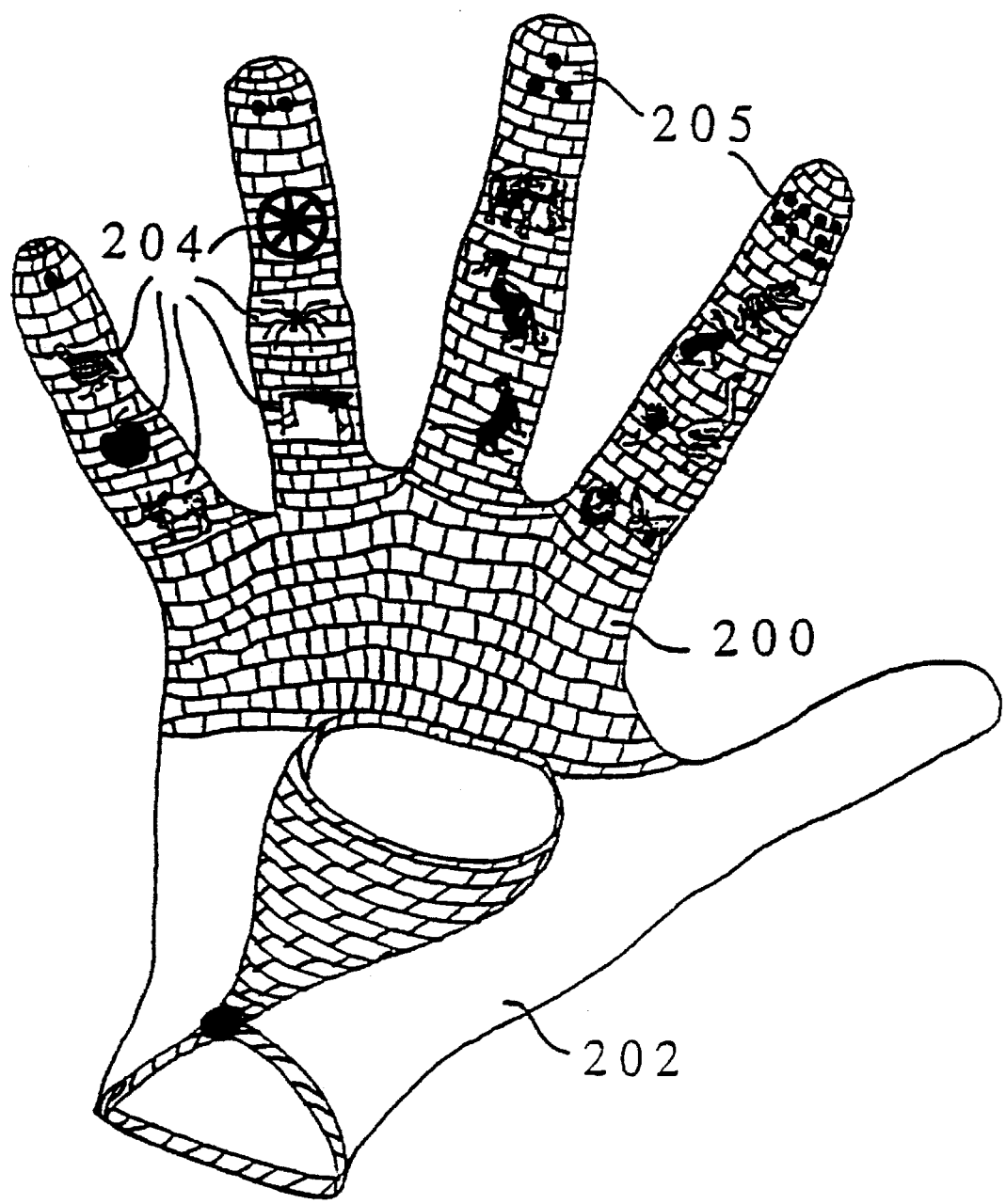
FIG. 8 depicts elevated views of gloves with inserted color-coded picture-indicia on the back portions (illustrated with a first style of gloves) and inserted picture-name-indicia on the palm portions (illustrated with a second style of gloves) for assisting in the learning of writing, spelling, and language vocabulary: 8a: back portion of a first left-hand glove with picture-indicia; 8b: palm portion of a second right-hand glove with the corresponding names in English; 8c: back portion of a first right-hand glove with picture-indicia; 8d: palm portion of a second left-hand glove with the corresponding names in English.
Figure 8B:
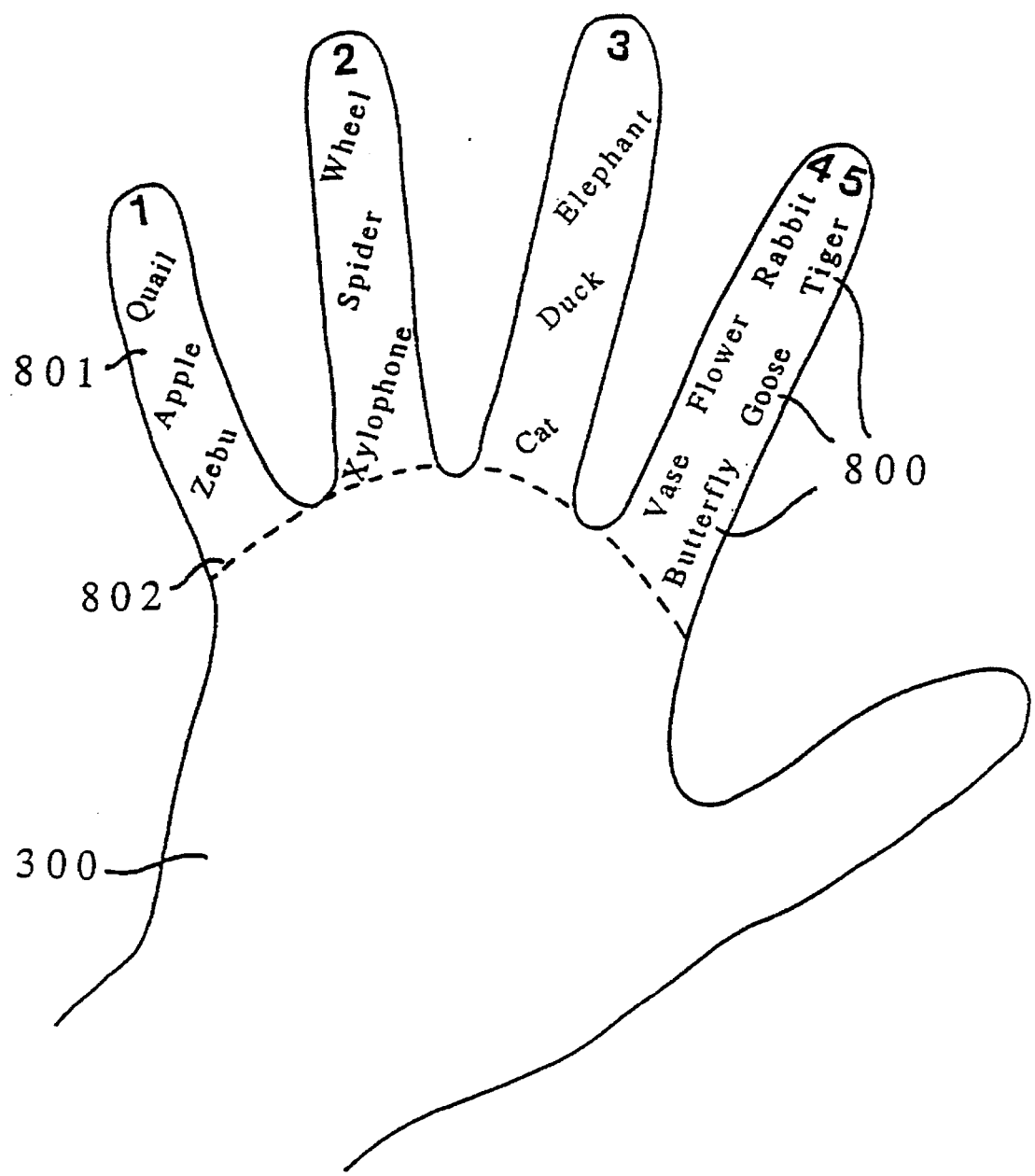
Figure 8C:
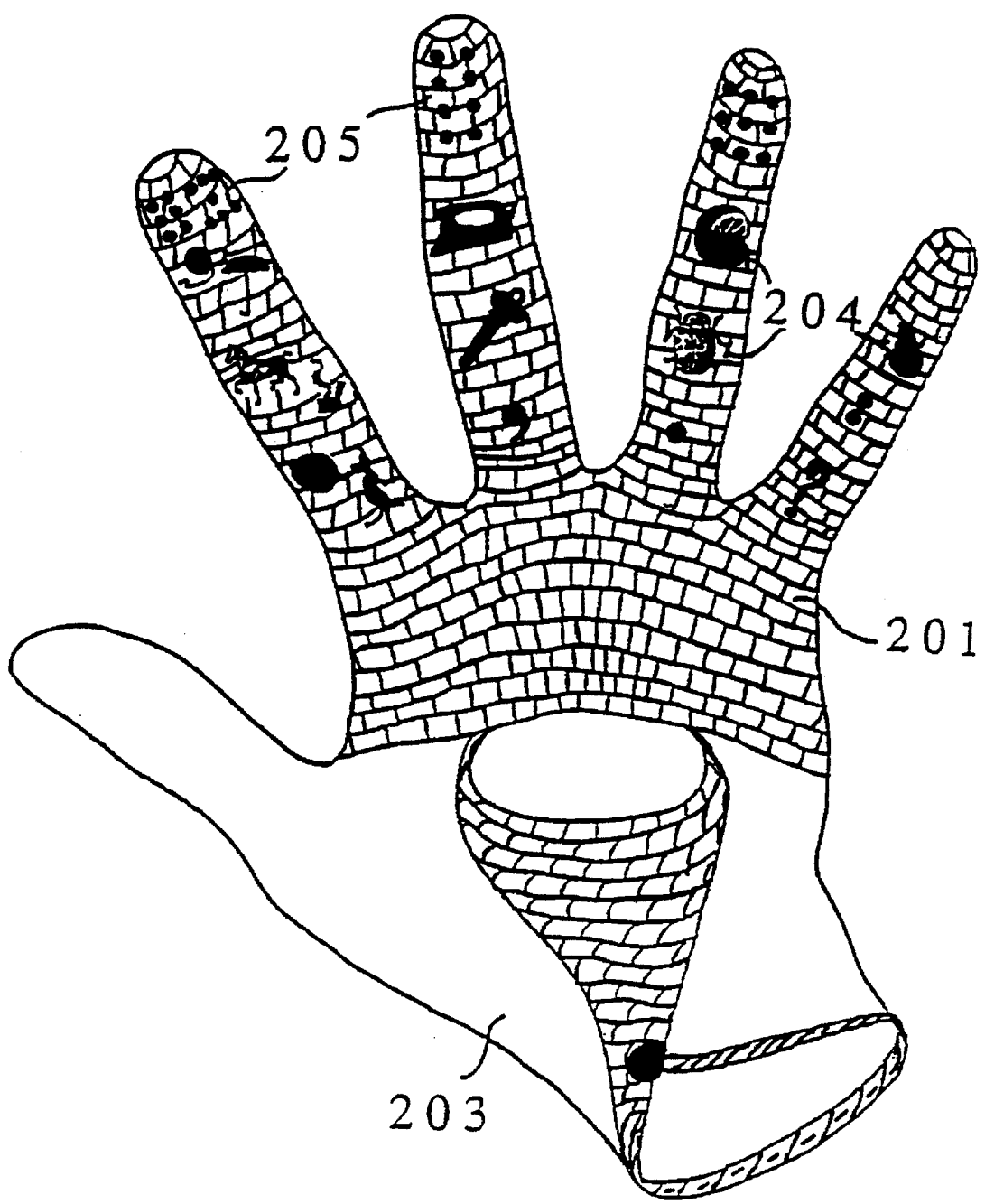
Figure 8D:
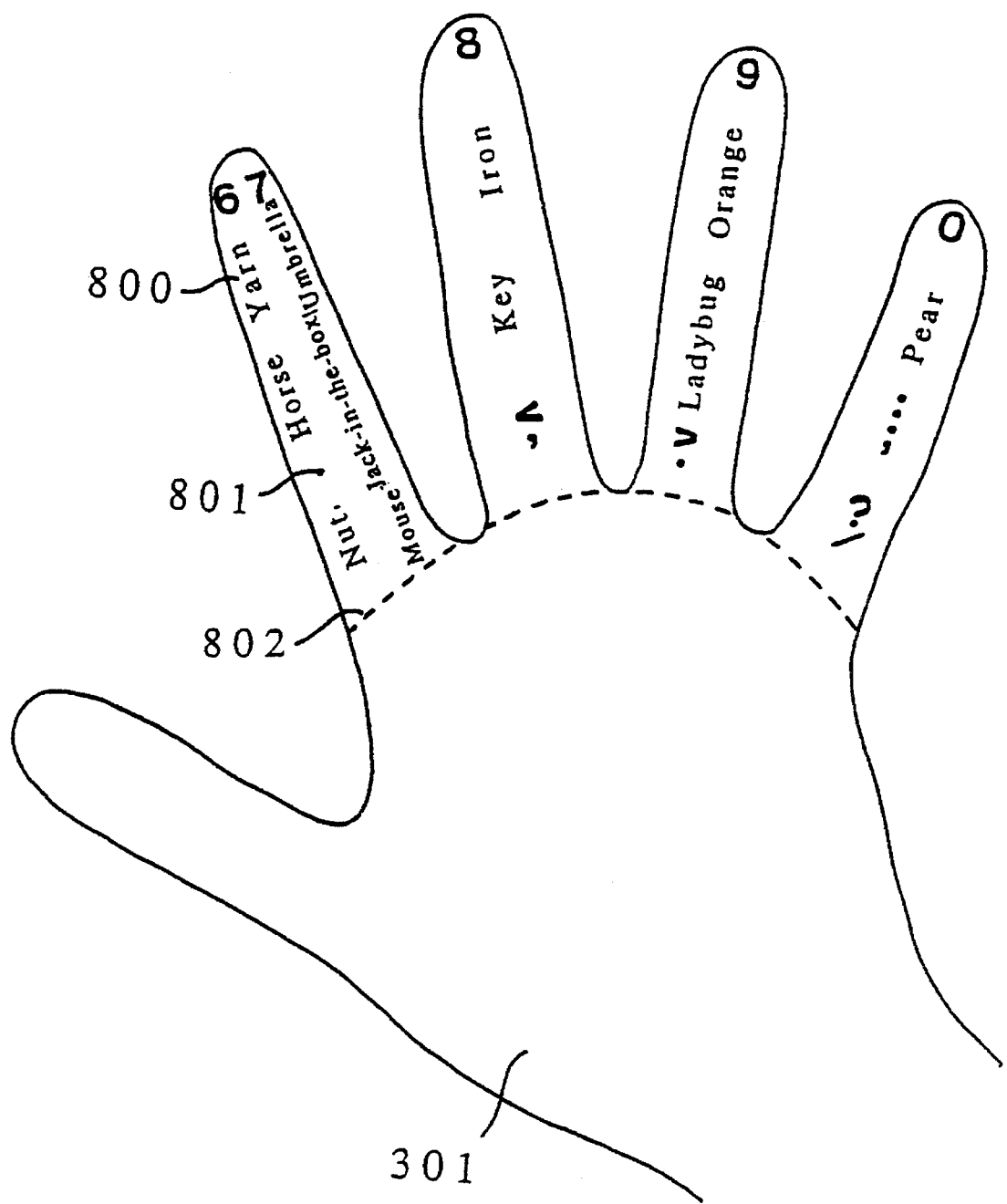
Figure 9A:
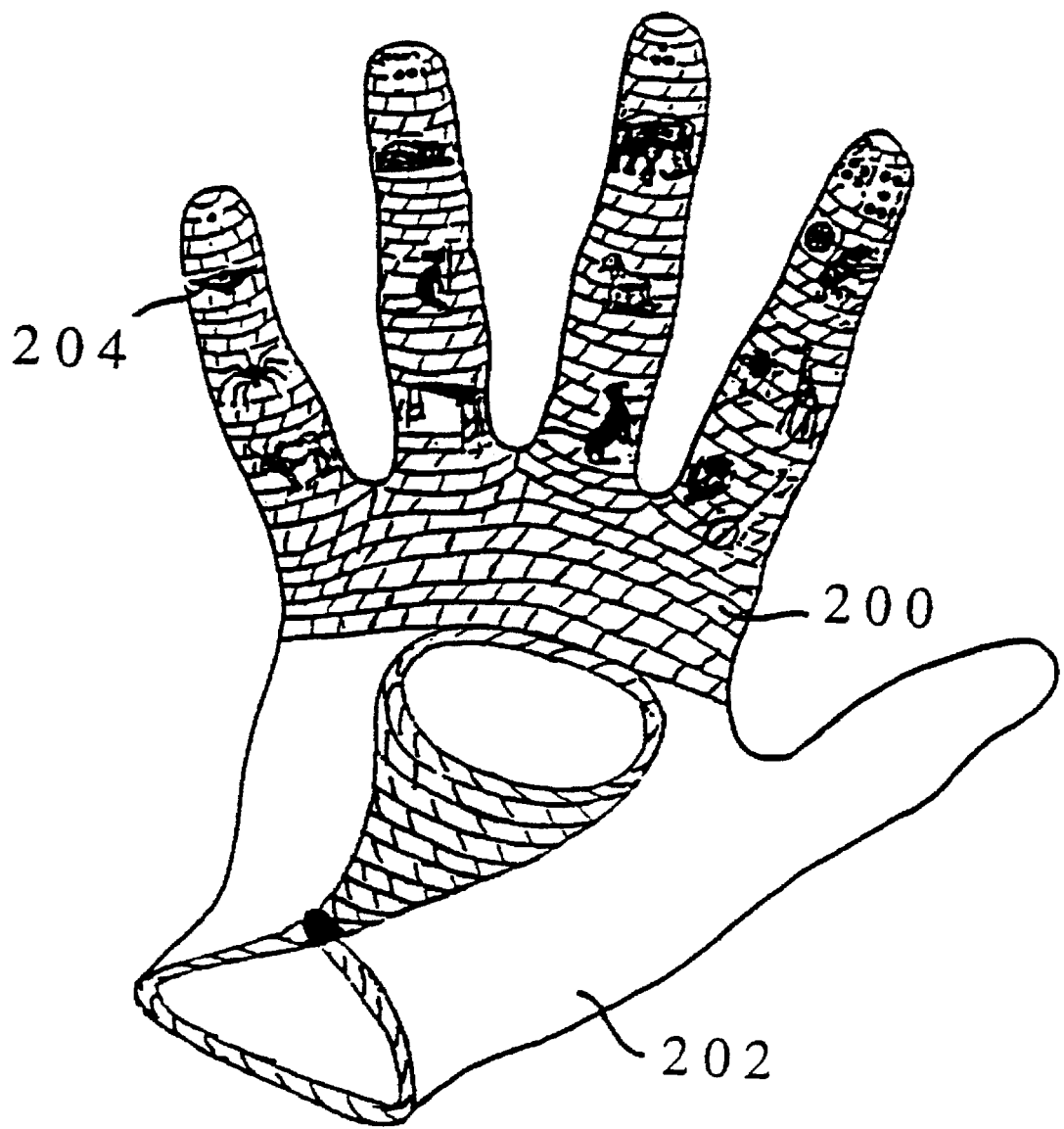
FIG. 9 depicts elevated views of gloves with inserted color-coded picture-indicia on the back portions (illustrated with a first style of gloves) and inserted picture-name-indicia on the palm portions (illustrated with a second style of gloves) for assisting in the learning of writing, spelling, and language vocabulary: 9a: back portion of a first left-hand glove with picture-indicia; 9b: palm portion of a second right-hand glove with the corresponding names in French; 9c: back portion of a first right-hand glove with picture-indicia; 9d: palm portion of a second left-hand glove with the corresponding names in French.
Figure 9B:
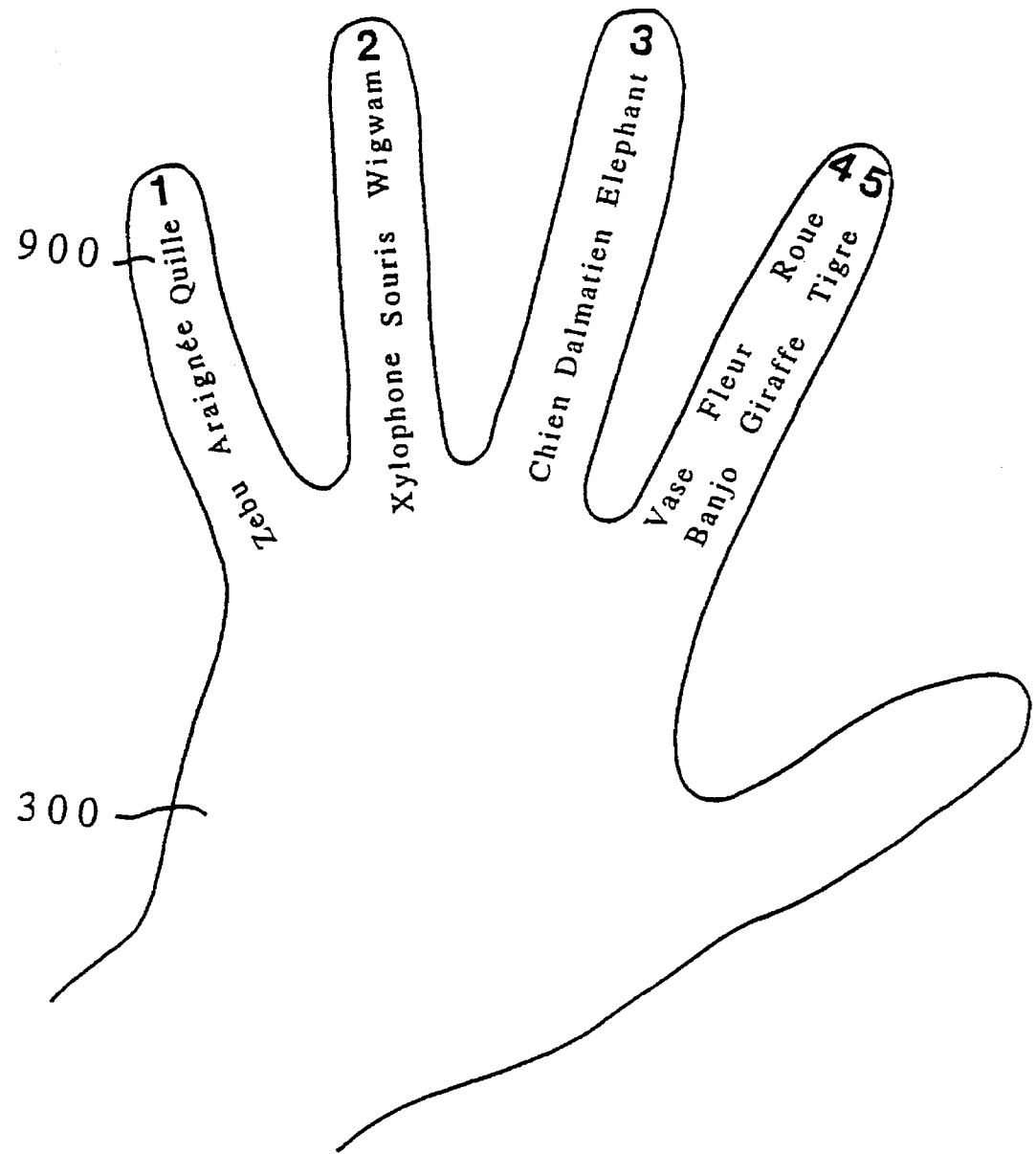
Figure 9C:
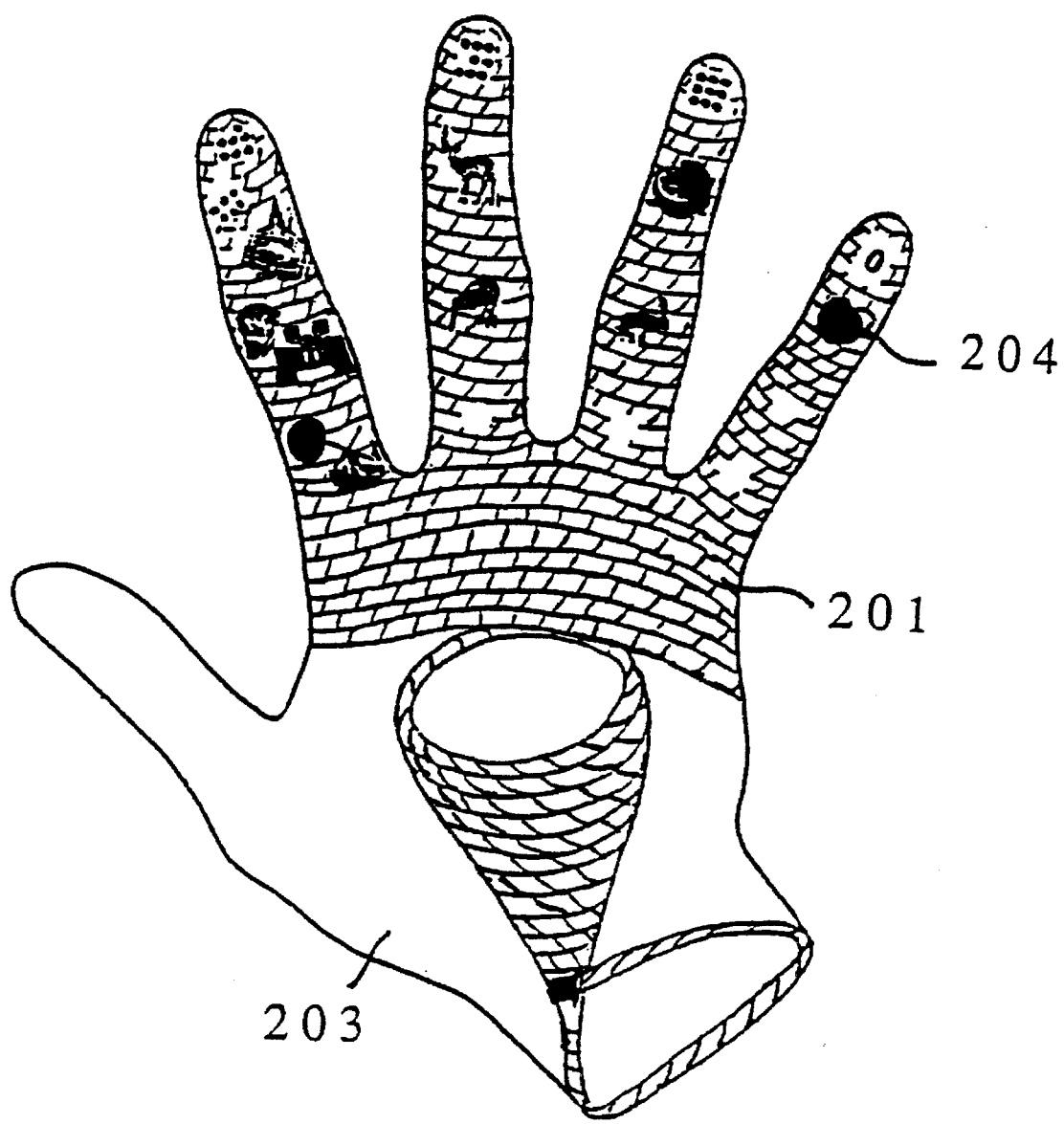
Figure 9D:
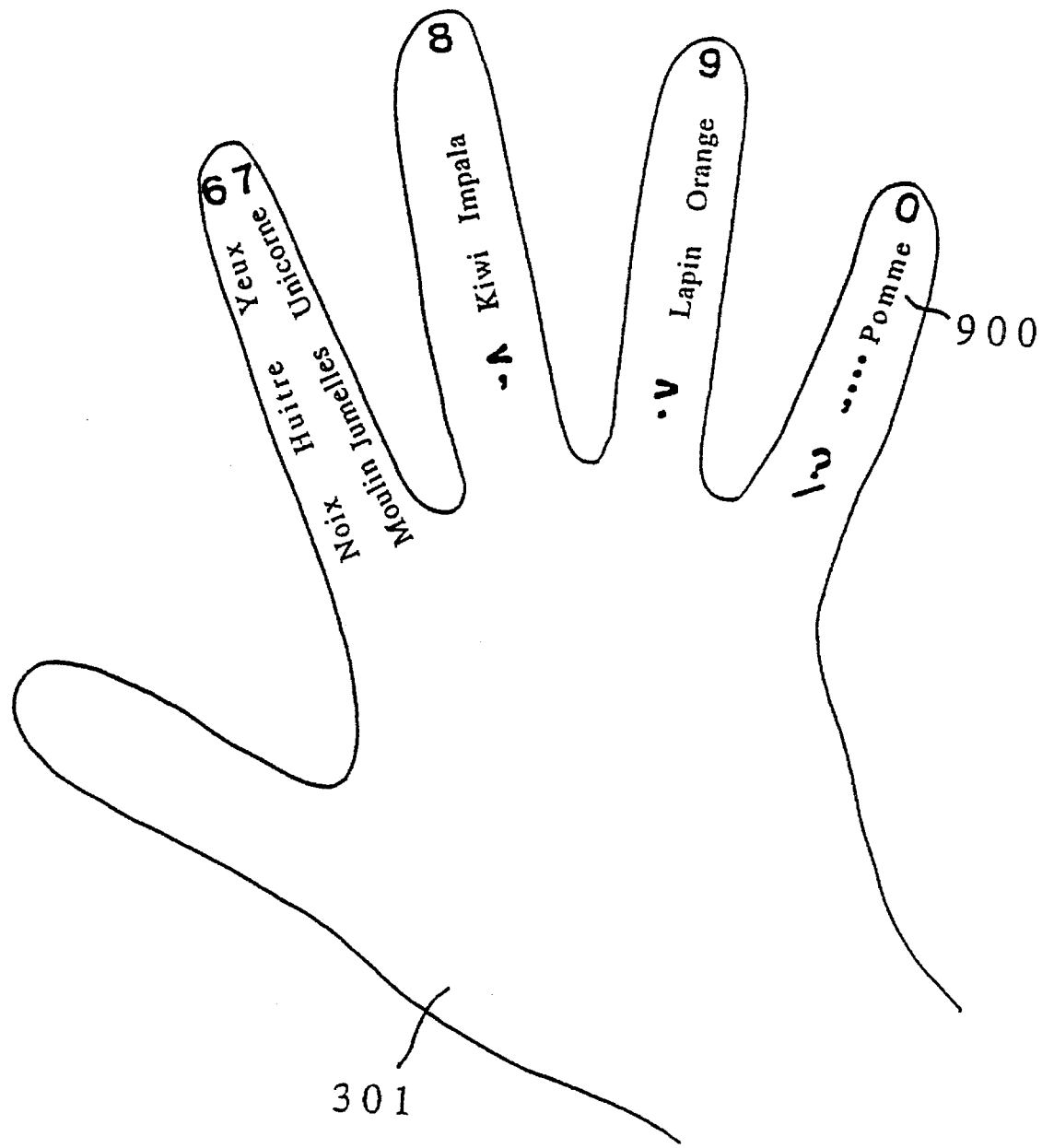
Figure 10A:
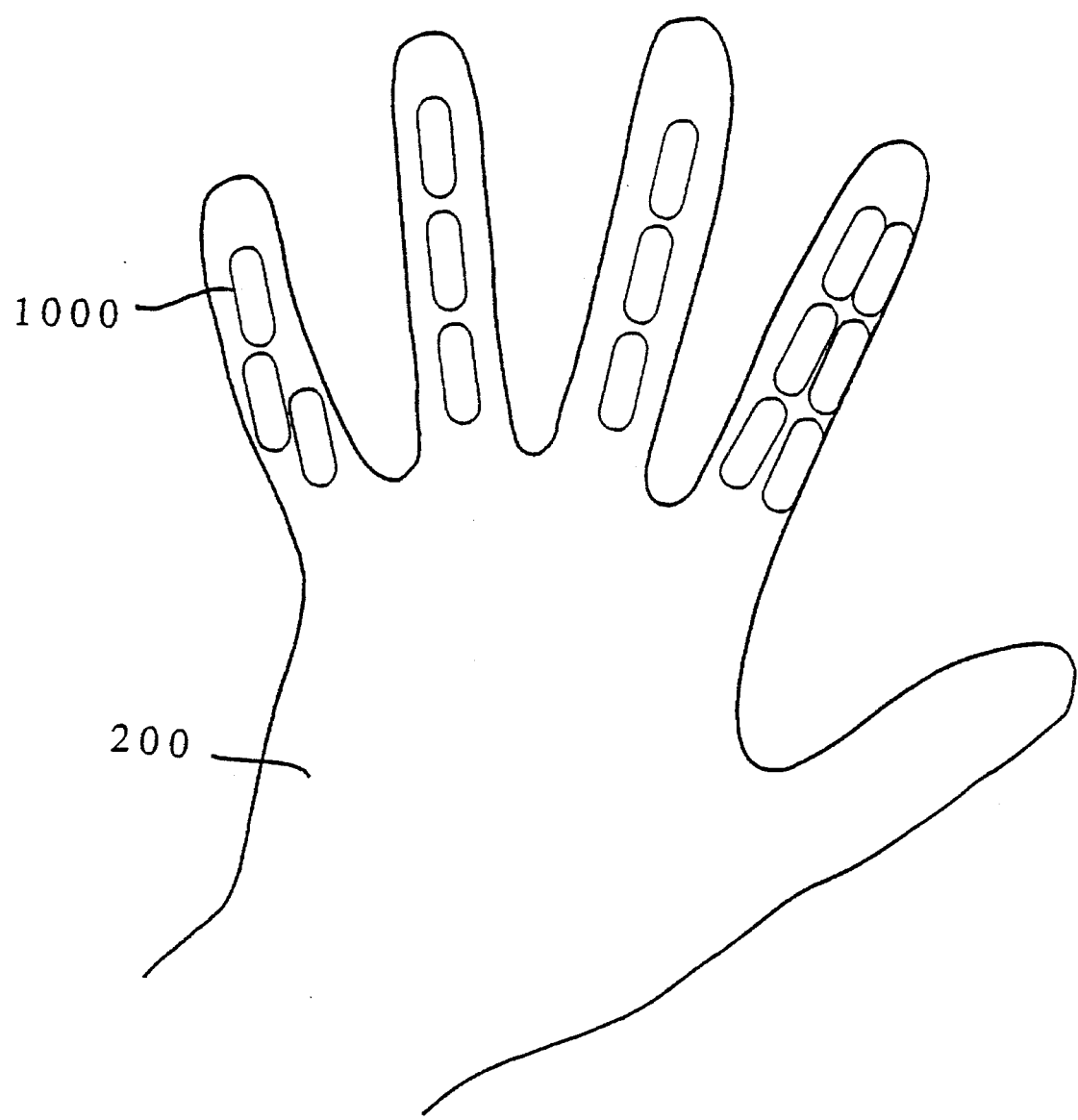
FIG. 10 depicts elevated views of gloves with inserted color-coded photo/object-indicia on the back portions, and inserted photo/object-name indicia on the palm portions for facilitating self-expression: 10a: back portion of a left-hand glove with photo/object indicia; 10b: palm portion of a right-hand glove with the names of the corresponding photo/object indicia; 10c: back portion of a right-hand glove with photo/object indicia; 10d: palm portion of a left-hand glove with the names of the corresponding photo/object indicia.
Figure 10B:
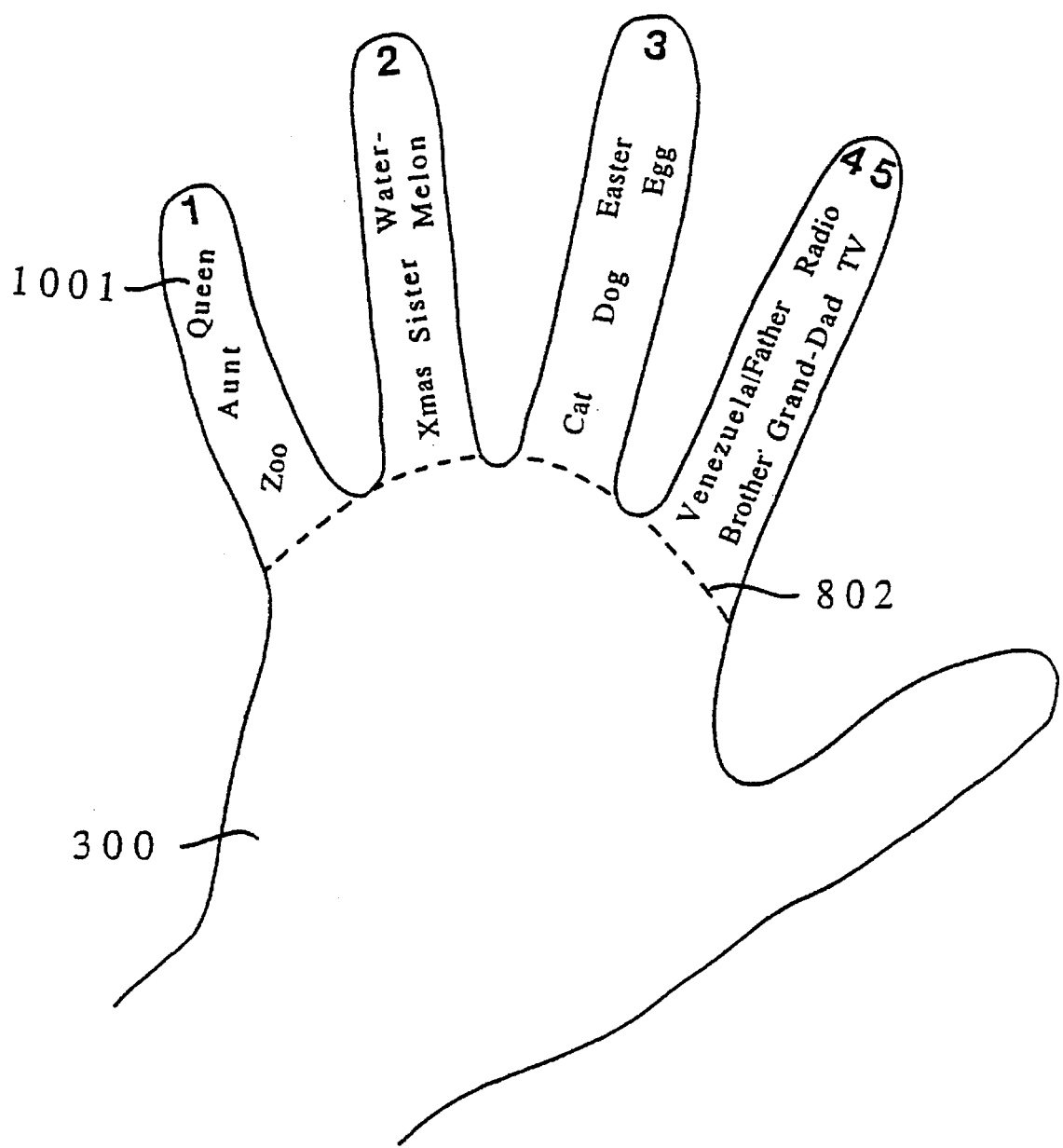
Figure 10C:
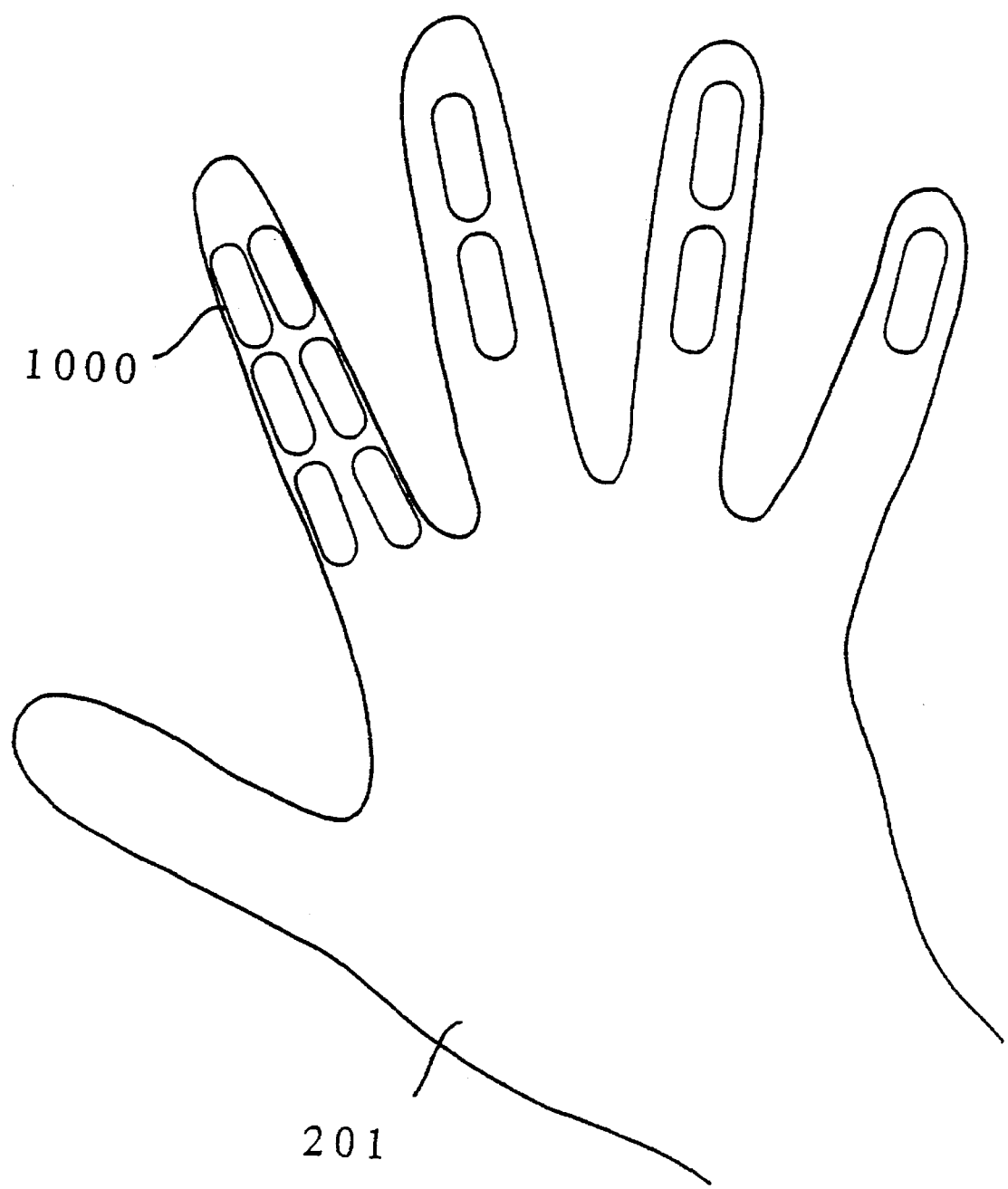
Figure 10D:
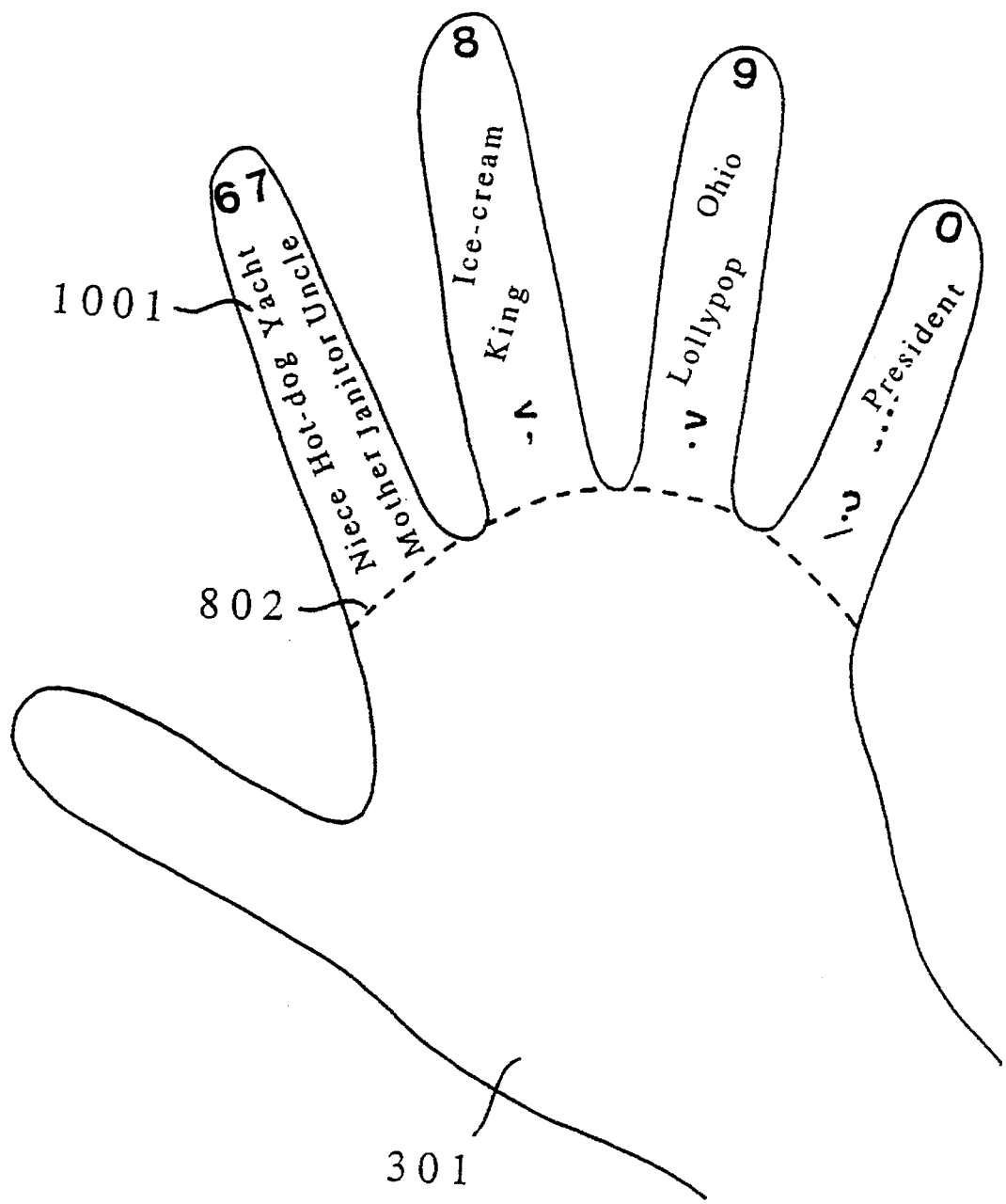

The overall process of learning the key-finger assignment of the keyboard is summarized in FIG. 7 which shows the picture gloves of FIG. 2, as well as the alphanumeric gloves of FIG. 6, in relation to the standardized keyboard of FIG. 1.

Word-Spelling/Picture Gloves

As the school child simultaneously develops his reading/writing skills, much is to be gained from an educational device that teaches him proper word-spelling in the context of the key-finger assignment. By wearing the word-spelling picture gloves depicted in FIG. 8, the child's memorization of the key-finger assignment of the keyboard is reinforced, while he learns new words and their spelling in a fun and dynamic manner. As illustrated in FIG. 8, the structure of the word-spelling/picture gloves is most simply understood as an extension of the alphanumeric/picture gloves of FIG. 3, where the letters indicated on the palm portion of each glove are replaced by the full written names 800 of the objects represented by the corresponding pictures 204 on the back portion of the other glove. In the illustration of FIG. 8, if the school child wearing the gloves turns the palm of his right hand towards himself, he very easily learns that the name of the top animal on his major left finger is given by the top name written under his right forefinger, i.e. "Elephant". He simultaneously memorizes that the letter "E" is located at the top of the third column of keys of the keyboard to be struck by the left major finger.

The series of pictures 204 or written names 800 corresponding to the same finger would be color-coded, and mounted/printed on flexible labels 801 inserted within transparent covers 802 permanently mounted to the gloves. While being cost-effective, such an implementation can meet any need for picture styles and diversity.

School Age Group And Teenagers

Language/Picture Gloves

As the school child or teenager learns a foreign language, much is also to be gained from the language/picture gloves of FIG. 9 to synergistically teach the child foreign vocabulary in the context of the key-finger assignment of the keyboard. As seen in FIG. 9, the language/picture gloves are most simply understood as an extension of the word-spelling/gloves of FIG. 8 where the identification of the pictures 204 and the writing of said picture names 800 are both made in a foreign language 900. As the school-age child or teenager would have had by then multifarious opportunities to memorize the key-finger assignment of the keyboard, he/she could use the latter memorization to ease the learning of a foreign language. In the learning of French language for example, the letter "A" could be associated with the word "Araignée", or "spider" in English, as in the illustration of FIG. 9. The visual memorization of the "French" spider in the middle of the left little finger, together with the memorization of the "A" key corresponding to that location, will provide a mnemonic means for remembering that the french name for "spider", i.e. "Araignée", starts with an "A". Owing to the associative nature of the memory process, it then becomes more easy for the school child or teenager to retrieve the word "Araignée".

Self-Expression/Picture Gloves

As the educational process evolves, the school age or teenager will progressively develop a feeling of companionship for his mnemonic gloves which will have provided him with comfort, security, and so many joyful experiences throughout the difficult stages of his growth and development. Next to, or during the adolescence, the school child or teenager experiences one of the most challenging physical and emotional transformations of his life. Much is therefore to be gained from an educational device such as the Self-Expression/Picture gloves of FIG. 10 to alleviate the pain of this stressful transformation by encouraging the self-expression of the school child or teenager. As seen in FIG. 10, the Self-Expression/Picture Gloves are most simply understood as the following extension of the Word-Spelling/Picture Gloves of FIG. 8: the removable pictures on the back side of the gloves can now include the photos 1000 of people having a direct impact on the life of the school child or teenager, e.g. father/mother or brother/sister, and the photos of pets or familiar objects. The real names 1001 of the said people, pets, and objects are written in the corresponding finger location of the palm sides of the gloves.

By creating a real life-like situation, yet far less threatening than in reality, the self-expression/picture gloves will help the child/teenager wearing the gloves to express stressful feelings or emotions that would otherwise be difficult to verbalize. The child/teenager would then be encouraged to express himself freely, yet within the limitation of the keyboard, which would also reinforce the memorization of the keyboard.

Teenagers & Adults

Picture Rings

The picture gloves provided the pre-school child with comfort and protection, and satisfied his needs for feeling of togetherness and control. In contrast, teenagers like challenge and diversity, and they want to be treated as adults seeking independence. It is to satisfy such needs that the picture gloves have been transformed into the picture rings 1100 illustrated in FIG. 11 on the left hand 202 and right hand 203 of a learner.

Figure 11:
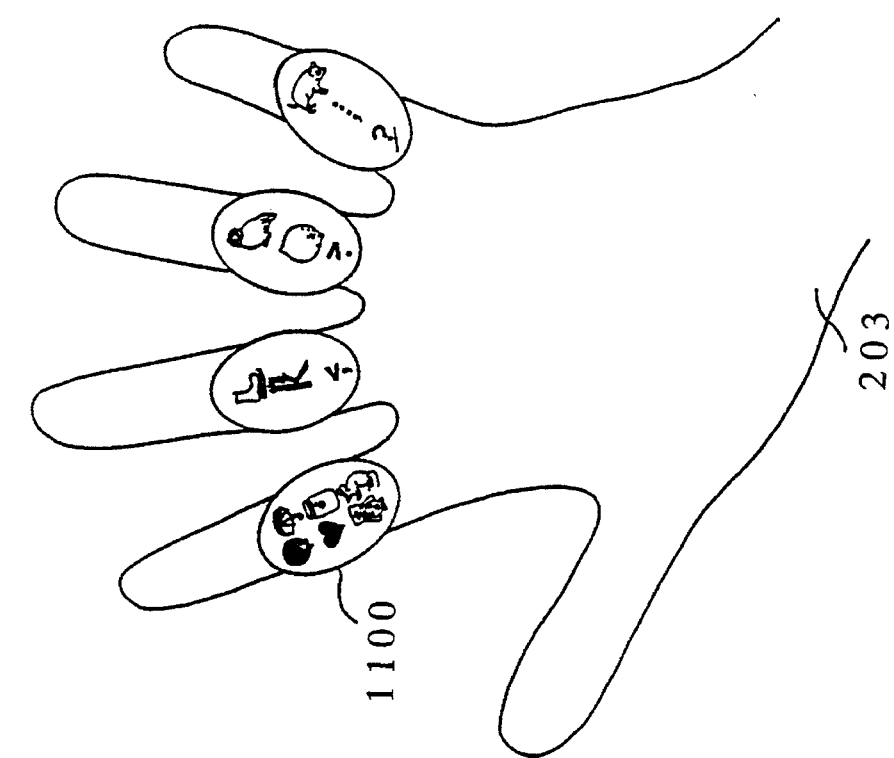
FIG. 11 depicts elevated views of a set of picture-rings worn on the hands of a teenager, for assisting the memorization of the key-finger assignment of the keyboard.
Figure 11:
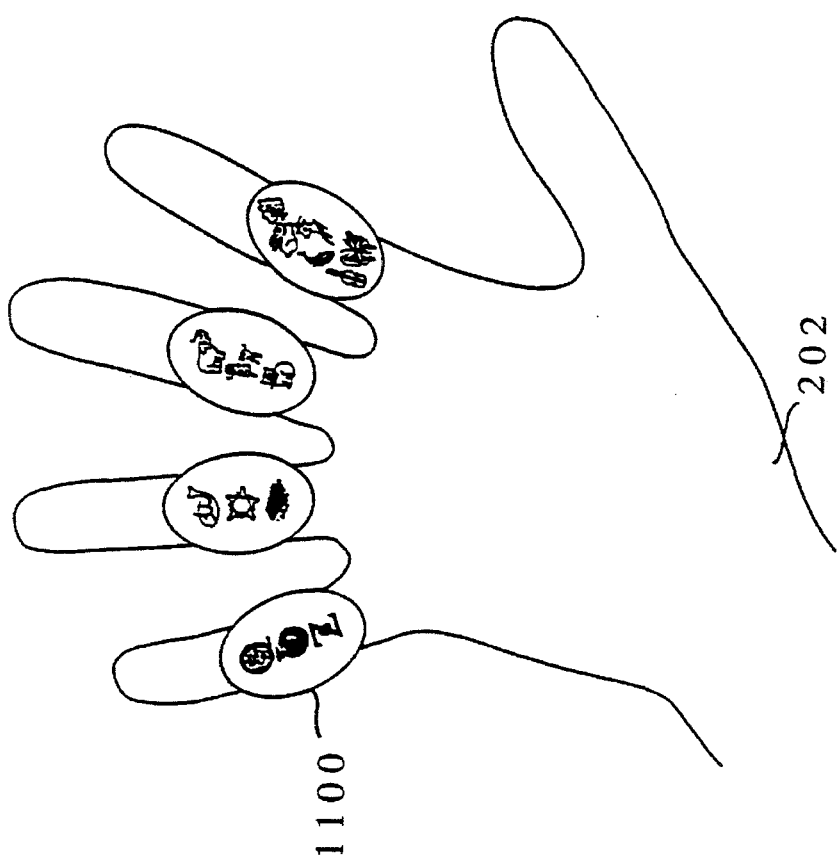

As shown in FIG. 11, the ring of the left little finger carries the pictures of a Queen, an Apple, and a Zero to indicate the QAZ-keys. The ring of the left ring-finger carries the pictures of a Whale, a Sun-shine, and a Xylophone to indicate the WSX-keys. The ring of the left major finger carries the pictures of an Elephant, a Dog, and a Cat to indicate the EDC-keys. The ring of the left forefinger carries the pictures of a Rabbit, a Fish, and a Violin to indicate the RFV-keys, and a Tree, a Goat, and Butterfly to indicate the TGB-keys.

Also in FIG. 11, the ring of the right little finger carries the picture of a Pig to indicate the P-key, and various punctuation symbols. The ring of the right ring-finger carries the pictures of an Owl and a Lemon to indicate the OL-keys, and some symbols. The ring of the right major finger carries the pictures of an Ice-skate and a King to indicate the IK-keys, and some symbols. The ring of the right forefinger carries the pictures of an Umbrella, Jam, and a Mouse to indicate the UJM-keys, as well as the pictures of Yarn, a Heart, and a Nurse to indicate the YHN-keys.

It should yet be clear that the selection of the objects depicted on the picture rings is not unique, the only requirement being that the ring to be worn on any given finger carries objects (the ring objects) or representations of objects which names begin with a letter corresponding to the key of the keyboard to be struck by the finger wearing the ring. These objects can be three-dimensional forms or structures (e.g. 1201) that are either mounted on the rings or loosely attached thereon by means of a hanging device such as thread, or wire (e.g. 1200). These mnemonic objects can also be represented by raised surfaces (e.g. 1401) or flat surfaces (e.g. 1101) mounted on the rings. Such object representations can be printed, drawn or painted on the crowns of the rings.

Figure 12:
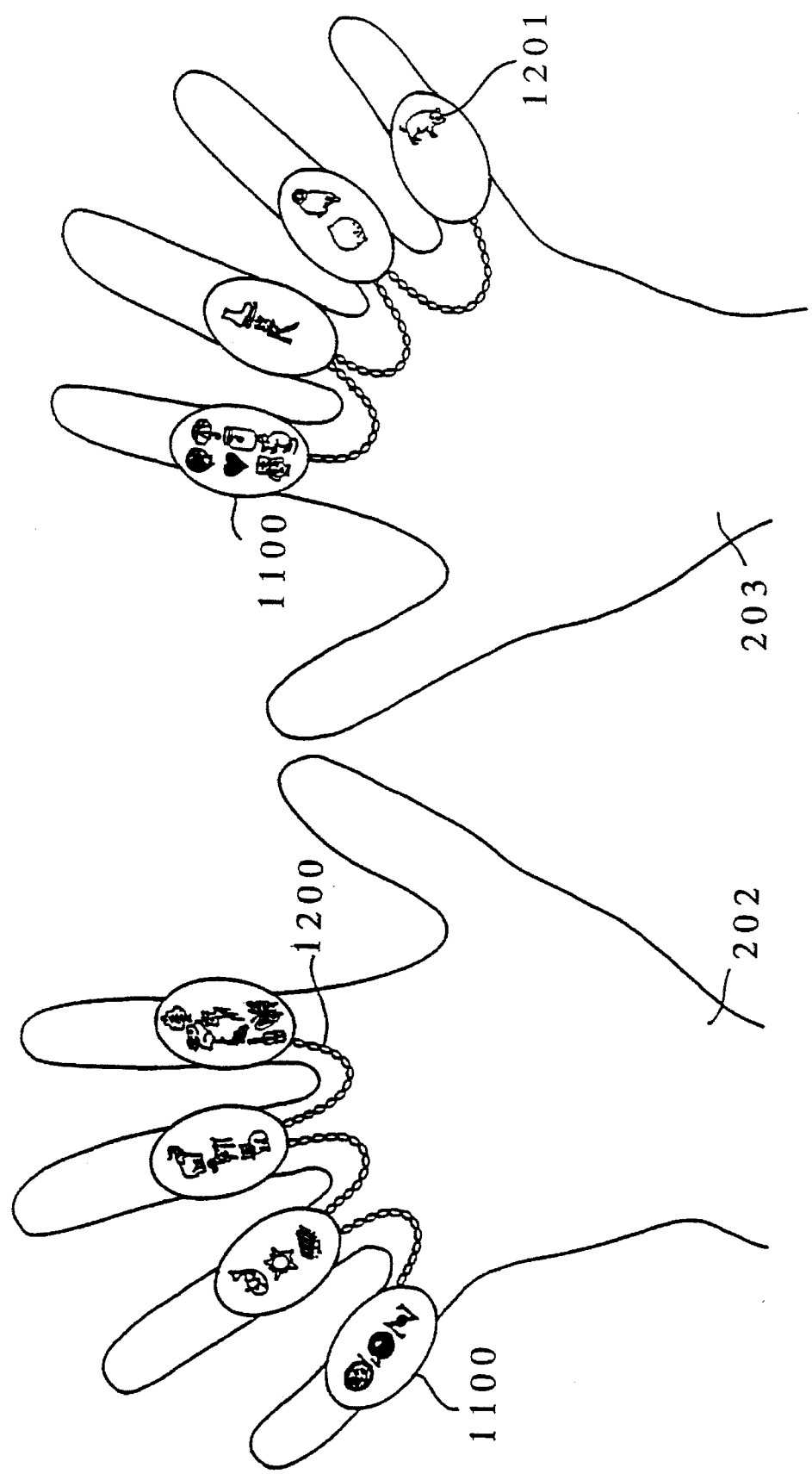
FIG. 12 depicts elevated views of a set of picture-rings worn on the hands of a teenager, and nearest-neighbor interconnected in order to facilitate proper wearing of the rings according to the key-finger assignment of the keyboard.
Figure 21A:
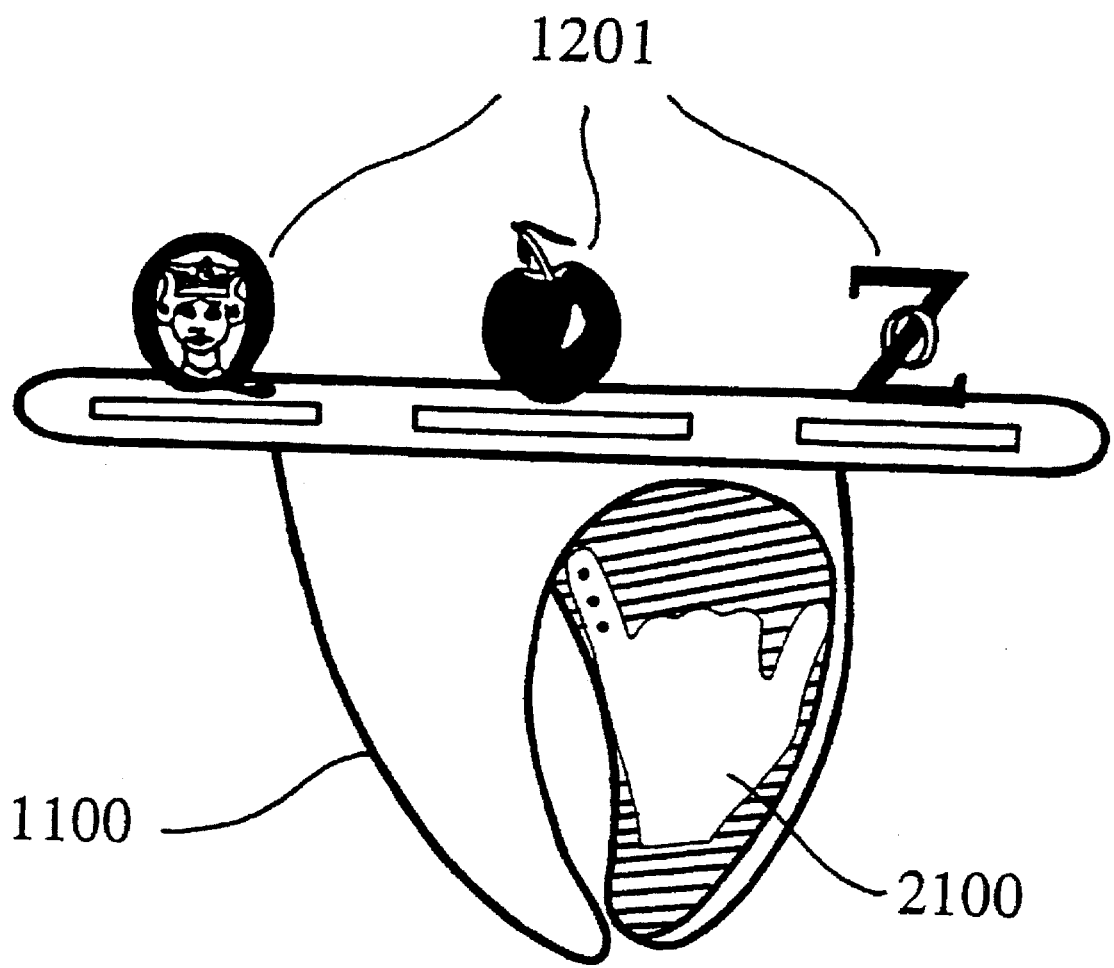
FIG. 21 depicts rings with finger identification means applied thereto, and having three object indicia mounted thereon. 21a: an open-ended ring. 21b: a closed-ended ring
Figure 21B:
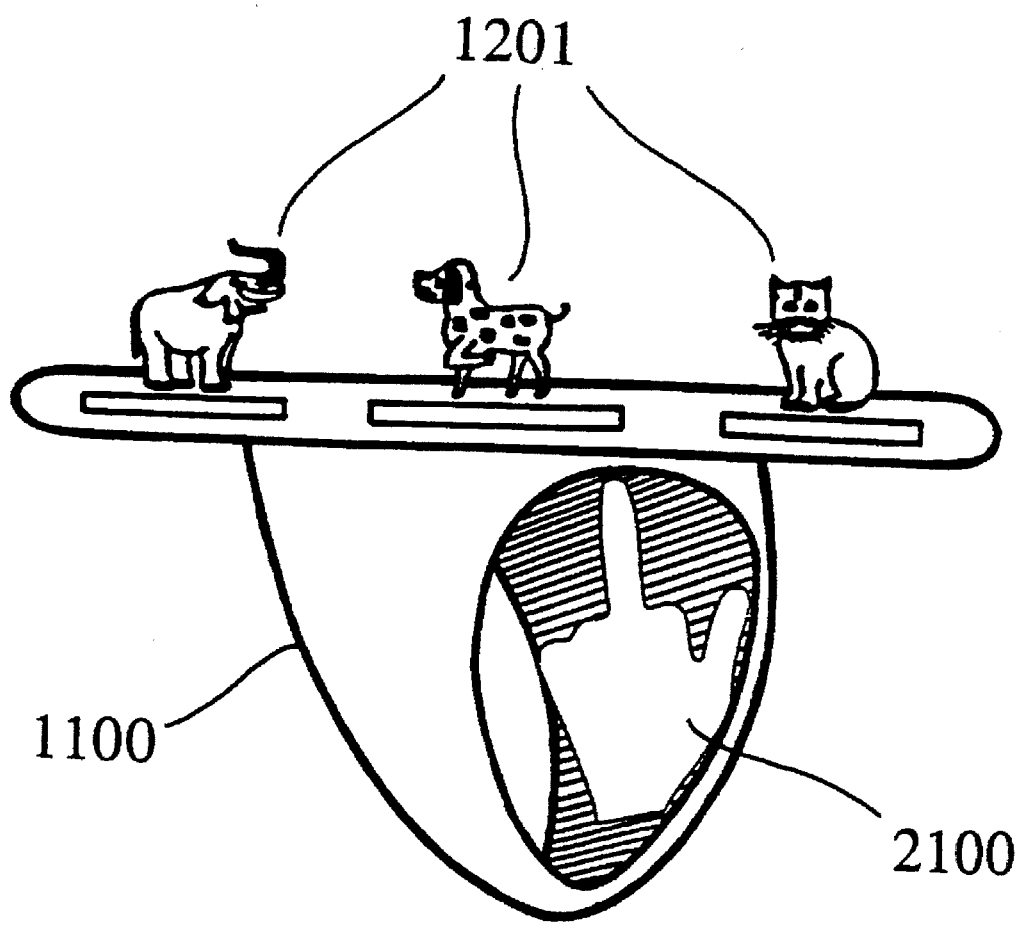
Figure 22A:
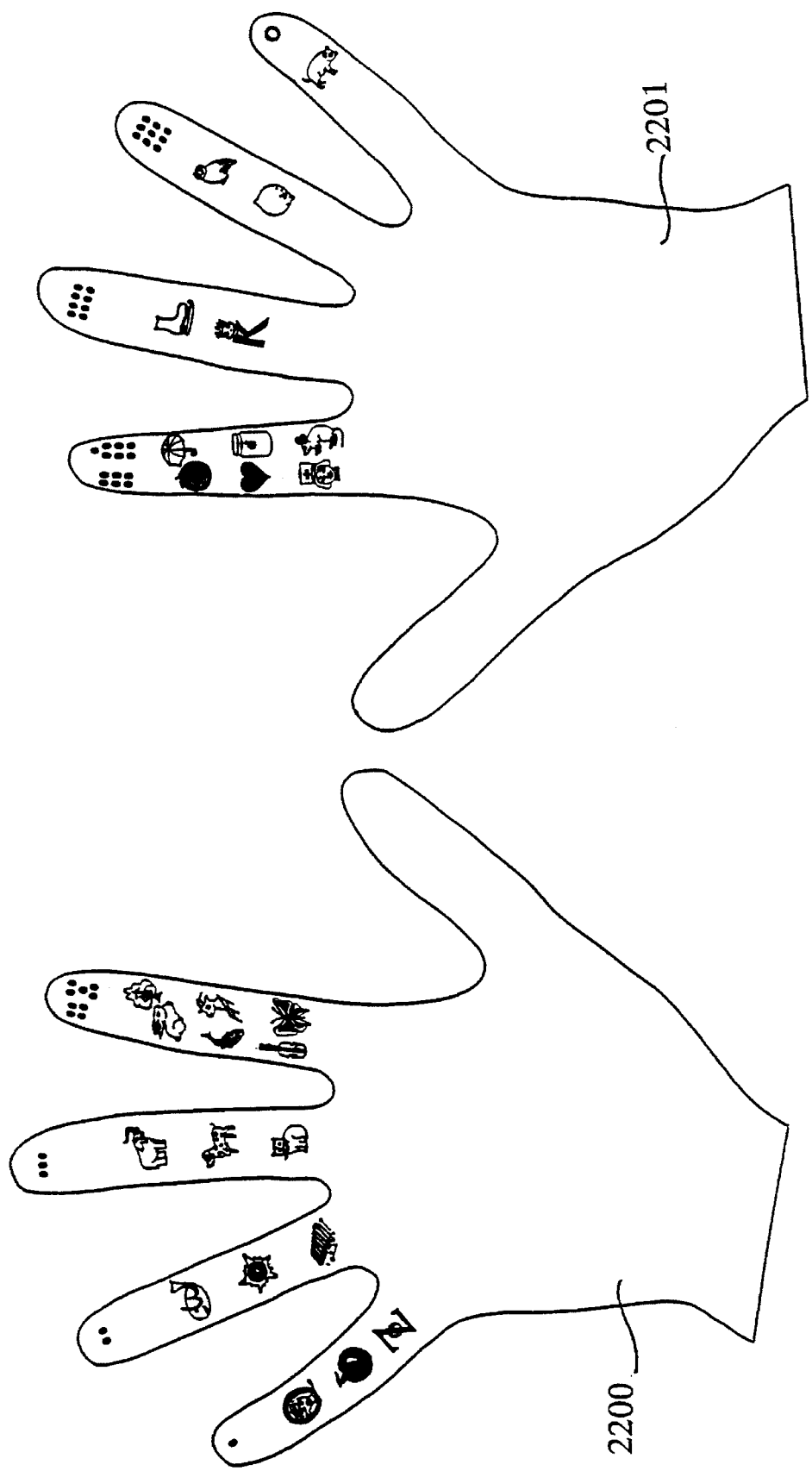
FIG. 22 depicts two-dimensional representations of left and right hands with indicia mounted on the fingers thereof, indicating: 22a: indicia of the rings on the associated fingers; 22b: characters of the keyboard keys to be struck by the corresponding fingers.
Figure 22B:
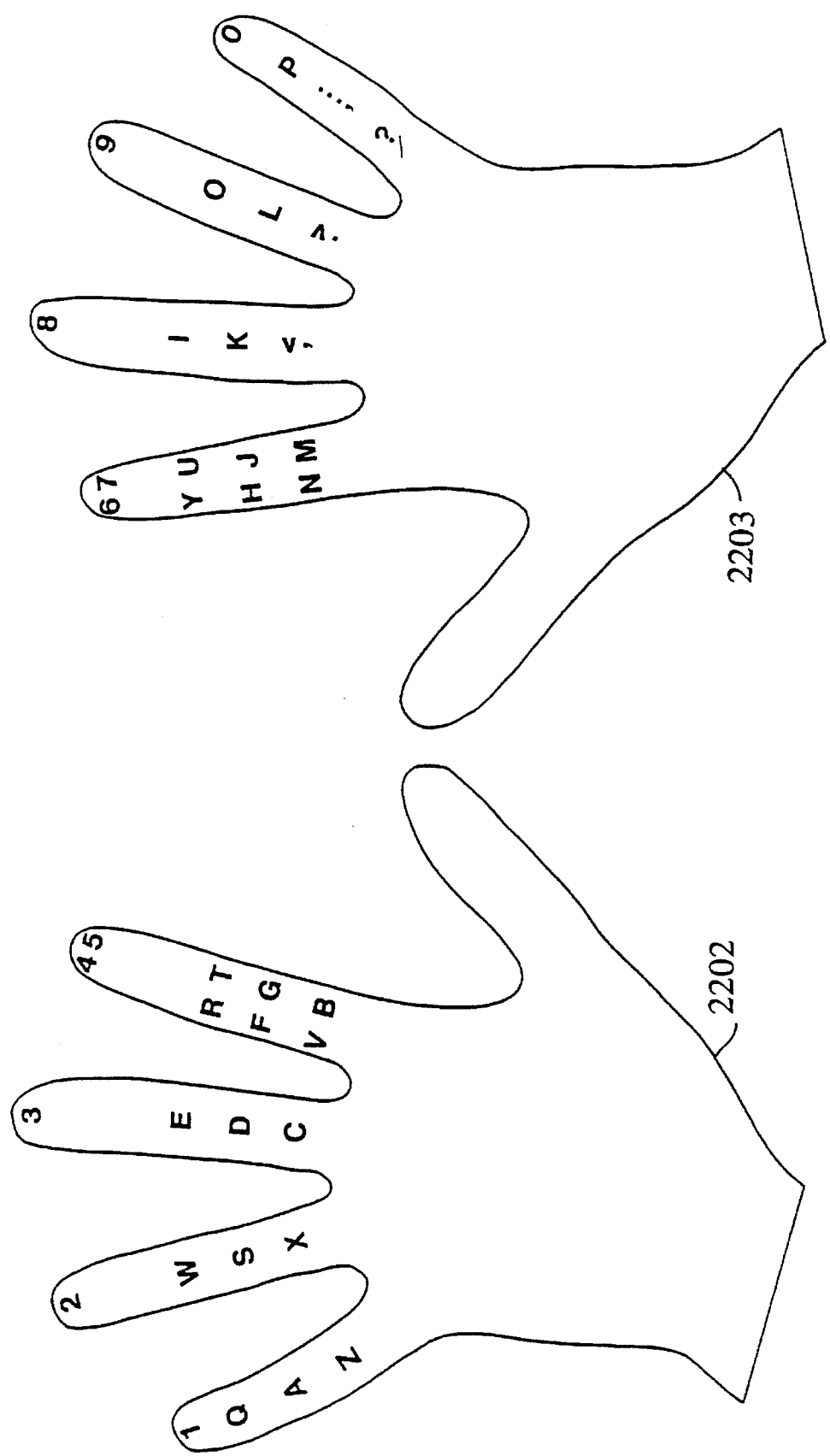

In order to discretely indicate how to properly wear these rings 1100, each ring could carry the name, or a pictorial representation of the finger that should wear it. Such a name or pictorial representation could be either engraved or applied on the inner side of the ring. To facilitate proper wearing of the rings on the fingers of the learner, the four rings of the left hand could be all connected with little chains 1200 in a nearest neighbor manner, and likewise for the four fingers of the right hand, as depicted in FIG. 12. For example a tactile-visual aid could show the correspondence between the indicia of the ring and the specific finger of the hand that should wear the ring. This tactile-visual aid can, for example, comprise representations of the fingers 2100 on the inner side of the ring that is to be worn by the specific finger as shown in FIGS. 21a and 21b.

Figure 13A:
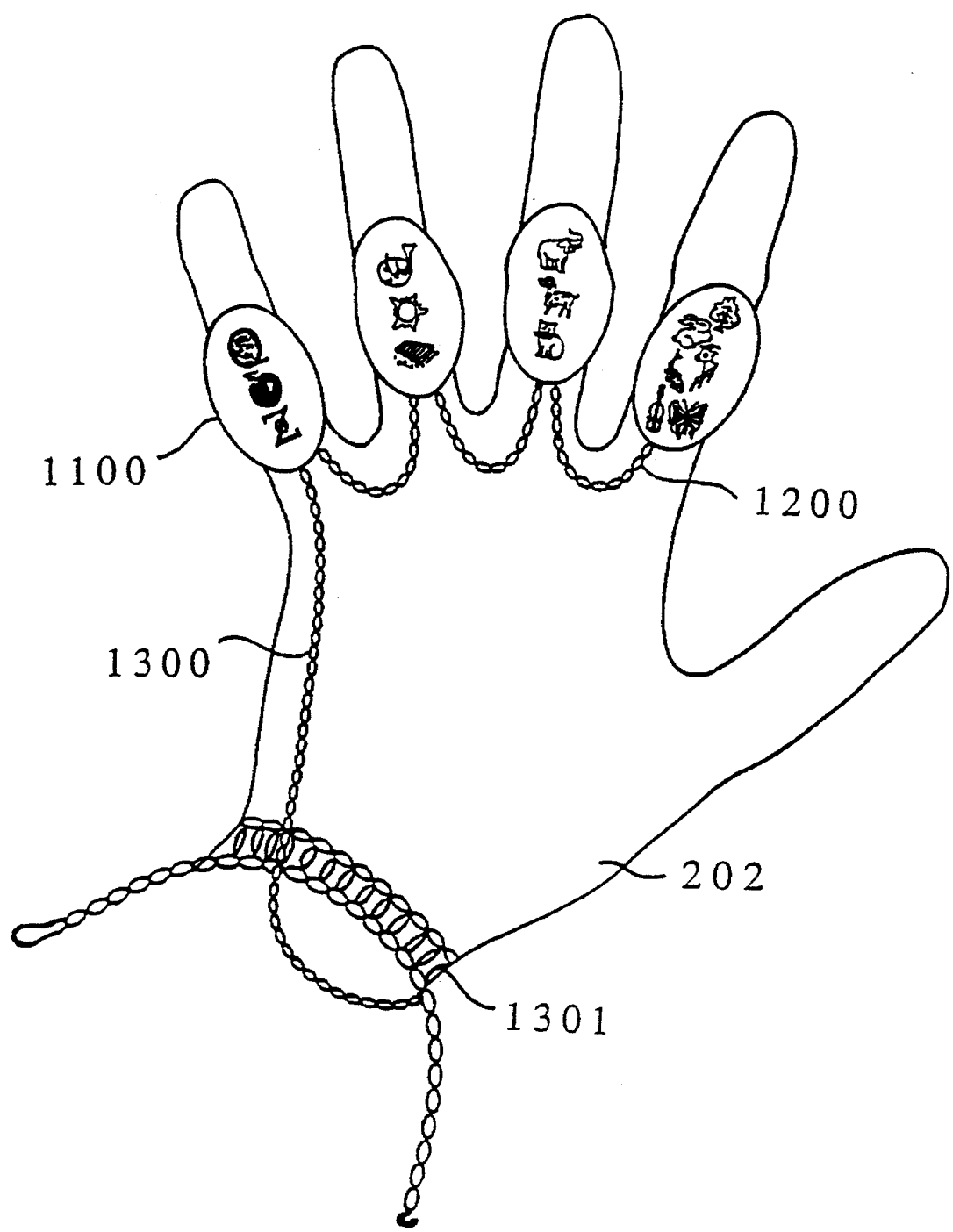
FIG. 13 depicts the set of picture-rings as shown in FIG. 12, where: 13a: the picture-ring worn on the little finger of the left hand is connected to a wrist bracelet worn on the left hand (to give a touch of simplicity to the hand); 13b: the picture-ring worn on the major finger of the right hand is attached to the top of a triangular-shaped network of chains ending at its base to a wrist bracelet worn on the right hand (to give a touch of sophistication to the hand).
Figure 13B:
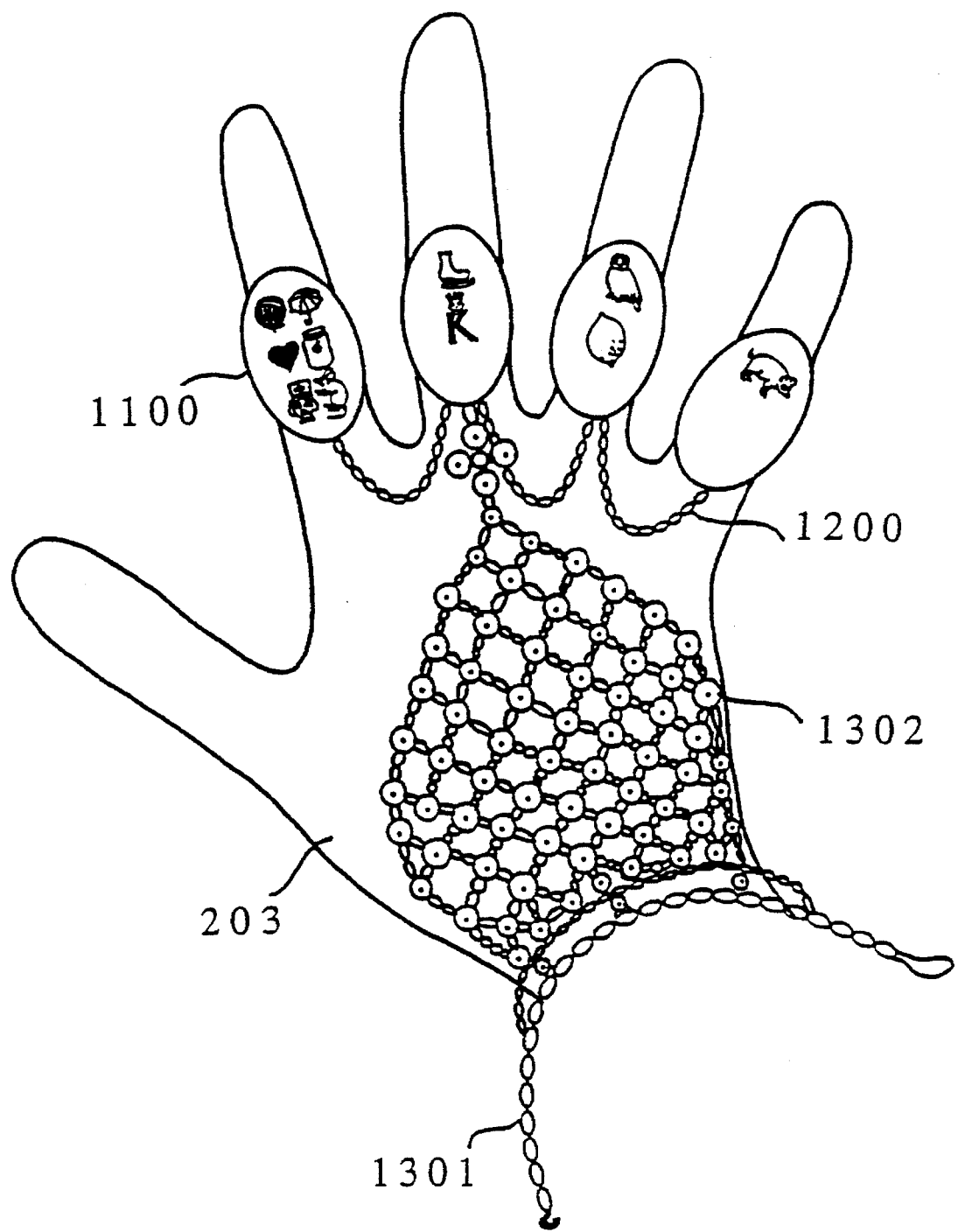

The learner interested in giving a touch of simplicity to the device could choose a configuration where the rings 1100 to be worn by the little fingers are attached by little chains 1300 to wrist-bracelets 1301 on the corresponding hands, as depicted in FIG. 13a for the left hand. For the learner interested in giving a sophisticated touch to the device, the rings to be worn on the major fingers are attached to the top of triangular-shaped networks 1302 of interconnected chains ending at their base to wrist-bracelets 1301, as illustrated in FIG. 13b for the right hand.

For ease and practicality purposes, these ring-based devices could be made out of crocheted material or out of light metal. In the former implementation, the rings themselves, the various linkages, the triangular networks of interconnections, as well as the wrist bracelets would all be crocheted; this would make the device light, attractive, safe, flexible, and expandable. In the latter implementation, the light metallic rings are interconnected by light metallic chains, and the triangular-shaped networks of interconnections are made of light, attractive, and flexible metallic chains. With such a chain-like structure of the device, the aforementioned ring objects (e.g. the Queen, the Apple, and the Zero for the left little finger) could be most harmoniously implemented as three-dimensional structures hanging loose from the ring crowns.

Medallion Rings

The need for secrecy and individuality that is so characteristic of teenagers and young adults can become a vivid learning drive with the help of medallion rings disclosed in the set of FIGS. 14–18.

Figure 14A:
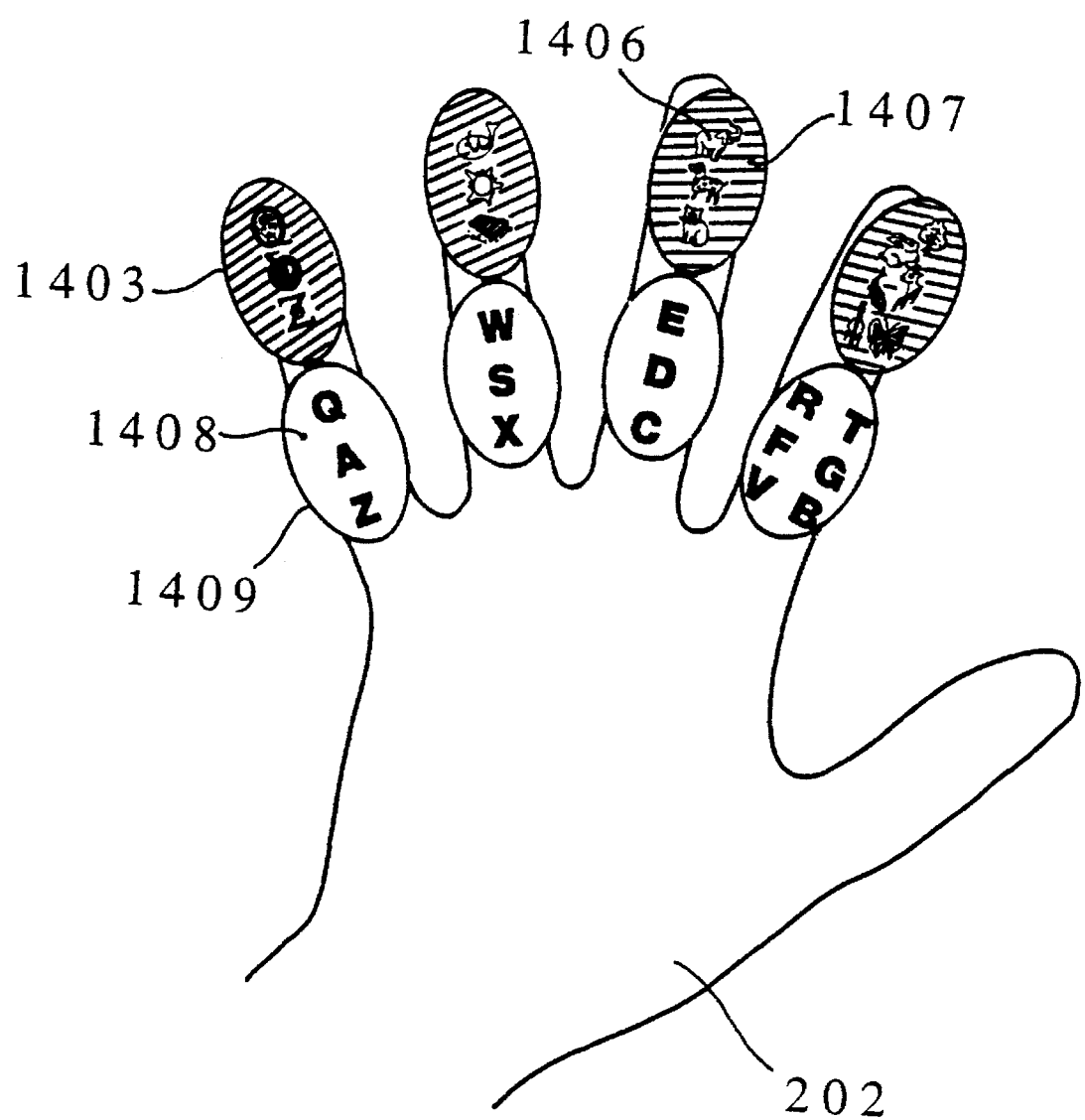
FIG. 14 depicts views of medallion picture rings crowned with decorative stones, for use by teenagers and adults: 14a: medallion picture rings worn on the left hand, with elevated view of medallions open (medallion lid in horizontal position); 14b: medallion picture rings worn on the right hand, with elevated view of medallions open (medallion lid in horizontal position); 14c: medallion picture rings worn on the left hand, with elevated view of medallions closed, and a side view of the medallion ring worn on the forefinger; 14d: medallion picture rings worn on the right hand, with elevated view of medallions closed.
Figure 14B:
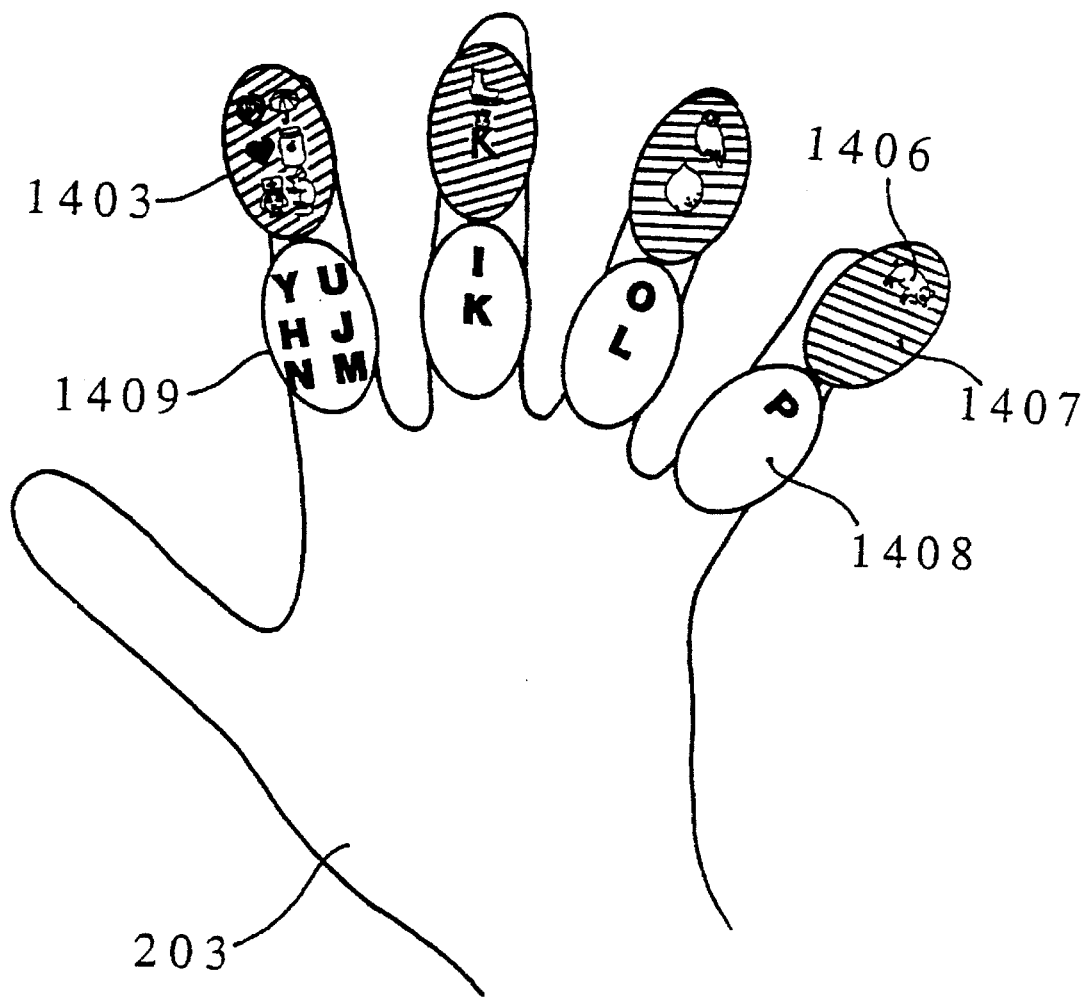
Figure 14C:
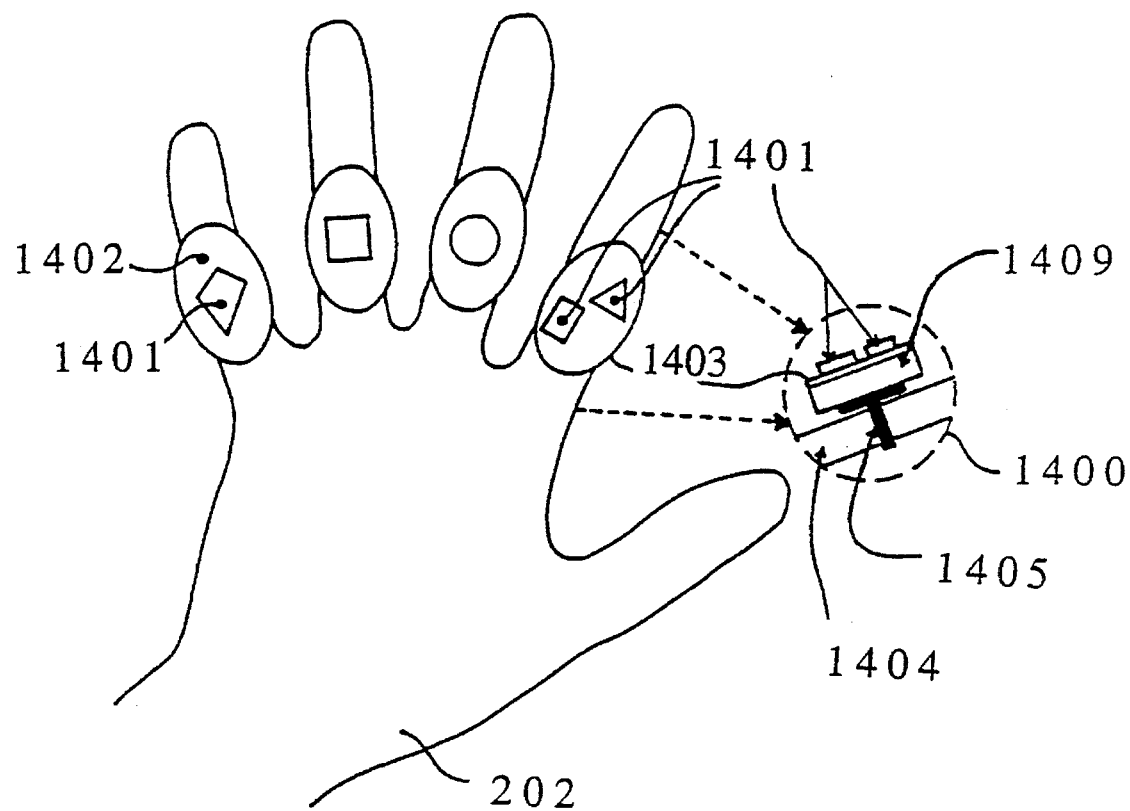
Figure 14D:
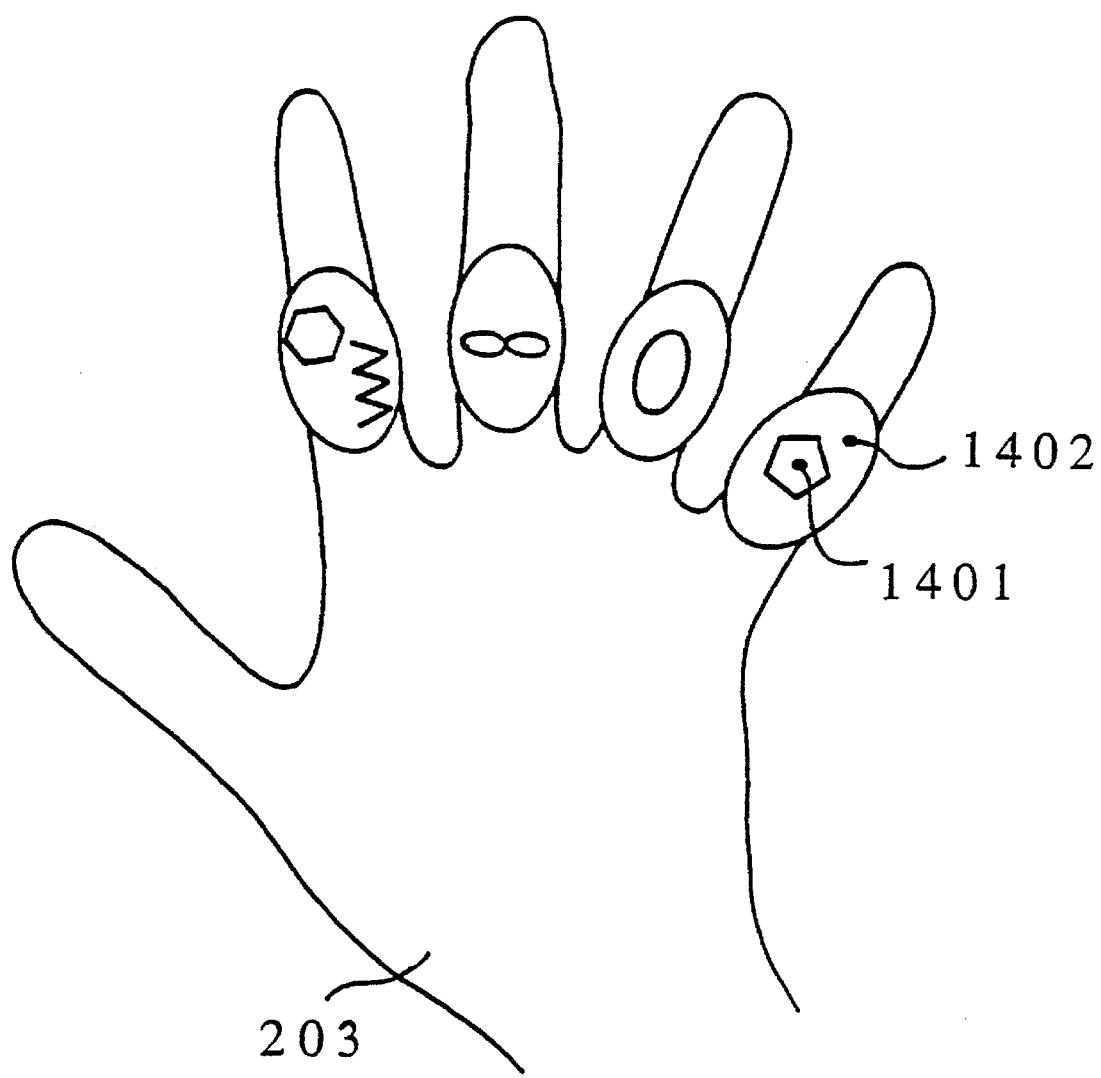
Figure 15A:
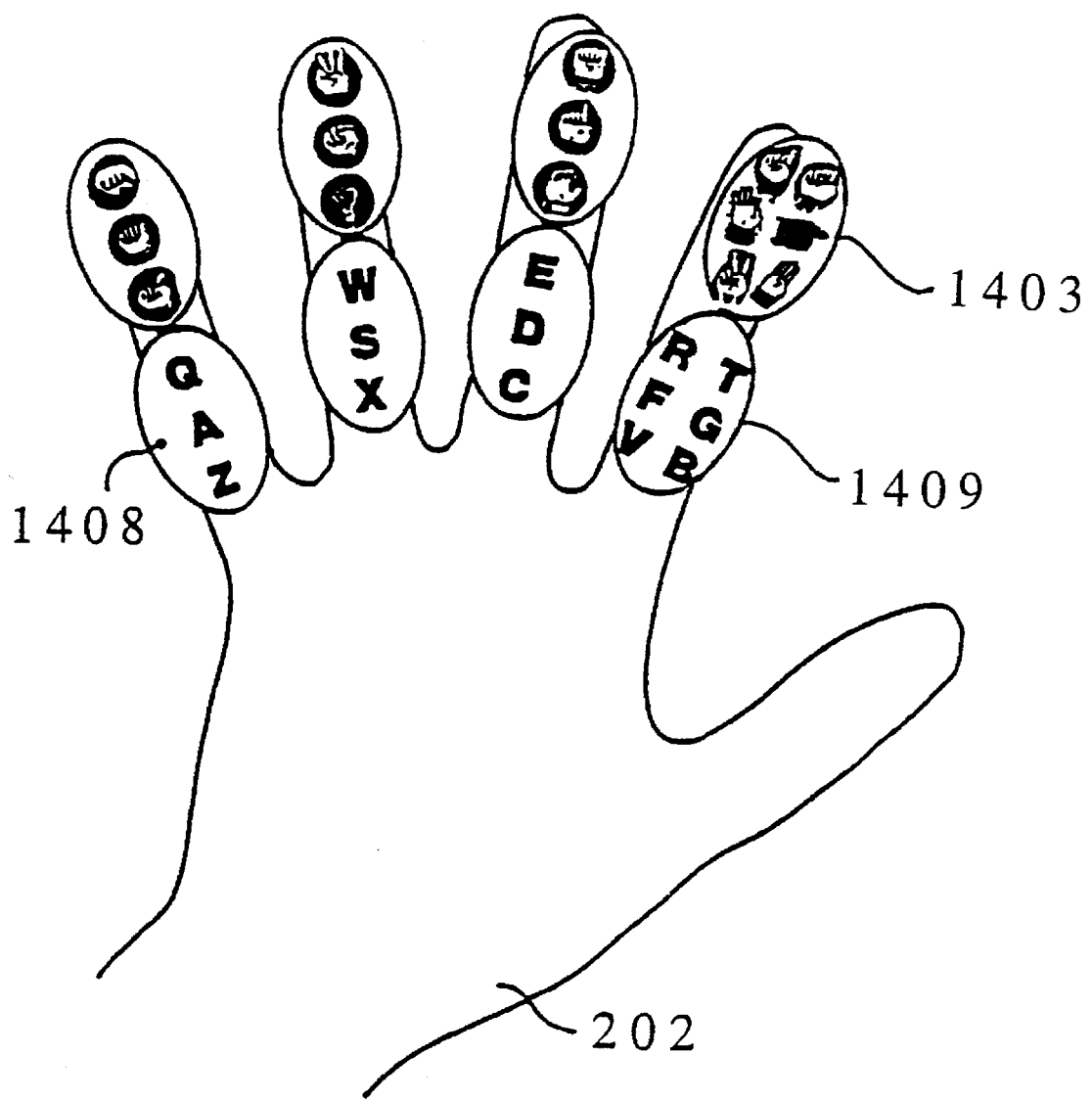
FIG. 15 depicts elevated views of medallion picture rings associated with the manual alphabet: 15a: medallion picture rings worn on the left hand of a user, with elevated view of medallions open (medallion lid in horizontal position); 15b: medallion picture rings worn on the right hand of a user, with elevated view of medallions open (medallion lid in horizontal position); 15c: medallion picture rings worn on the left hand of a user, with elevated view of medallions closed; 15d: medallion picture rings worn on the right hand of a user, with elevated view of medallions closed.
Figure 15B:
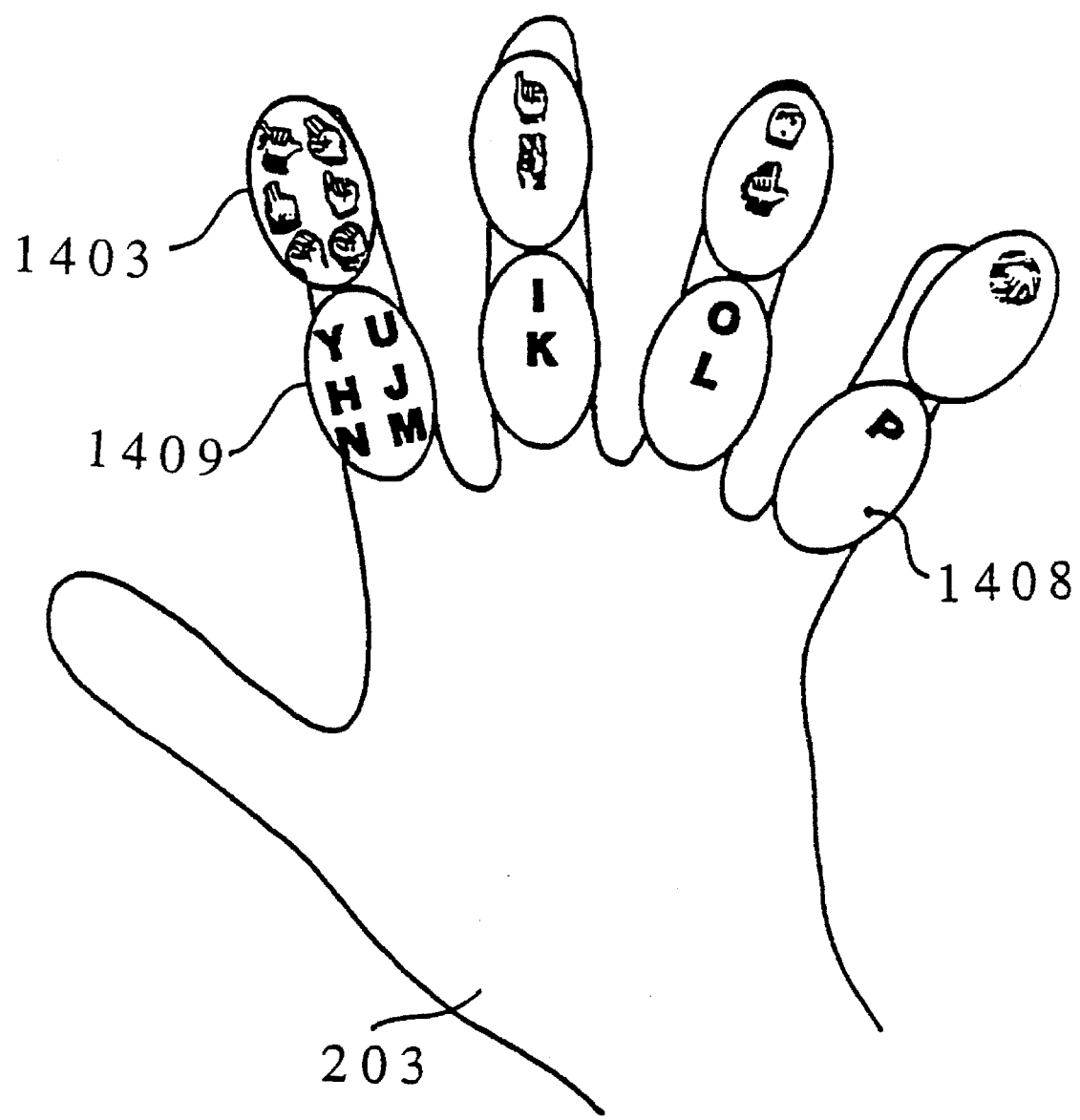
Figure 15C:
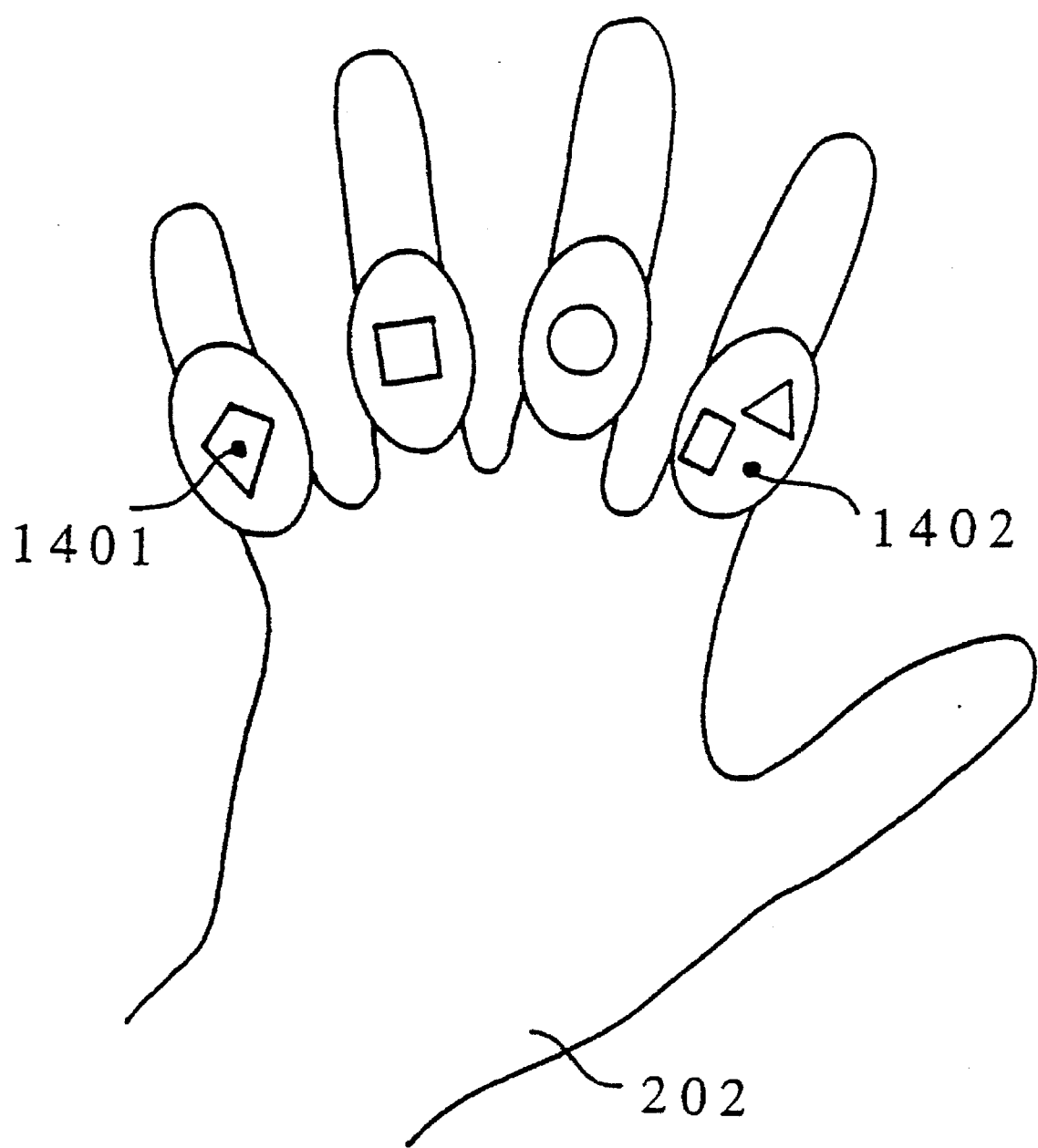
Figure 15D:
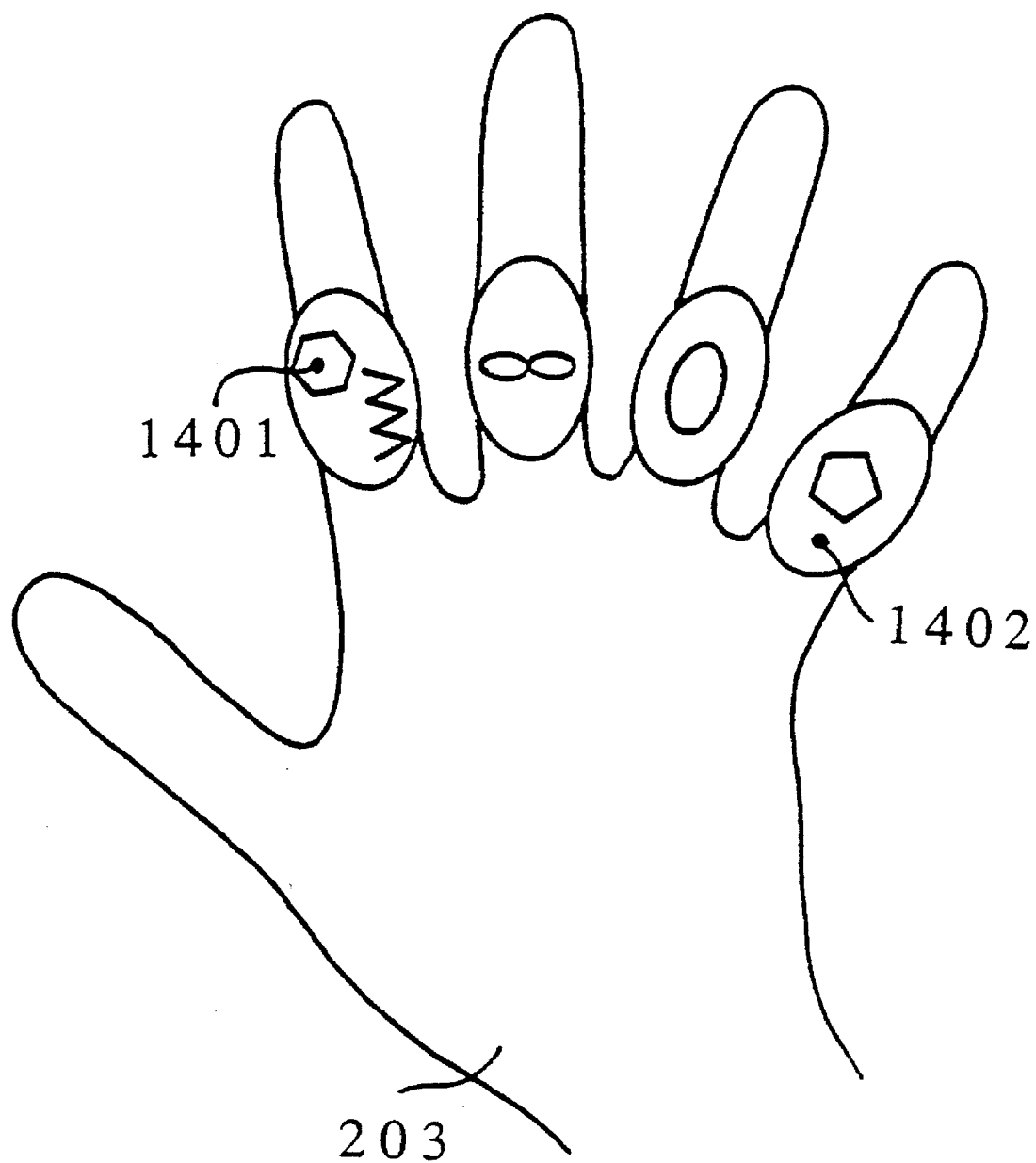
Figure 16A:
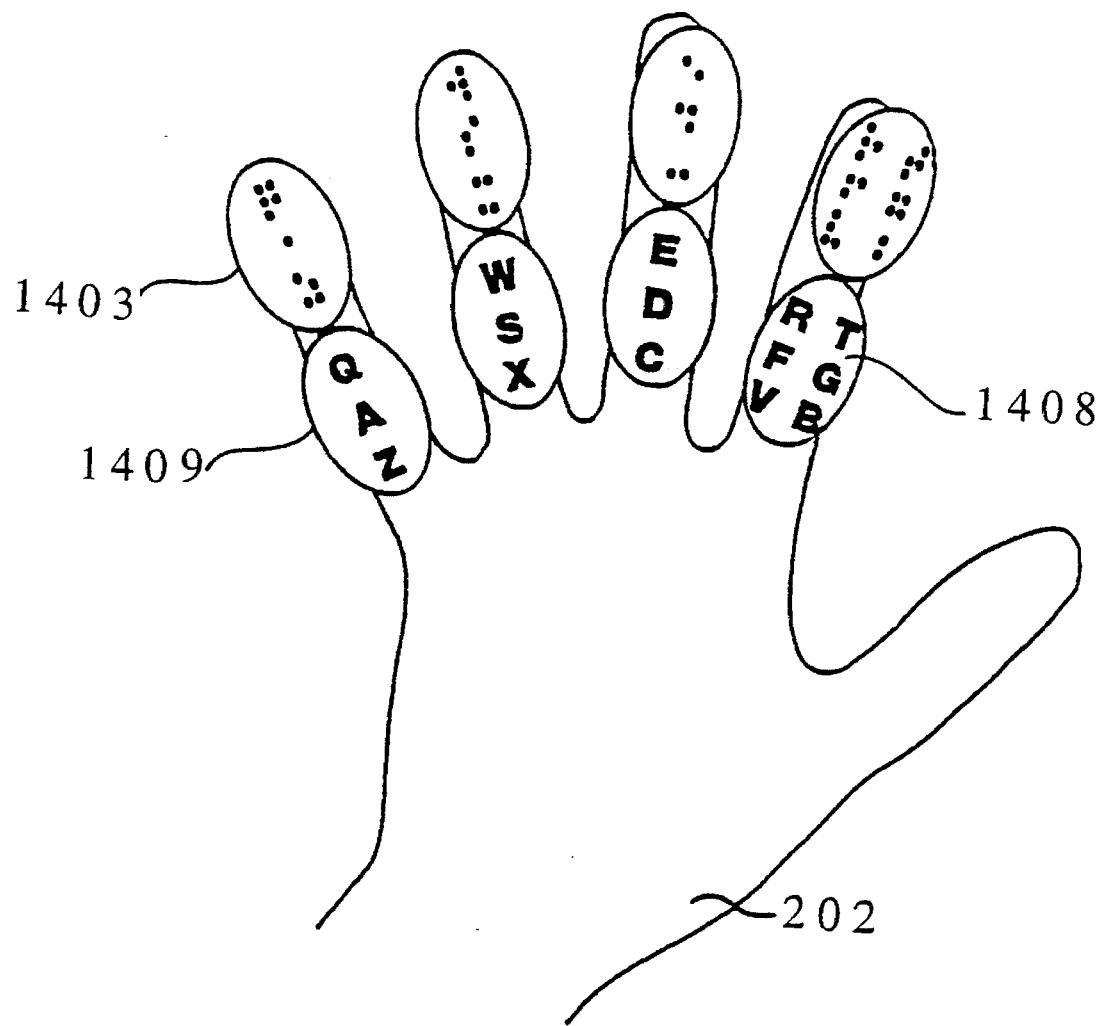
FIG. 16 depicts elevated views of medallion picture rings associated with the Braille alphabet: 16a: medallion picture rings worn on the left hand of a user, with elevated view of medallions open (medallion lid in horizontal position); 16b: medallion picture rings worn on the right hand of a user, with elevated view of medallions open (medallion lid in horizontal position); 16c: medallion picture rings worn on the left hand of a user, with elevated view of medallions closed; 16d: medallion picture rings worn on the right hand of a user, with elevated view of medallions closed.
Figure 16B:
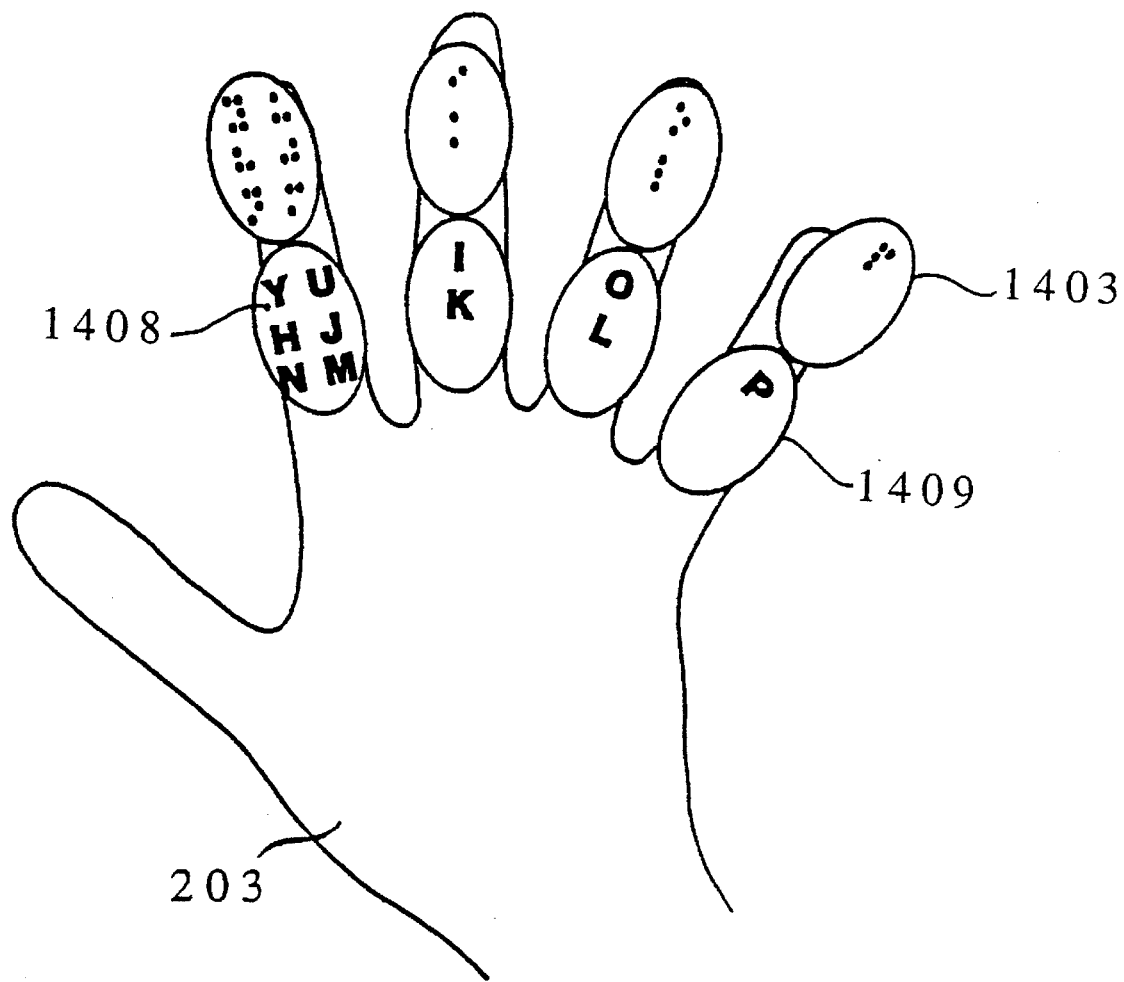
Figure 16C:
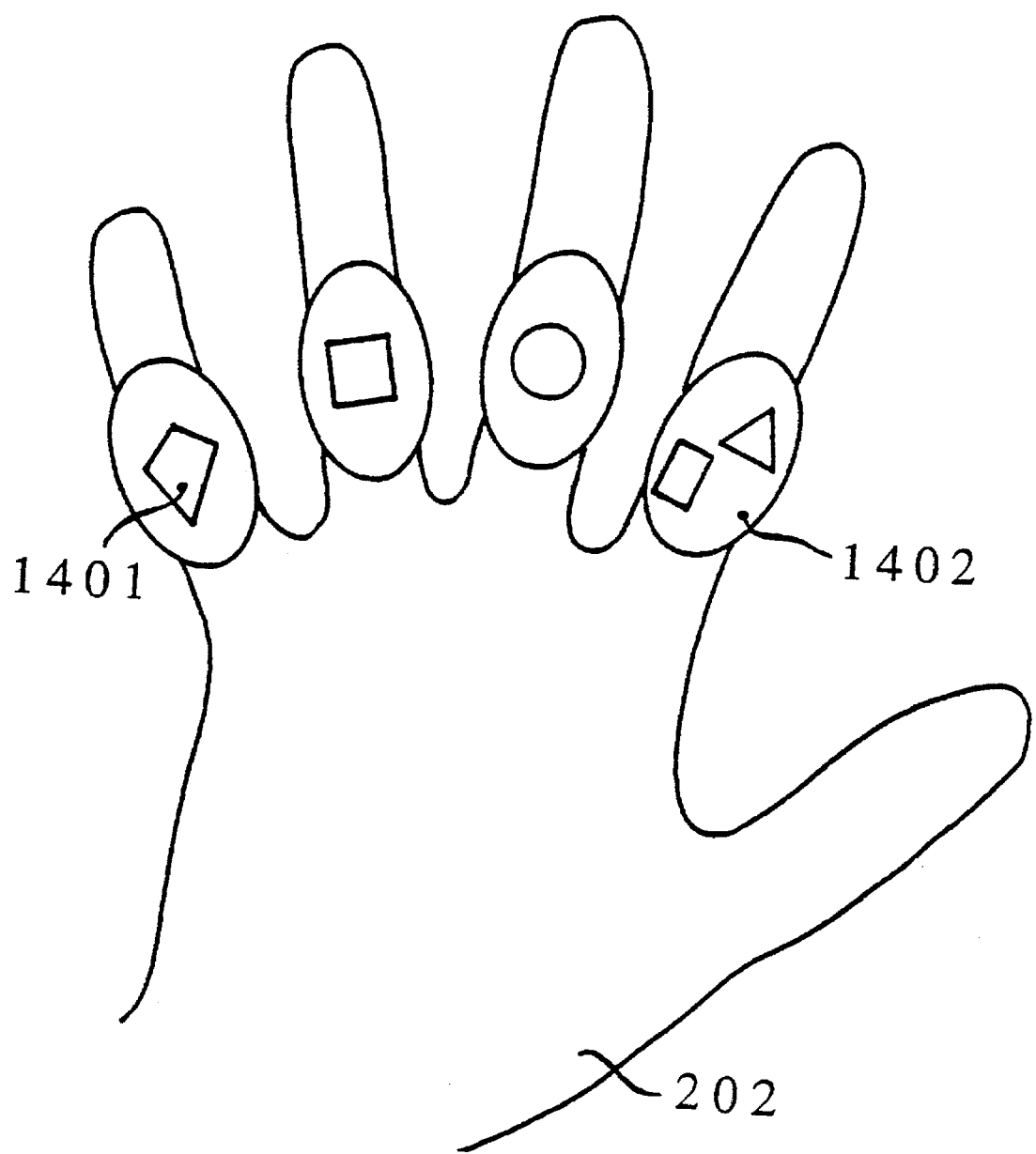
Figure 16D:
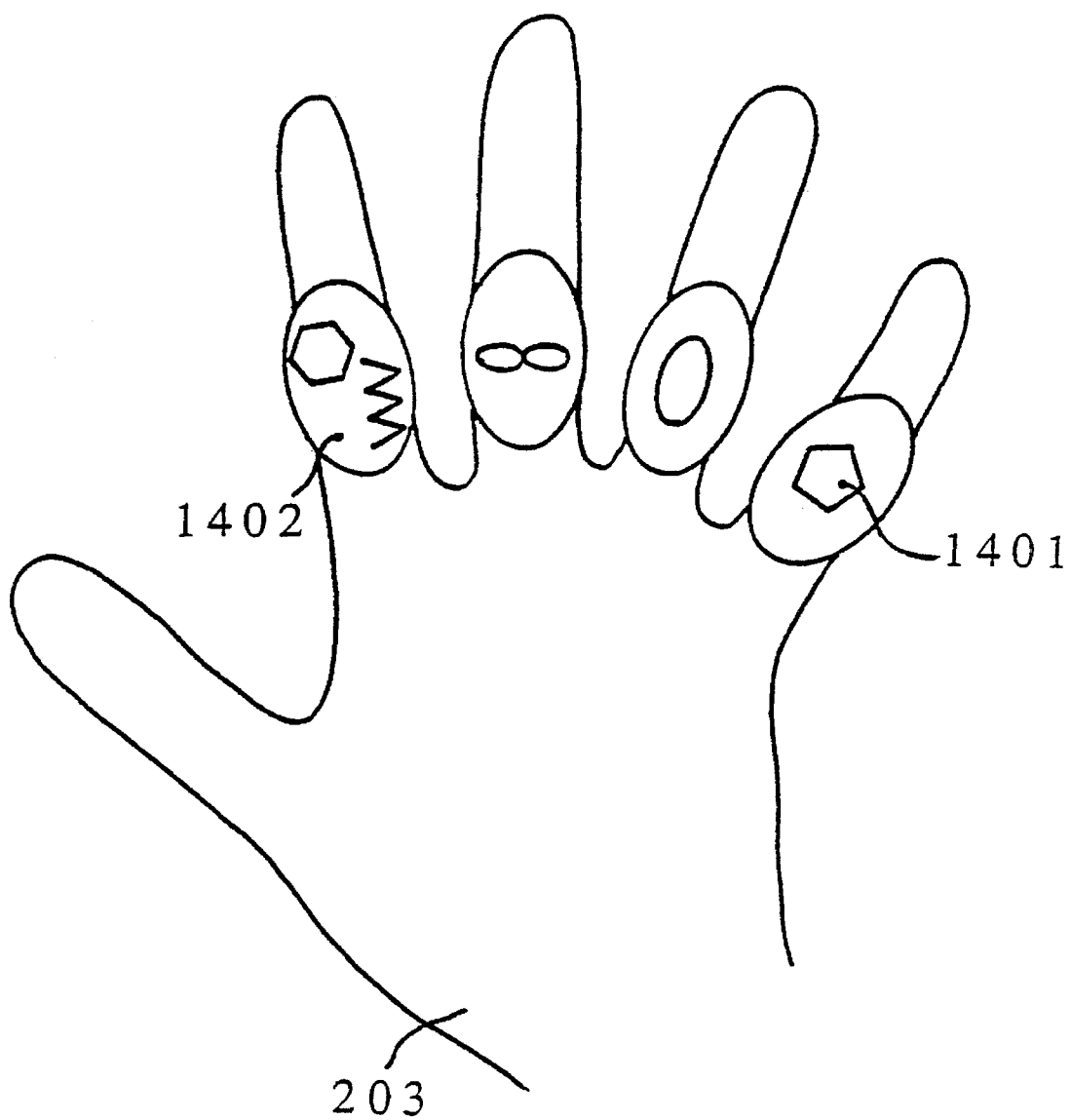

FIGS. 14c & 14d show the ring medallions in closed position on the left hand 202 and right hand 203 respectively. FIG. 14c provides a side view 1400 of a medallion ring worn on the left forefinger, with the medallion in closed position. A stone 1401 (either rhinestone or gemstone) is mounted on the external surface 1402 of each medallion lid 1403 as depicted in FIG. 14. The stone color matches that of the color-coded key of the keyboard to be struck by the finger 1404 wearing the ring 1405 crowned with the stone 1401. In addition, the stones are cut in shapes that define geometrical patterns which pattern names start with a letter corresponding to the key of the keyboard to be struck by the finger wearing the shaped stone. As shown in the illustration of FIG. 14c for the left hand, the pink stone of the little finger is shaped as a Quadrangle, the red stone of the ring finger is shaped as Square, the green stone of the major finger is shaped as a Circle, the yellow stone of the fourth finger is shaped as a Rectangle, and the orange stone of the fourth finger is shaped as a Triangle. Likewise for the right hand depicted in FIG. 14d, the orange stone of the fourth finger is shaped as an Hexagon, the yellow stone of the fourth finger is shaped in a Jigsaw pattern, the green stone of the major finger has the symbolic shape of Infinity, the red stone of the ring finger is shaped as an Oval, and the pink stone of the little finger is shaped as a Pentagon.

To assist in the learning of the keyboard, the aforementioned ring objects are now mounted on the internal surface of the medallion lid, as illustrated in FIGS. 14a & 14b representing the ring medallions in open position on the left and right hands respectively. For practicality purposes, the medallion lids 1403 open towards the finger tips, and close towards the wrist. The ring objects could either be raised surfaces (e.g. 1401), flat surfaces (e.g. 1101), or three-dimensional structures (e.g. 1201) mounted on, or magnetically attracted to, the internal surface of the medallion lid 1403. The magnetic attraction may, for example, be effected by having internal, movable sides 1403 of the medallions comprising first magnets 1407 and bases of the three-dimensional structures comprising second magnets 1406 of opposite polarity of the first magnets 1407. There would therefore be generated attractive forces between the first and second magnets binding the three-dimensional structures onto the internal, movable side of the medallions. The internal surface 1408 of the medallion base 1409 of a ring medallion shows the precise letter(s) of the key(s) of the keyboard to be struck by the finger of the hand wearing the corresponding medallion rings. Although depicted as oval forms in the accompanying figures, the ring medallions can be of any shape, height, and width provided safety and practicality are preserved.

These medallion rings also allow teenagers as well as adults to learn the manual alphabet in the context of the key-finger assignment of the keyboard, as shown in FIG. 15. The sign language representations[4] of the letters that are engraved in a medallion base are affixed on the internal surface of the lid 1403 of the same medallion. Likewise, the Braille alphabet can be conveniently learned by indicating the Braille representation of the letters on the inner side of the medallion lids, as depicted in FIG. 16. The Braille alphabet is implemented as a set of raised dots for the visually-impaired learner.

[4] "Handmade ABC: A Manual Alphabet", by Linda Bourne, Addison-Wesley Publishing Company, Inc., 1981.

Language/Medallion Rings

To assist a learner in learning a language at his/her own pace, the aforementioned medallion rings, consisting of a medallion lid 1403 mounted to a medallion base 1409 itself mounted on a ring 1405, are extended to adaptive electronic medallion rings and adaptive mechanical medallion rings.

Figure 17A:
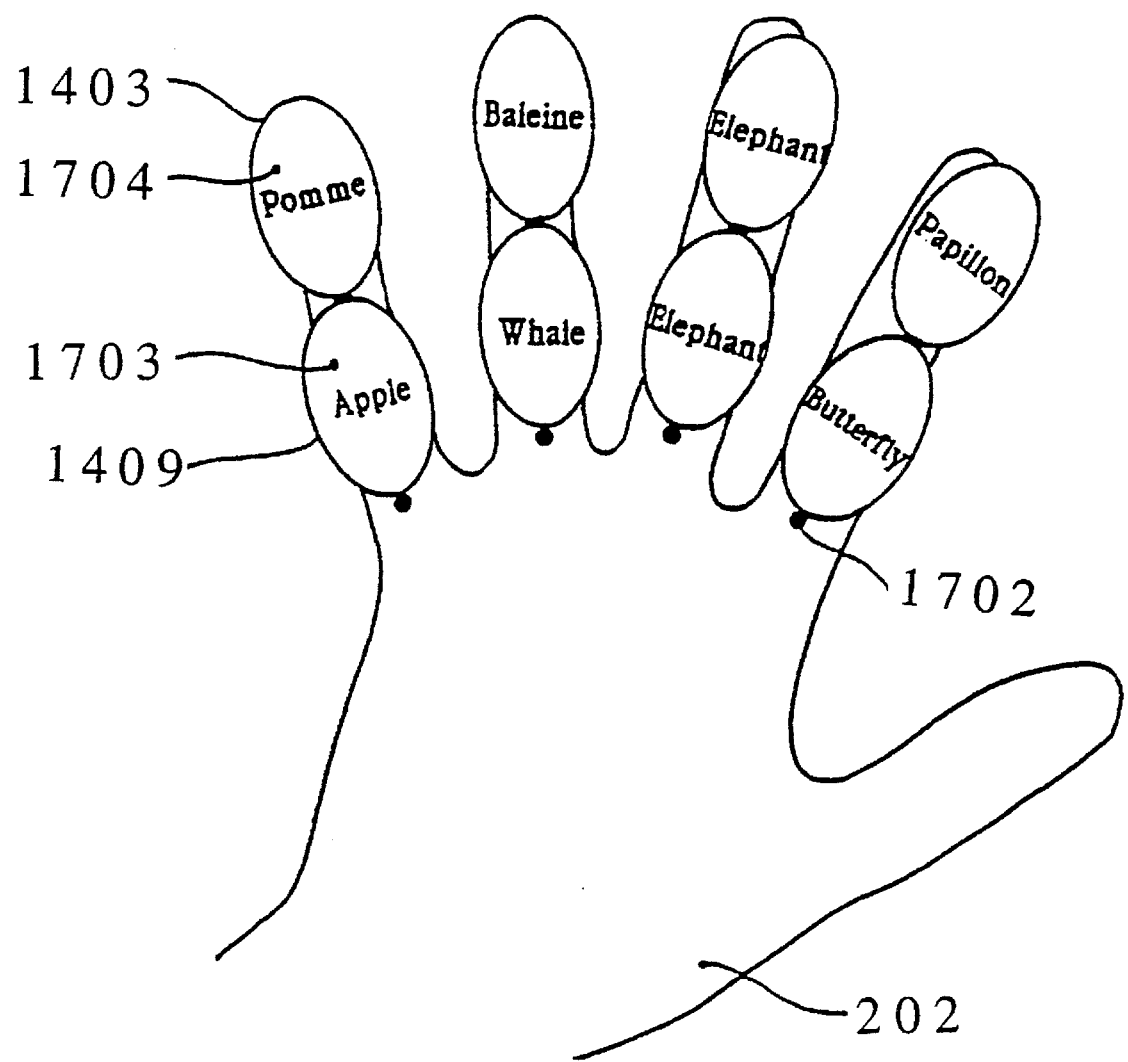
FIG. 17 depicts adaptive electronic medallion rings crowned with decorative stones, for assisting in the learning of spelling and vocabulary: 17a: electronic medallion rings worn on the left hand of a user, with elevated views of medallions open (medallion lid in horizontal position); 17b: electronic medallion rings worn on the right hand of a user, with elevated views of medallions open (medallion lid in horizontal position); 17c: electronic medallion rings worn on the left hand of a user, with elevated views of medallions closed, and a side view of the electronic medallion ring worn on the forefinger. 17d: electronic medallion rings worn on the right hand of a user, with elevated views of medallions closed. 17e: front view of an electronic medallion ring with medallion in open position; 17f: side view of an electronic medallion with medallion in open position.
Figure 17B:
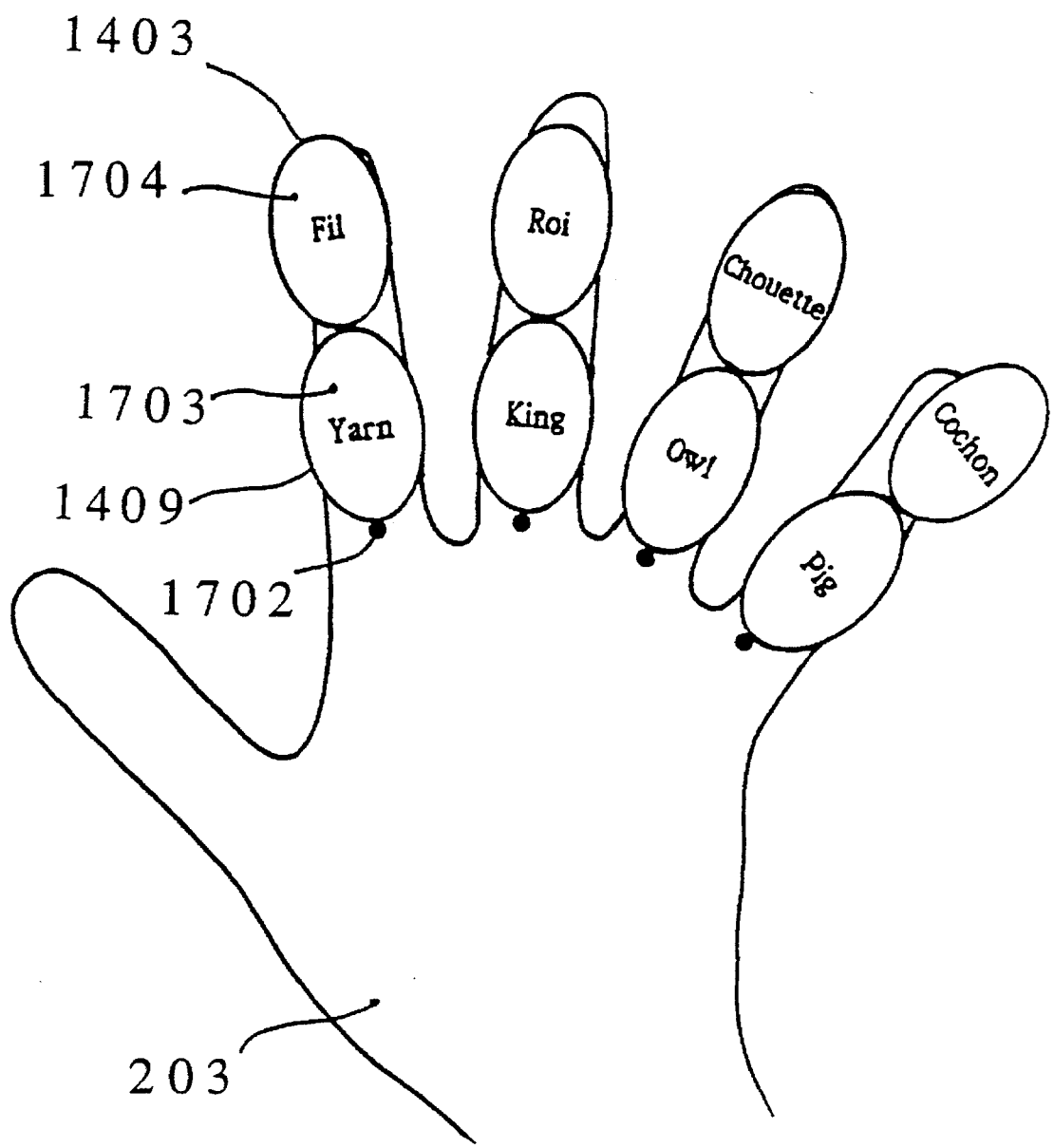
Figure 17C:
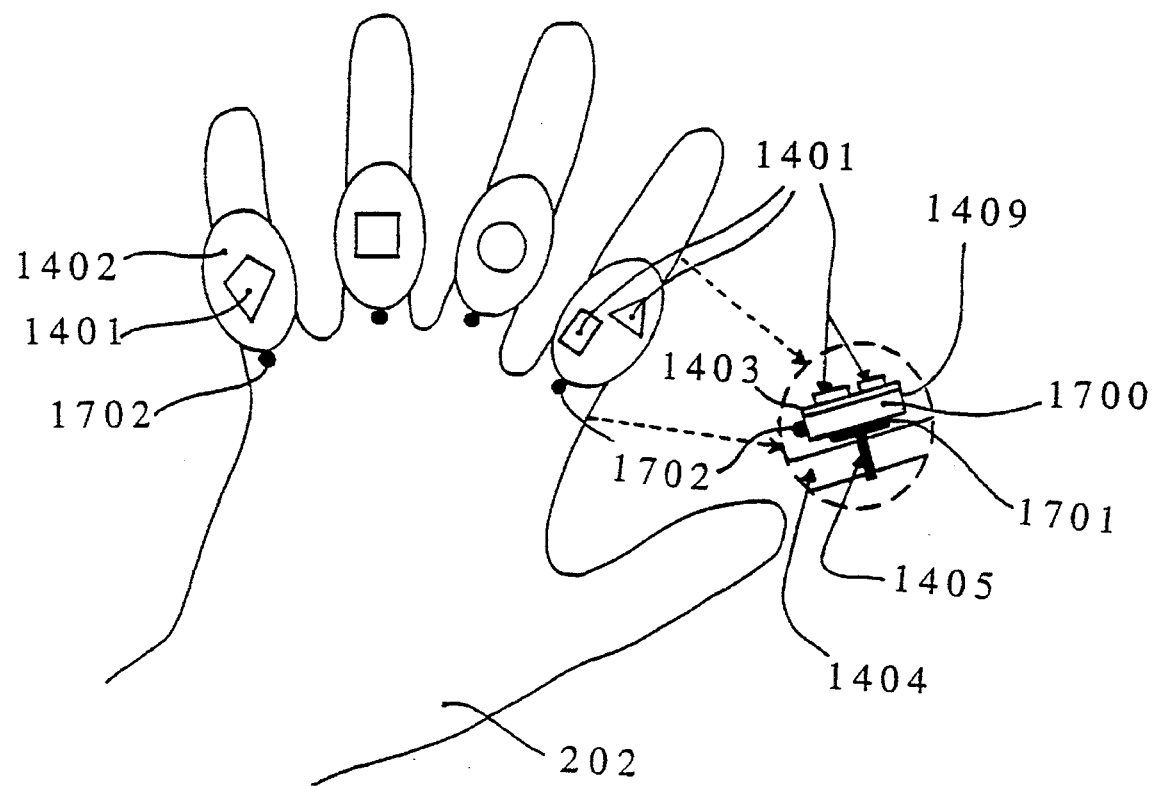
Figure 17D:
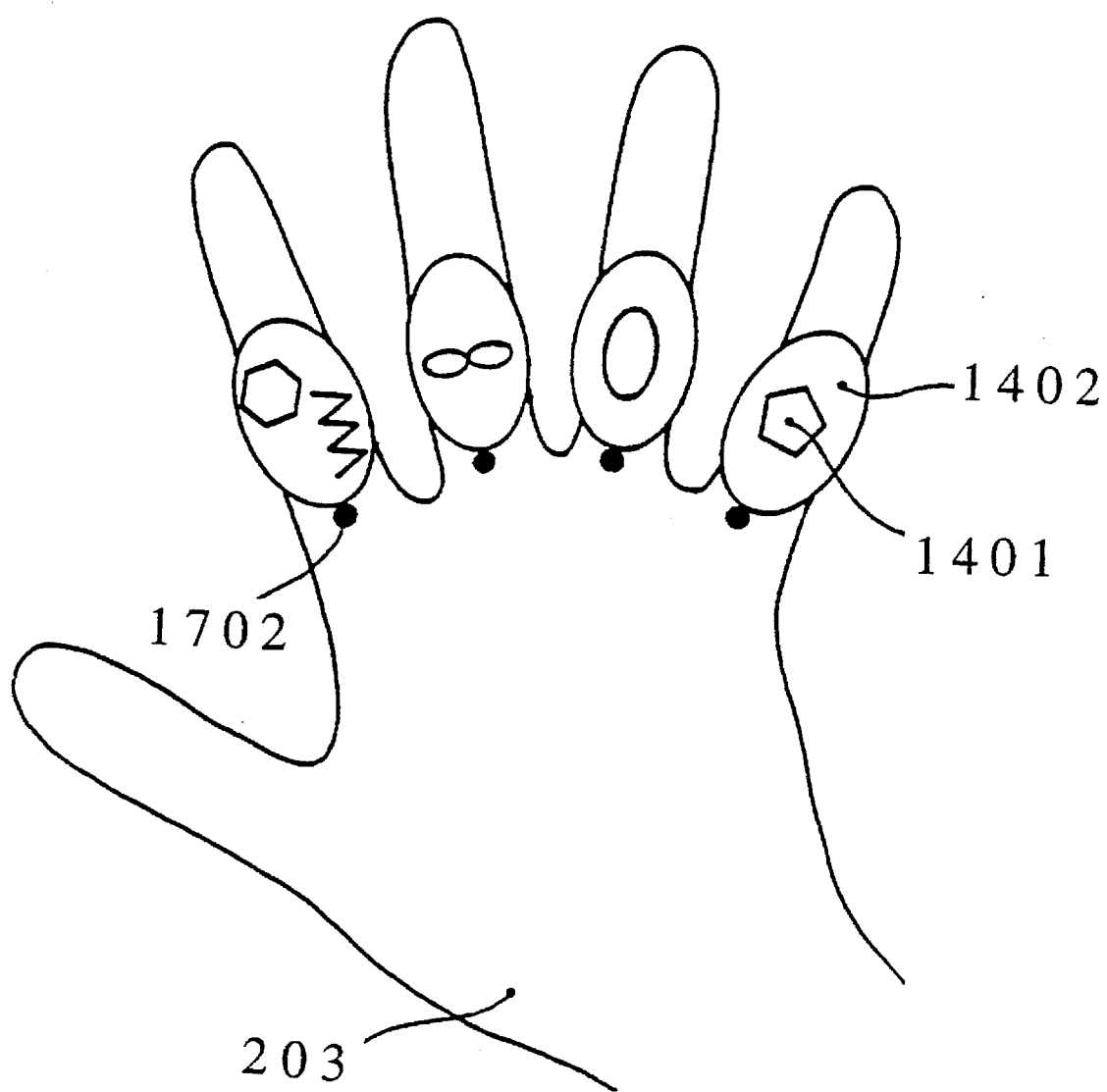
Figure 17E:
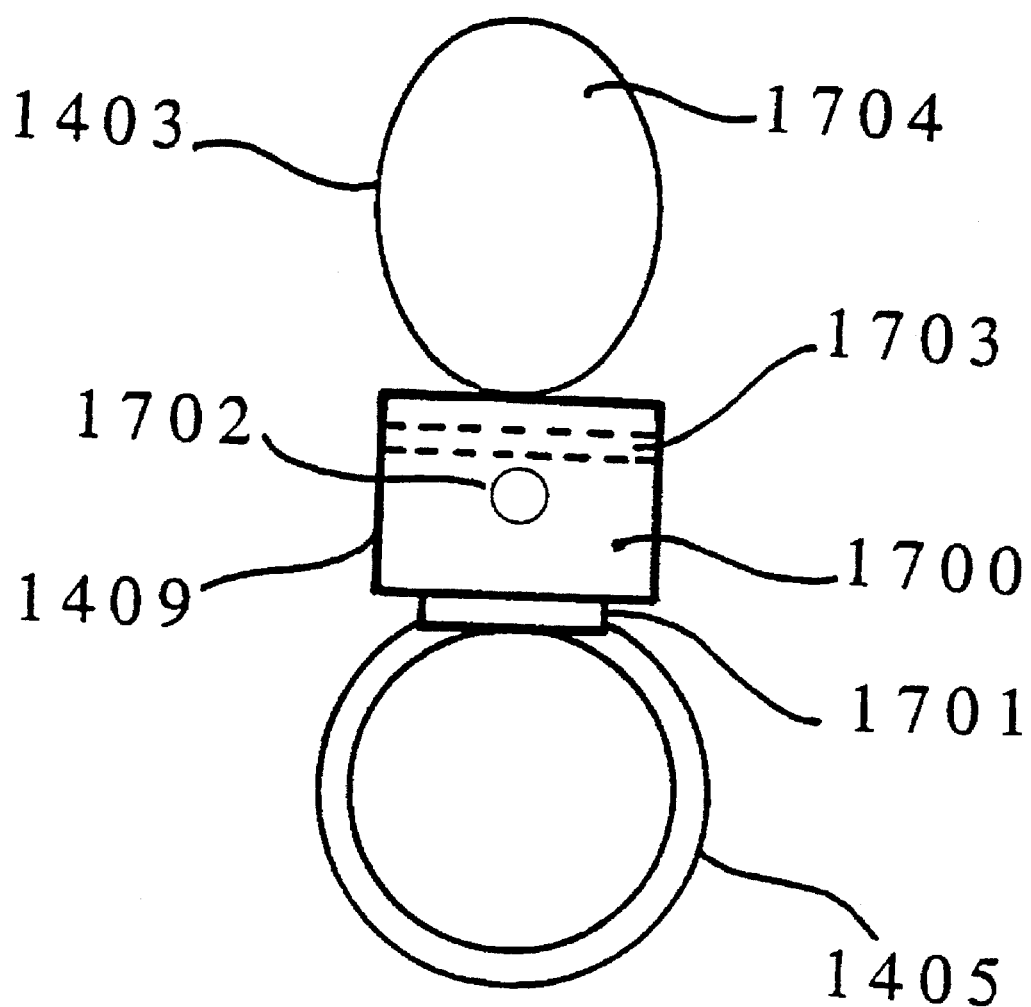
Figure 17F:
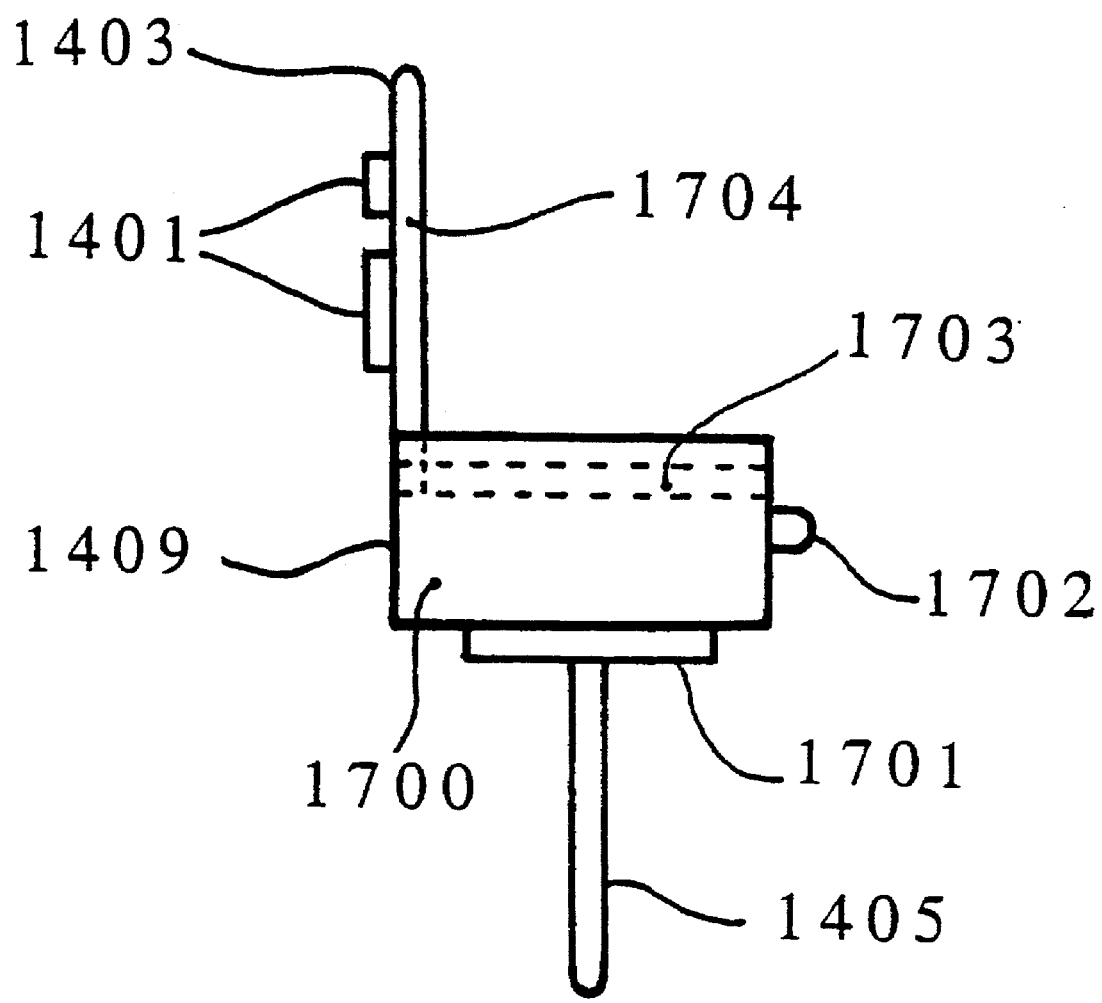
Figure 18A:
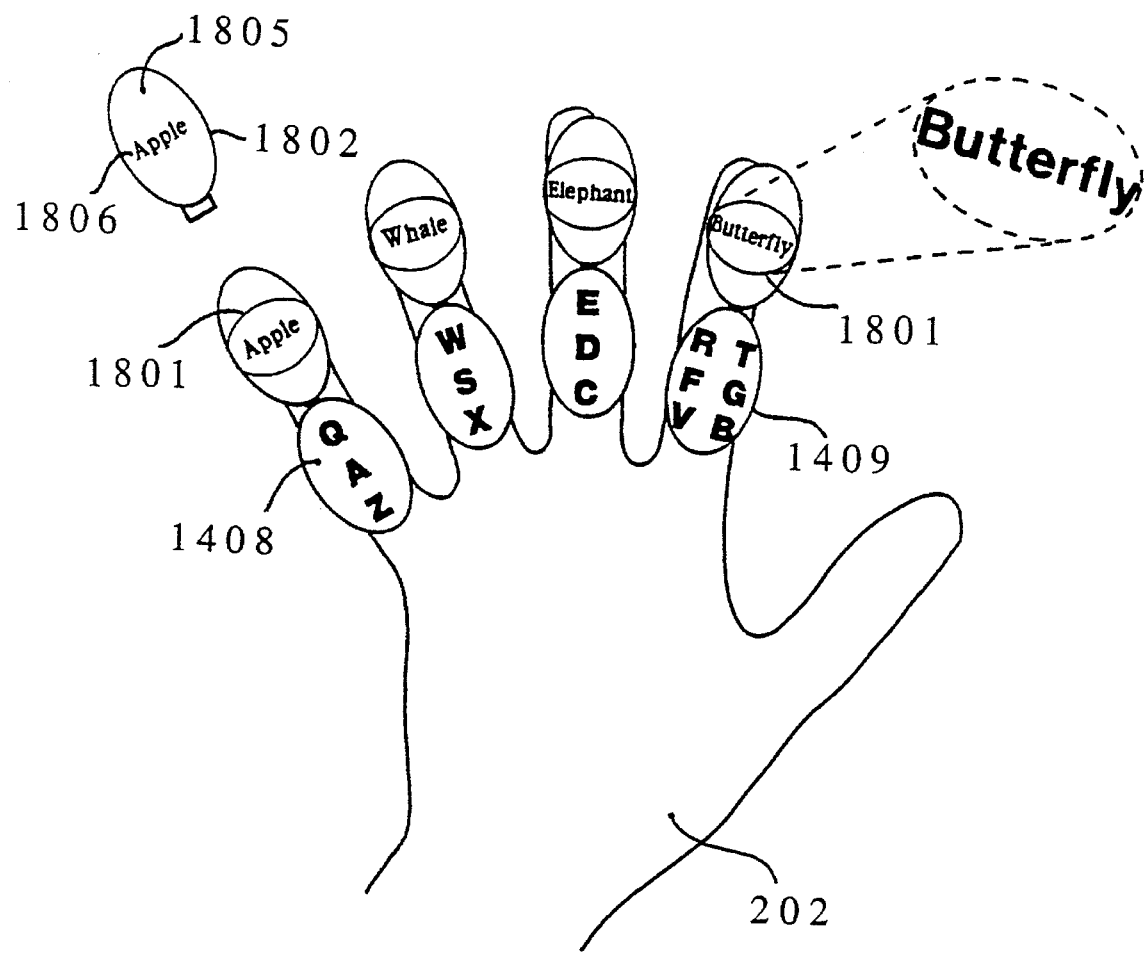
FIG. 18 depicts the adaptive mechanical medallion rings for spelling and vocabulary: 18a: medallion picture rings worn on the left hand of a user, with elevated views of medallions open (medallion lid in horizontal position); 18b: medallion picture rings worn on the right hand of a user, with elevated views of medallions open (medallion lid in horizontal position); 18c: medallion picture rings worn on the left hand of a user, with elevated views of medallions closed. 18d: medallion picture rings worn on the right hand of a user, with elevated views of medallions closed.
Figure 18B:
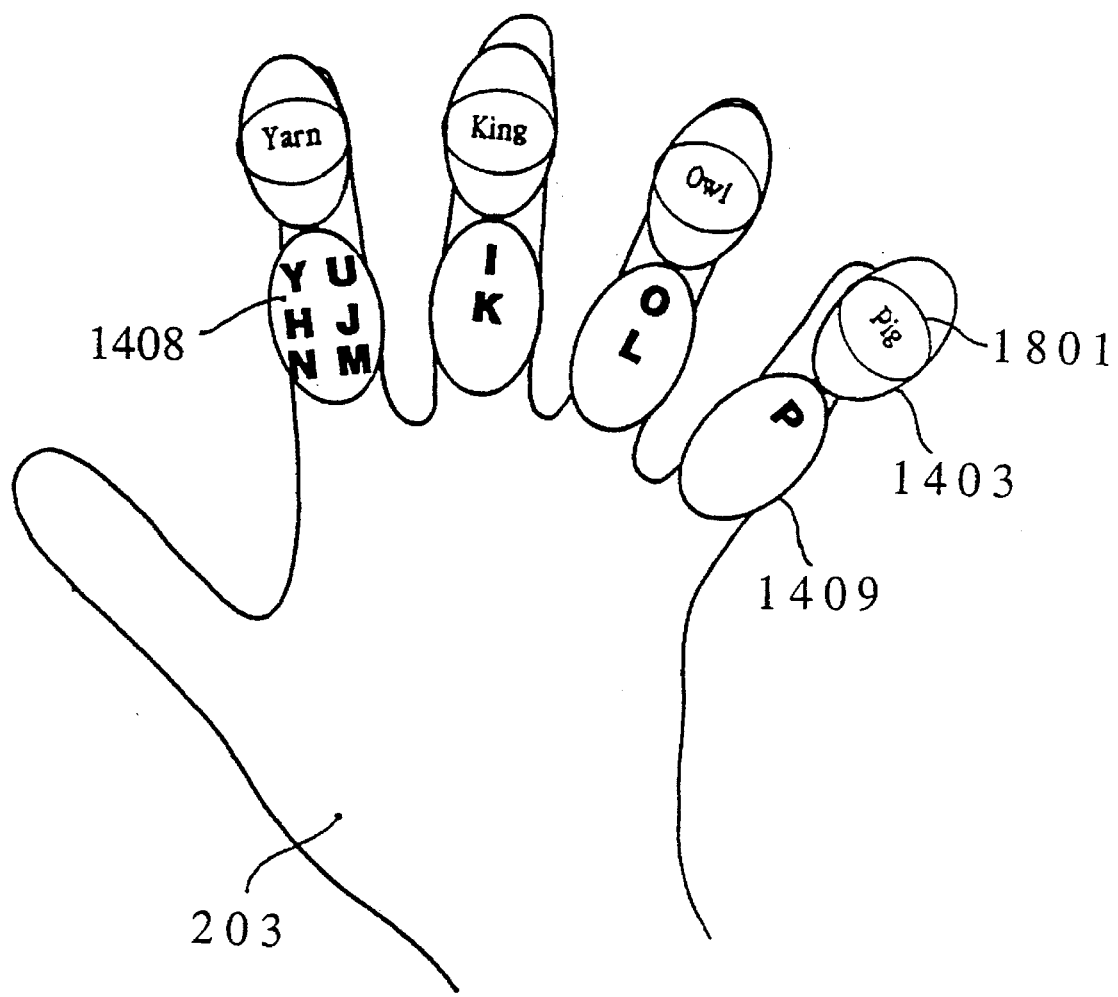
Figure 18C:
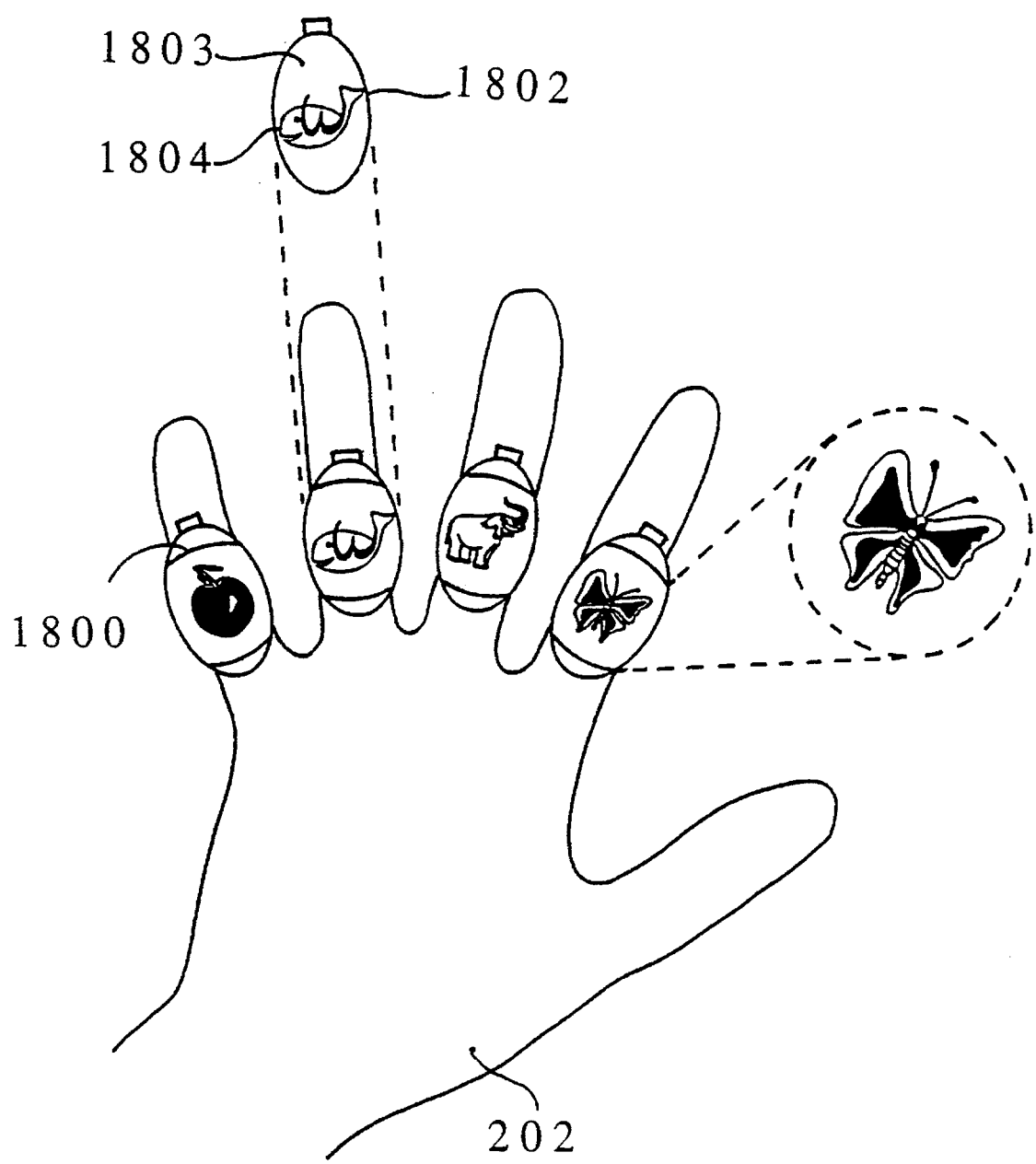
Figure 18D:
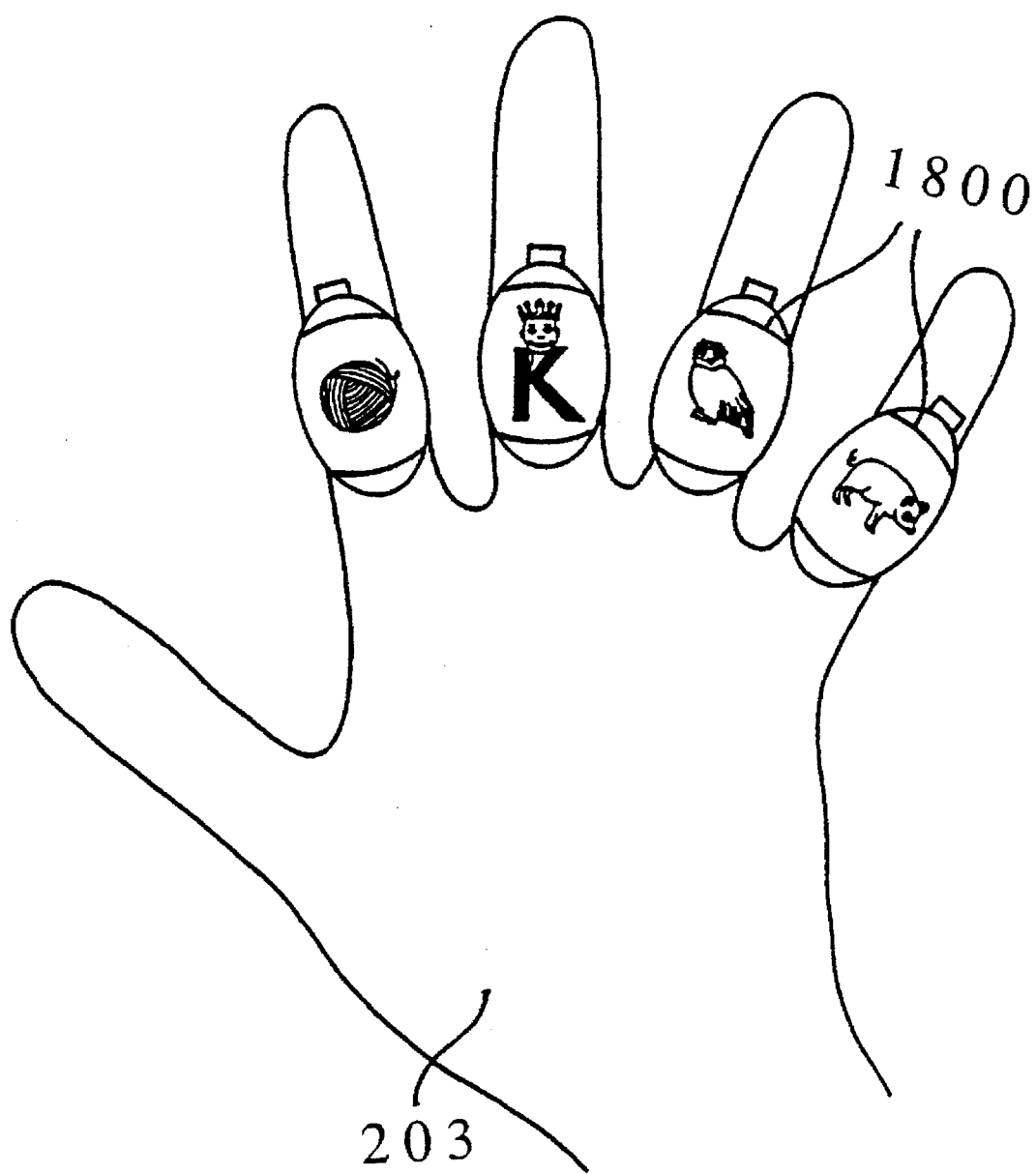

The adaptive electronic medallion rings are depicted in FIGS. 17a & 17b in the open position, and in FIGS. 17c & 17d in the closed position. As shown in FIG. 17c, the medallion now contains a simple electronic device 1700 that is powered by a battery 1701, and switches to "on" or "off" whenever the medallion lid 1403 is "open" or "closed". This electronic device 1700 is a special purpose computer which, for economy purposes, would consist of an electronically activated memory (e.g. read-only-memory), connected at its input to a switch permitting incremental memory addressing, and at its output to an appropriate output display (e.g. liquid crystal display or LCD). The electronic device serves the purpose of storing and retrieving sets of pairs of original indicia and secondary indicia wherein the original indicia indicates the spelling of words beginning with the letter corresponding to the key of the keyboard to be struck by a particular finger of the hand. Furthermore, the secondary indicia may indicate a foreign language translation of the word indicated by the original indicia. Incremental memory addressing would be achieved by pushing and releasing the pop-in-and-out switch key 1702 (most conveniently located at the front end of the medallion ring as shown in FIG. 17). In other words, by popping in, and subsequently releasing the switch key 1702, a learner/user would switch the current address of the memory of the electronic device 1700 to the next memory address in order to output the memory content (i.e. digital representation of indicia) at the new memory address onto a connected output display. This simple implementation would enable the learner/user to generate various indicia corresponding to the character(s) associated with keyboard keys to be struck by the fingers wearing the corresponding electronic ring medallions (FIG. 17). For translation purposes, the memory of each medallion would have been programmed in advance, and would contain an exhaustive collection of English words together with their corresponding foreign language translation. For example, the memory content of the electronic medallion of the little finger would comprise a series of names starting with the letter Q, A, or Z, which names would have been either randomly or orderly pre-written in memory. In the embodiment shown in FIG. 17, the English words appear on an output display 1703 niched within the medallion base 1409, and their foreign correspondents appear on an output display 1704 located on the inner side of the medallion lid 1403. For each language, there would be a pre-programmed set of such adaptive electronic medallion rings.

The adaptive mechanical medallion rings are depicted in FIG. 18 for learning vocabulary. The lid of a mechanical medallion consists of a pair of glasses, between which glasses the learner would insert and remove at his/her own pace thin insertable labels 1802 representing an object on one side, and its English spelling or foreign translation on the other side. For each language, there is an exhaustive set of such insertable labels 1802. On each of these insertable labels 1802, there may be printed, painted or drawn on the first side 1803 a set of external indicia 1804. On the second side 1805, a set of upper internal indicia 1806 may be printed, painted or drawn. These are shown in FIGS. 18a and 18c. Furthermore, the insertable labels may be thin labels made of paper or plastic. The subset of insertable labels associated with a given medallion would comprise names starting with one of the letters corresponding to the key of the keyboard which is to be struck by the finger wearing the medallion. For example, if the mechanical medallion rings are to assist an illiterate adult in learning how to read, write, or spell, the medallion of the left little finger would contain a collection of insertable labels showing objects and their English names starting with Q, A, or Z, as in the example of FIG. 18. For practicality purposes, the medallion lids could also include a pair of magnifying glasses to facilitate object visualization and reading of the names, if needed. For example, the medallions may comprise external magnifying glasses 1800 which are permanently mounted on the external side thereof, and internal magnifying glasses 1801 permanently mounted on the internal, movable side thereof.

The collection of thin labels 1802 may be contained within an auxiliary box. A first side 1803 of the thin labels contained within the auxiliary box may show different sets of external indicia 1804, and the second side 1805 of the thin labels may show different sets of upper internal indicia 1806. The auxiliary box may contain a diverse collection of the thin labels 1802.

Self-Expression/Medallion Rings

The aforementioned adaptive mechanical medallion rings can also be used to facilitate serf-expression and conflict resolution among teenagers, and even more generally adults. The set of insertable labels would now include the photos of people, pets, or objects having a direct impact on the life or conflict of the teenager or adult. The real names of such people, pets, and objects would be written on the opposite side of these thin labels, which would either be inserted in the corresponding medallion lids, or kept in the medallions themselves. By promoting self-expression and facilitating conflict resolution, the therapeutic medallion rings would be the object of substantial attention from the learner, which would further reinforce the memorization of the keyboard.

Such diversified sets of rings will give teenagers the opportunity to explore and create their own world by choosing the type of objects they like, and the type of stories that they like to create with these objects. They will also provide teenagers with a healthy and challenging means of communication among peers and with their parents. The practicality and attractiveness of these rings make them also convenient to wear during a variety of activities, such as walking, watching TV, driving, etc. Yet, these rings will also discipline the thought processes of the teenagers by directing their imagination to remain within the limitation of the keyboard.

The learning of characters, and their association with the keys of a keyboard, initiated with the help of audio-visual-tactile means such as the aids 1900 and 1901, can be further reinforced with the help of the two-dimensional representations 2200 and 2201, and three-dimensional representations 2300 and 2301, of a pair of hands wearing rings with indicia; and the two-dimensional representations 2202 and 2203, and the three-dimensional representations 2302 and 2303, of a pair of hands indicating the characters associated with the keyboard keys to be struck by the corresponding fingers.

Repetition and reinforcement with the aid of visualization are key factors in psycho-motor development. Giving every child time-driven opportunities to use symbols is a key-factor in the development of his intellectual abilities. It is therefore expected that the variety of learning experiences provided by the process-based use of all the aforementioned mnemonic gloves and rings constitute a unique opportunity for the child/teenager not only to acquire the psycho-motor skills required for touch-typing, but also develop the assimilation and accommodation skills required for the growth of his conceptual thinking.

In scope and spirit, this invention is thus not limited to learning the computer keyboard. It is equally well adapted to assist the child/teenager in the learning of any other finger-based man-machine interfaces, wether literary, alphanumeric, symbolic, or musical. Moreover, the benefit of this invention can be naturally extended to any other types of pictorial and symbolic associations that can help the development of cognitive and relational skills, and promote self-expression (language/therapy) towards a synergistic nurturing of mental growth and self-confidence, in other words towards a fulfilling life.

The invention has been described in detail with particular emphasis on the preferred embodiments thereof, but it should be understood that variations and modifications within the spirit and scope of the invention may occur to those skilled in the art to which the invention pertains.

I claim:

1. An educational device for learning a keyboard comprising a first set of four rings and a second set of four rings, said first set of four rings are adapted to fit the four fingers of the left-hand of a visually-impaired learner, said second set of four rings are adapted to fit the four fingers of the right-hand of the visually-impaired learner, said first set of rings having a first set of indicia mounted thereon, said second set of rings having a second set of indicia mounted thereon, said first set of indicia on said rings of said fingers of said left hand having first shapes, said first shapes comprising raised surfaces indicating the precise Braille representation of keys of the keyboard to be struck by said fingers of said left hand of the visually-impaired learner, said second set of indicia on said rings of said fingers of said right hand having second shapes, said second shapes comprising raised surfaces indicating the precise Braille representation of the keys of the keyboard to be struck by said fingers of said right hand of the visually-impaired learner.

2. An educational device for learning a keyboard comprising a first set of four rings and a second set of four rings, said first set of four rings are adapted to fit the four fingers of the left-hand of a hearing-impaired learner, said second set of four rings are adapted to fit the four fingers of the right-hand of the hearing-impaired learner, said first set of rings having a first set of indicia mounted thereon, said second set of rings having a second set of indicia mounted thereon, said first set of indicia on said rings of said fingers of said left hand having first shapes, said first shapes comprising sign-language representations of keys of the keyboard to be struck by said fingers of said left hand of the hearing-impaired learner, said second set of indicia on said rings of said fingers of said right hand having second shapes, said second shapes comprising sign-language representations of the keys of the keyboard to be struck by said fingers of said right hand of the hearing-impaired learner.

3. An educational device for learning a keyboard of arbitrary format and content, comprising a first set of four rings and a second set of four rings, said first set of four rings are adapted to fit the four fingers of the left-hand of a learner, said second set of four rings are adapted to fit the four fingers of the right-hand of the learner, said first set of rings having a first set of indicia mounted thereon as mnemonic means, said second set of rings having a second set of indicia mounted thereon as mnemonic means, said first set of indicia on said rings of said fingers of said left hand having first shapes defining objects which object names begin with a letter corresponding to a key of the keyboard to be struck by said finger of said left hand, said second set of indicia on said rings of said fingers of said right hand having second shapes defining objects which object names begin with a letter corresponding to a key of the keyboard to be struck by said finger of said right hand, and said shapes of said indicia comprise three-dimensional structures that are attached onto said rings of said fingers of said hands as mnemonic means.

4. An educational device as claimed in claim 3 comprising tactile-visual aids showing the correspondence between said indicia of a ring and said specific finger of said specific hand to be wearing said ring.

5. An educational device as claimed in claim 4 wherein said tactile-visual aids comprise representations of said fingers on said rings to be worn by said specified fingers.

6. An educational device as claimed in claim 5 wherein said tactile-visual aids comprise:

a first set of nearest neighbor linkages between said four rings of said first set of four rings allowing to simultaneously and unambiguously fit the said four rings on the four specific fingers of the left hand, and a second set of nearest neighbor linkages between said four rings of said second set of four rings allowing to simultaneously and unambiguously fit the said four rings on the four specific fingers of the right hand.

7. An educational device as claimed in claim 6 wherein:

said ring of said first set of four rings to be worn on a major finger of the left hand is attached to the top of a first triangular-shaped network of interconnections; said ring of said second set of four rings to be worn on a major finger of the right hand is attached to the top of a second triangular-shaped network of interconnections;

said first triangular-shaped network of interconnections being attached at its base to a first bracelet, said first bracelet to be worn on the wrist of the left hand; said second triangular-shaped network of interconnections being attached at its base to a second bracelet, said second bracelet to be worn on the wrist of the right hand;

said triangular-shaped networks of interconnections to be worn on the back side of said hands giving a touch of sophistication to said hands.

8. An educational device as claimed in claim 7 wherein said rings are made out of light metal, said nearest neighbor linkages comprise light and attractive metallic chains, and said triangular-shaped networks of interconnections comprise light and attractive metallic chains.

9. An educational device as claimed in claim 7 wherein said rings are made of crocheted material, said nearest neighbor linkages comprise light and attractive chains made of crocheted material, and said triangular-shaped networks of interconnections comprise light and attractive chains made of crocheted material.

10. An educational device as claimed in claim 6 wherein:

one ring of said first set of four rings to be worn on the little finger of the left hand is attached by a first interconnection to a first bracelet, said first bracelet to be worn on the wrist of the left hand; one ring of said second set of four rings to be worn on the little finger of the right hand is attached by a second interconnection to a second bracelet, said second bracelet to be worn on the wrist of the right hand;

said first interconnection to be worn on the back portion of the left hand to give a touch of simplicity to said left hand; said second interconnection to be worn on the back portion of the right hand to give a touch of simplicity to said right hand.

11. An educational device as claimed in claim 10 wherein said rings are made out of light metal, said nearest neighbor linkages comprise light and attractive metallic chains, and said interconnections between said rings and said bracelets comprise light and attractive metallic chains.

12. An educational device as claimed in claim 10 wherein said rings are made of crocheted material, said nearest neighbor linkages comprise light and attractive chains made of crocheted material, and said interconnections between said rings and said bracelets comprise light and attractive chains made of crocheted material.

13. An educational device as claimed in claim 4 comprising audio-visual-tactile means for showing the correspondence between said indicia of said rings on said fingers of said hands and specific keys of the keyboard to be struck by said fingers of said hands.

14. An educational device as claimed in claim 13 for assisting in the learning of a keyboard, wherein said audio-visual-tactile means comprise:

a first representation of the left-hand indicating the indicia of the rings on the fingers of the left hand, and a second representation of the left-hand indicating the corresponding letters and symbols of said specific keys to be struck by said fingers of the left-hand;

a first representation of the right-hand indicating the indicia of the rings on the fingers of the right hand, and a second representation of the right-hand indicating the corresponding letters and symbols of said specific keys to be struck by said fingers of the right-hand.

15. An educational device for assisting in the learning of a keyboard of arbitrary format and content, comprising:

a first set of rings and a second set of rings;

said first set of rings are adapted to fit the four fingers of the left-hand of a learner, said first set of rings having a first set of medallions mounted thereon;

said second set of rings are adapted to fit the four fingers of the right-hand of the learner, said second set of rings having a second set of medallions mounted thereon;

said first set of medallions having a first set of external indicia affixed on an external movable side of said medallions, said first set of medallions having a first set of upper-internal indicia affixed on an internal movable side of said medallions, said first set of medallions having a first set of lower-internal indicia affixed on an internal non-movable side of said medallions;

said second set of medallions having a second set of external indicia affixed on an external movable side of said medallions, said second set of medallions having a second set of upper-internal indicia affixed on an internal movable side of said medallions, said second set of medallions having a second set of lower-internal indicia affixed on an internal non-movable side of said medallions;

tactile-visual aids showing the correspondence between said indicia of said medallions of said rings and said fingers of specific hands to be wearing said rings;

said first set of external indicia affixed on said external movable side of said first set of medallions of said rings on said fingers of said left hand corresponds to specific keys to be struck by said fingers of said left hand;

said second set of external indicia affixed on said external movable side of said second set of medallions of said rings on said fingers of said right hand corresponds to specific keys to be struck by said fingers of said right hand;

said first set of upper-internal indicia affixed on said internal movable side of said first set of medallions of said rings on said fingers of said left hand corresponds to specific keys to be struck by said fingers of said left hand;

said second set of upper-internal indicia affixed on said internal movable side of said second set of medallions of said rings on said fingers of said right hand corresponds to specific keys to be struck by said fingers of said right hand;

said first set of lower-internal indicia affixed on said internal non-movable side of said medallions of said rings on said fingers of said left hand indicates the precise letters, numbers, and punctuation symbols of said keys to be struck by said fingers of said left hand;

said second set of lower-internal indicia affixed on said internal non-movable side of said medallions of said rings on said fingers of said right hand indicates the precise letters, numbers, and punctuation symbols of said keys to be struck by said fingers of said right hand.

16. An educational device as claimed in claim 15 wherein said tactile-visual aids comprise representations of said fingers on said rings to be worn by specified fingers.

17. An educational device as claimed in claim 15 wherein:

said first set of external indicia of said medallions of said rings on said fingers comprise first stones which stone colors match the colors of the color-coded keys to be struck by said fingers of the left hand;

said second set of external indicia of said medallions of said rings on said fingers comprise second stones which stone colors match the colors of the color-coded keys to be struck by said fingers of the right hand.

18. An educational device as claimed in claim 17 wherein:

said first stones are cut into first geometrical patterns, said first geometrical patterns having first shapes which first shape names begin with a letter corresponding to the key of the keyboard to be struck by said finger of the left hand;

said second stones are cut into second geometrical patterns, said second geometrical patterns having second shapes which second shape names begin with a letter corresponding to the key of the keyboard to be struck by said finger of the right hand.

19. An educational device as claimed in claim 15 wherein:

said first set of upper-internal indicia of said medallions of said rings on said fingers comprise three-dimensional structures defining objects which object names begin with a letter corresponding to the key of the keyboard to be struck by said finger of the left hand, said three-dimensional structures having their base mounted onto the internal movable side of said medallions;

said second set of upper-internal indicia of said medallions of said rings on said fingers comprise three-dimensional structures defining objects which object names begin with a letter corresponding to the key of the keyboard to be struck by said finger of the right hand, said three-dimensional structures having their base mounted onto the internal movable side of said medallions.

20. An educational device as claimed in claim 19 wherein said internal movable sides of said medallions comprise first magnets, said bases of said three-dimensional structures comprising second magnets of opposite polarity of said first magnets, said first and second magnets creating attractive forces binding said three-dimensional structures onto said internal movable side of said medallions.

21. An educational device as claimed in claim 15 wherein:

said sets of external indicia are on the first side of thin labels;

said sets of upper-internal indicia are on the second side of said thin labels;

said medallions comprise external magnifying glasses permanently mounted on the external side thereof, said medallions comprise internal magnifying glasses permanently mounted on the internal movable side thereof;

said thin labels can be inserted between said magnifying glasses, said external magnifying glasses showing enlarged external indicia, said internal magnifying glasses showing enlarged upper-internal indicia.

22. An educational device as claimed in claim 21 comprising:

a diverse collection of said thin labels, with said first side of said thin labels showing different sets of external indicia, and said second side of said thin labels showing different sets of upper-internal indicia.

23. An educational device as claimed in claim 21, wherein:

said first set of external indicia of said medallions of said rings on said fingers define objects whose names begin with a letter corresponding to the key of the keyboard to be struck by said finger of said left hand, said first set of upper-internal indicia of said medallions of said rings indicate the precise spelling of the corresponding names of said objects defined by said first set of external indicia of said medallions of said rings;

said second set of external indicia of said medallions of said rings on said fingers define objects whose names begin with a letter corresponding to the key of the keyboard to be struck by said finger of said right hand, said second set of upper-internal indicia indicate the precise spelling of the corresponding names of said objects defined by said first set of external indicia of said medallions of said rings.

24. An educational device as claimed in claim 21, wherein:

said first sets of external indicia and upper-internal indicia of said medallions of said rings on said fingers represent objects whose names begin with a letter corresponding to the key of the keyboard to be struck by said finger of said left hand;

said second sets of external and upper-internal indicia of said medallions of said rings on said fingers represent objects whose names begin with a letter corresponding to the key of the keyboard to be struck by said finger of said right hand.

25. An educational device as claimed in claim 15, wherein:

said first set of upper-internal indicia of said medallions of said rings on said fingers comprise a manual alphabet representation of letters corresponding to the keys of said keyboard to be struck by said fingers of the left hand;

said second set of upper-internal indicia of said medallions of said rings on said fingers comprise a manual alphabet representation of letters corresponding to the keys of said keyboard to be struck by said fingers of the right hand.

26. An educational device for simultaneously assisting in the learning of a keyboard and learning of writing, spelling, and language vocabulary, comprising:

a first set of rings and a second set of rings;

said first set of rings are adapted to fit the four fingers of the left-hand of a learner, said first set of rings having a first set of medallions mounted thereon;

said second set of rings are adapted to fit the four fingers of the right-hand of the learner, said second set of rings having a second set of medallions mounted thereon;

said medallions comprising electronic devices for storing and retrieving sets of pairs of original indicia and secondary indicia;

said original indicia of said medallions indicating the spelling of words beginning with a letter corresponding to the key of the keyboard to be struck by said finger of said hand;

said secondary indicia of said medallions indicating a foreign-language translation of the words indicated by said original indicia of said pairs stored in and retrievable from said electronic devices of said medallions.

27. An educational device as claimed in claim 26 wherein:

said electronic devices of said medallions are switched "on" by simply opening the lids of said medallions;

said electronic devices of said medallions are switched "off" by simply closing the lids of said medallions;

said electronic devices of said medallions are powered by batteries mounted within said medallions.

28. An educational device as claimed in claim 27 wherein said electronic devices comprise:

read-only-memories (ROMs) containing pre-programmed sets of said pairs of original indicia and secondary indicia; said read-only-memory can be incrementally addressed through manual activation of a pop-in-and-out switch, memory address being incremented by pushing said pop-in-and-out switch in the medallion and subsequently releasing said pop-in-and-out switch;

output displays niched in said medallions, said output displays showing said pairs of said original indicia and said secondary indicia stored at current addresses of said read-only-memories.

29. An educational device as claimed in claim 28 wherein:

said lids of said medallions are externally ornamented with stones which stone colors match a plurality of colors of color-coded keys to be struck by said finger of said hand; said stones being cut into geometrical patterns, said geometrical patterns having shapes which shape names begin with a letter corresponding to the key of the keyboard to be struck by said finger of said hand.

\* \* \* \* \*